US008657428B2

(12) United States Patent
Ohzeki et al.

(10) Patent No.: US 8,657,428 B2
(45) Date of Patent: *Feb. 25, 2014

(54) IMAGE FORMING METHOD

(75) Inventors: Tomoyuki Ohzeki, Kanagawa (JP); Jun Matsumoto, Kanagawa (JP); Masao Ikoshi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 321 days.

This patent is subject to a terminal disclaimer.

(21) Appl. No.: 12/881,217

(22) Filed: Sep. 14, 2010

(65) Prior Publication Data

US 2011/0069118 A1 Mar. 24, 2011

(30) Foreign Application Priority Data

Sep. 18, 2009 (JP) ................................. 2009-218012

(51) Int. Cl.
*B41J 2/18* (2006.01)

(52) U.S. Cl.
USPC ................................. 347/89; 347/44; 347/100

(58) Field of Classification Search
USPC ................ 347/44, 89, 95–100; 523/160, 161; 106/31.13, 31.6
See application file for complete search history.

(56) References Cited

U.S. PATENT DOCUMENTS

| 4,256,493 | A | 3/1981 | Yokoyama et al. |
| 5,919,291 | A | 7/1999 | Hotomi et al. |
| 5,992,974 | A | 11/1999 | Miyata |

(Continued)

FOREIGN PATENT DOCUMENTS

| EP | 1022151 A1 | 7/2000 |
| EP | 1760122 A2 | 3/2007 |

(Continued)

OTHER PUBLICATIONS

Partial English language translation of the following: Office action dated Feb. 26, 2013 from the Japanese Patent Office in a Japanese patent application corresponding to the instant application. This office action translation is submitted now in order to supplement the understanding of patent document JP 2008-254196, JP10-67115, JP2008-266564 and JP2007-238743 which are cited in the office action and are being disclosed in the instant information Disclosure Statement.

(Continued)

*Primary Examiner* — Matthew Luu
*Assistant Examiner* — Rut Patel
(74) *Attorney, Agent, or Firm* — Solaris Intellectual Property Group, PLLC

(57) ABSTRACT

The present invention provides an image forming method including ejecting an ink containing a silicic acid compound from an inkjet head, whereby deterioration of the head members is suppressed and a high precision image is formable stably over a long-term, the inkjet head being equipped with plural liquid droplet ejecting elements 80 having nozzles 64, pressure chamber 58, supply channel 60, and piezoelectric element 68, which transforms vibrating plate 66 that constitutes a wall of pressure chamber 58, and an ink circulation unit which has common flow channel 52 that is connected with each of plural liquid droplet ejecting elements 80 via supply channels 60, and common circulation channel 70 that is connected with each of plural liquid droplet ejecting elements 80 via reflux channels 72, that supplies the ink to plural liquid droplet ejecting elements from common flow channel 52, and that circulates the ink to common circulation channel.

18 Claims, 8 Drawing Sheets

(56) References Cited

U.S. PATENT DOCUMENTS

| | | |
|---|---|---|
| 6,238,585 B1 * | 5/2001 | Miyata .................. 216/27 |
| 6,439,708 B1 * | 8/2002 | Kato et al. .................. 347/98 |
| 2002/0001024 A1 * | 1/2002 | Wouters et al. ............ 347/89 |
| 2004/0061747 A1 * | 4/2004 | Nakao et al. ............... 347/85 |
| 2004/0132863 A1 | 7/2004 | Narita et al. |
| 2005/0062815 A1 * | 3/2005 | Yoshihira et al. .......... 347/89 |
| 2005/0270349 A1 * | 12/2005 | Sakasai .................... 347/100 |
| 2007/0078200 A1 * | 4/2007 | Yoshida et al. ........... 523/160 |
| 2007/0081062 A1 * | 4/2007 | Higuchi et al. ........... 347/100 |
| 2007/0149646 A1 * | 6/2007 | Nagashima ............... 523/160 |
| 2007/0213428 A1 | 9/2007 | Hiraishi et al. |
| 2007/0216743 A1 | 9/2007 | Makuta et al. |
| 2008/0136860 A1 * | 6/2008 | Kyoso ....................... 347/19 |
| 2008/0238980 A1 * | 10/2008 | Nagashima et al. ......... 347/17 |
| 2008/0241395 A1 | 10/2008 | Komatsu |
| 2009/0088521 A1 * | 4/2009 | Hosokawa et al. ......... 524/558 |
| 2009/0202723 A1 * | 8/2009 | Ikoshi et al. ............... 427/256 |
| 2009/0202724 A1 | 8/2009 | Arai et al. |
| 2009/0203833 A1 | 8/2009 | Sasada et al. |
| 2010/0053288 A1 * | 3/2010 | Ohzeki et al. ............. 347/100 |
| 2010/0075050 A1 * | 3/2010 | Tojo et al. ................. 427/261 |
| 2010/0091055 A1 * | 4/2010 | Kawakami et al. ........... 347/9 |
| 2010/0165020 A1 * | 7/2010 | Tojo et al. .................... 347/9 |
| 2010/0166962 A1 * | 7/2010 | Ohzeki ...................... 427/256 |
| 2011/0057986 A1 | 3/2011 | Ikoshi et al. |
| 2011/0069110 A1 * | 3/2011 | Matsumoto et al. ......... 347/21 |
| 2011/0069111 A1 * | 3/2011 | Matsumoto et al. ......... 347/21 |
| 2011/0069112 A1 * | 3/2011 | Matsumoto et al. ......... 347/21 |
| 2011/0069116 A1 * | 3/2011 | Ohzeki et al. ............... 347/44 |
| 2011/0069117 A1 * | 3/2011 | Ohzeki et al. ............... 347/44 |

FOREIGN PATENT DOCUMENTS

| | | |
|---|---|---|
| EP | 2058375 A2 | 5/2009 |
| EP | 2090627 A | 8/2009 |
| EP | 2218757 A1 | 8/2010 |
| JP | 9-227812 A | 9/1997 |
| JP | 9-272826 A | 10/1997 |
| JP | 9-286941 A | 11/1997 |
| JP | 10-67115 | 3/1998 |
| JP | 10-140065 A | 5/1998 |
| JP | 10-168373 A | 6/1998 |
| JP | 11-10856 A | 1/1999 |
| JP | 11-12516 A | 1/1999 |
| JP | 11-115303 A | 4/1999 |
| JP | 2000-351931 A | 12/2000 |
| JP | 2001-329199 A | 11/2001 |
| JP | 2003-103897 A | 4/2003 |
| JP | 2003-165936 A | 6/2003 |
| JP | 3550637 B2 | 8/2004 |
| JP | 2005-23102 A | 1/2005 |
| JP | 2005-041994 A | 2/2005 |
| JP | 2005-105161 A | 4/2005 |
| JP | 2007-77371 A | 3/2007 |
| JP | 2007-119683 A | 5/2007 |
| JP | 2007-238743 | 9/2007 |
| JP | 2007-326231 A | 12/2007 |
| JP | 2008-6809 A | 1/2008 |
| JP | 2008-198642 A | 8/2008 |
| JP | 2008-254196 | 10/2008 |
| JP | 2008-260139 A | 10/2008 |
| JP | 2008-266564 | 11/2008 |
| JP | 2009-51990 A | 3/2009 |
| JP | 2009-173867 A | 8/2009 |
| JP | 2009-190379 A | 8/2009 |
| JP | 2009-191134 A | 8/2009 |
| JP | 2009-196184 A | 9/2009 |
| WO | 2005/116147 A1 | 12/2005 |
| WO | 2009/001967 A1 | 12/2008 |

OTHER PUBLICATIONS

Corresponding EPO Official communication (Jul. 19, 2011).
Material Safety Data Sheet Metacaulk 990 (Liquid Sodium Silicate) Metalines, Inc. (May 18, 1988): pp. 1-4.
Corresponding Japanese Office Action dated Jul. 9, 2013 with the partial English translation.

* cited by examiner

IMAGE FORMING METHOD

CROSS-REFERENCE TO RELATED APPLICATION

This application claims priority under 35 USC 119 from Japanese Patent Application No. 2009-218012 filed on Sep. 18, 2009, the disclosure of which is incorporated by reference herein.

BACKGROUND OF THE INVENTION

1. Field of Invention

The present invention relates to an image forming method in which an image is formed by discharging an ink composition.

2. Description of the Related Art

In recent years, as a result of ever-increasing demand for the protection of resources, protection of the environment, enhancement of operational stability and the like, the conversion of inks into aqueous products has continued to proceed. The product qualities demanded from aqueous inks include fluidity, storage stability, glossiness of film, clarity, coloring ability and the like, as in the case of oil-based inks.

Since most pigments have significantly deteriorated aptitude such as pigment dispersibility with respect to an aqueous vehicle in comparison with the case of an oil-based vehicle, sufficient quality cannot be obtained by conventional dispersion methods. The use of various additives such as, for example, an aqueous pigment dispersion resin or a surfactant has been studied heretofore. However, an aqueous ink comparable to an oil-based ink which has existing high quality and sufficient aptitude such as pigment dispersibility has not been obtained.

With respect to these circumstances, for example, there is disclosed an aqueous ink composition which contains polymer particles and a colorant having a water-insoluble polymer coated thereon as a color material (for example, see Japanese Patent Application Laid-Open (JP-A) No. 2001-329199). Further, an aqueous inkjet recording liquid containing a pigment and colloidal silica, an ink composition containing a resin emulsion and an inorganic oxide colloid, and the like are disclosed (for example, see JP-A No. 9-227812, JP-A No. 9-286941, and Japanese Patent No. 3550637), and a good image can be formed by including colloidal silica or the like from the viewpoint of abrasion resistance, color unevenness, clarity, and the like.

Further, there is disclosed an aqueous ink composition which prevents the elution of glass, silicon, silicon oxide, or the like in contact with an ink, by using the zeta potential of the ink and the zeta potential between a member and a color material (for example, see JP-A No. 2003-165936).

SUMMARY OF THE INVENTION

According to an aspect of the invention, an image forming method including ejecting an ink containing a silicic acid compound from an inkjet head, whereby deterioration of the head members is suppressed and a high precision image is formable stably over a long-term, the inkjet head being equipped with plural liquid droplet ejecting elements 80, which are provided with nozzles 64, pressure chamber 58, supply channel 60, and piezoelectric element 68, which transforms vibrating plate 66 that constitutes a wall of pressure chamber 58, and an ink circulation unit which has common flow channel 52 that is connected with each of plural liquid droplet ejecting elements 80 via supply channels 60, and common circulation channel 70 that is connected with each of plural liquid droplet ejecting elements 80 via reflux channels 72, that supplies the ink to plural liquid droplet ejecting elements 80 from common flow channel 52, and that circulates the ink to common circulation channel 70, is provided.

BRIEF DESCRIPTION OF DRAWINGS

Exemplary embodiments of the present invention will be described in detail based on the following figures, wherein.

DETAILED DESCRIPTION

Figure 1:
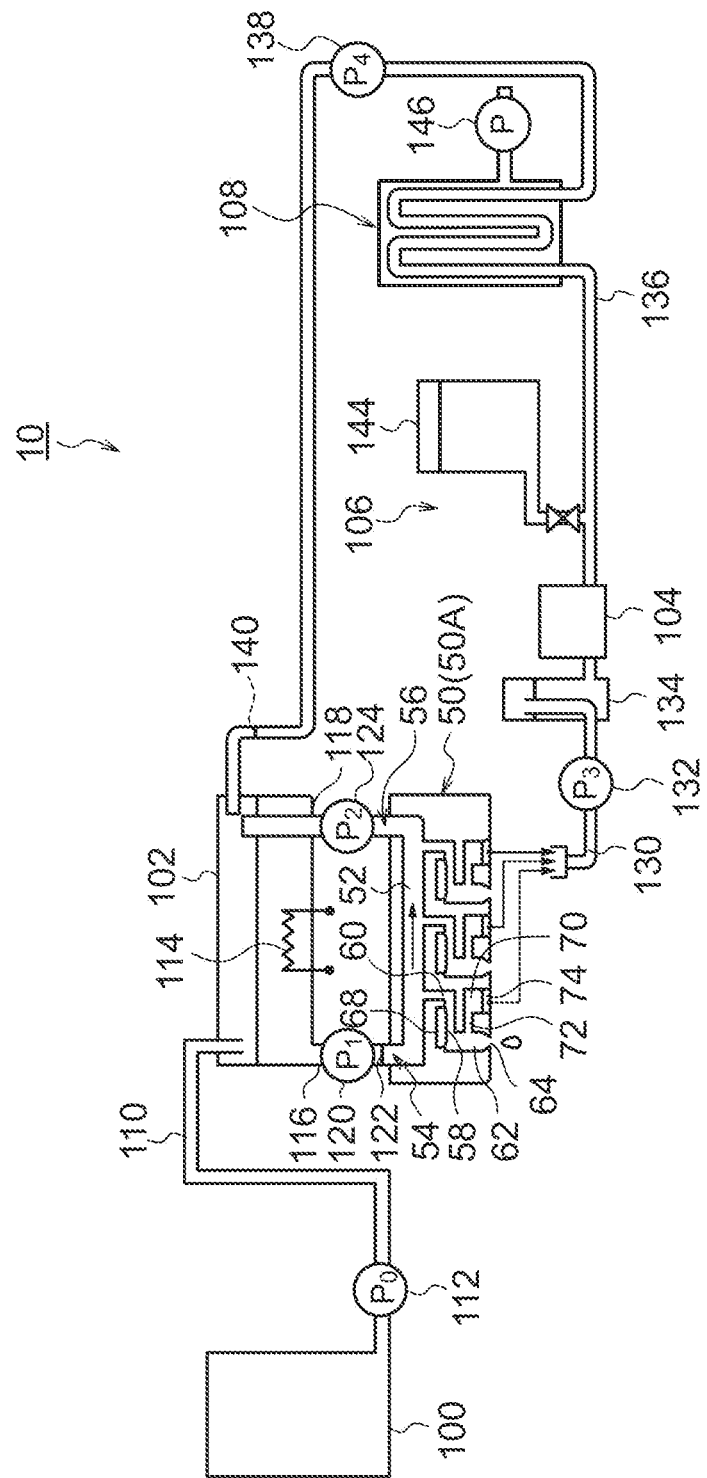
FIG. 1 is a conceptual sectional view showing an example of the configuration of an inkjet recording apparatus equipped with an inkjet head which is provided with an ink circulation system.

Among the conventional art described above, abrasion resistance of a formed image is improved in an aqueous ink composition containing polymer particles, but it is difficult to say that the composition is sufficient from the viewpoint of an ejection property.

Further, it is known that, in a case where an inkjet head contacts with the ink, the head members have a tendency to be easily deteriorated due to the influence of ink, and in particular, when polymer particles are incorporated in an aqueous ink, this tendency is exacerbated.

The present invention has been made in view of the above circumstances, and an object of the invention is to provide an image forming method with which, in the case of performing image formation using an inkjet head which is provided with an ink circulation system, deterioration of the head members (particularly, the nozzle plate or ink flow channels) is suppressed, and an image with high resolution can be formed stably over a long-term. The task of the invention is to achieve the object.

The present inventors have found that, with respect to the circumstances in which the inkjet head begins to dissolve due to contact with the ink composition and deterioration in durability due to corrosion occurs easily, even in a case where the inkjet head has a circulation system with which ink circulates through the inside of the flow channels so that the frequency of contact with a flesh ink is high, or even in a case where the ink has a composition system, in which corrosion occurs easily due to inclusion, for example, of polymer particles, or the like, the action of corrosion by the ink composition can be suppressed when a silicic acid compound is present. The present invention is achieved based on this knowledge.

In particular, when the parts included in the inkjet head that contact with the ink composition such as a nozzle plate and ink flow channels are formed using silicon, and when the configuration is arranged such that a large amount of ink flows by arranging plural nozzles (discharge ports) in a two-dimensional array in order to obtain a high resolution image of, for example, 1200 dpi or the like, the above effect is evident, and the dissolution of the silicone parts, for example, the parts formed by using silicon, a silicic acid compound, or the like, which are in contact with the ink composition, can be effectively inhibited.

Exemplary embodiments according to the aspect of the invention include, but are not limited to the following items <1> to <19>.

<1> An image forming method including: ejecting an ink composition including at least one silicic acid compound, from an inkjet head equipped with plural liquid droplet ejecting elements and an ink circulation unit, wherein the ink circulation unit comprises a common flow channel that is connected with each of the plural liquid droplet ejecting elements via supply channels, and a common circulation channel that is connected with each of the plural liquid droplet ejecting elements via reflux channels, that supplies the ink composition to the plural liquid droplet ejecting elements from the common flow channel, and that circulates the ink composition to the common circulation channel.

<2> The image forming method according to the item <1>, wherein the silicic acid compound is a water-soluble silicic acid salt or colloidal silica.

<3> The image forming method according to the item <1> or the item <2>, wherein the ink composition further includes a pigment, a water-soluble organic solvent, and polymer particles.

<4> The image forming method according to the item <3>, wherein the polymer particles include carboxy groups and have an acid value of 25 mgKOH/g to 100 mgKOH/g, at least a part of the carboxy groups being neutralized, and a neutralization degree of the carboxy groups being 0.3 mole equivalents or more.

<5> The image forming method according to the item <3> or the item <4>, wherein the polymer particles are self-dispersing polymer particles.

<6> The image forming method according to the item <5>, wherein the self-dispersing polymer particles include a hydrophilic structural unit derived from a hydrophilic monomer and a hydrophobic structural unit derived from a hydrophobic monomer.

<7> The image forming method according to the item <6>, wherein the hydrophobic monomer includes a cyclic aliphatic group-containing monomer.

<8> The image forming method according to any one of the items <1> to <7>, wherein a total amount of the silicic acid compound is in a range of from 0.0005% by mass to 0.5% by mass relative to a total mass of the ink composition.

<9> The image forming method according to the item <3>, wherein the pigment includes at least one pigment coated with a water-insoluble resin including a structural unit having an acidic group.

<10> The image forming method according to the item <9>, wherein the water-insoluble resin includes a hydrophilic structural unit (A) and a hydrophobic structural unit (B), the hydrophilic structural unit (A) including an acidic group.

<11> The image forming method according to the item <10>, wherein the hydrophobic structural unit (B) includes a structural unit represented by the following Formula (2):

Formula (2):

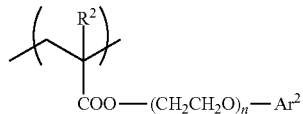

wherein, in Formula (2), $R^2$ represents a hydrogen atom or a methyl group; $Ar^2$ represents a monovalent group derived from an unsubstituted or substituted aromatic ring; and n represents an average repeating number in a range of from 1 to 6.

<12> The image forming method according to any one of the items <1> to <11>, wherein the ink composition further includes a first hydrophilic organic solvent having an I/O value of from 0.70 to less than 1.0.

<13> The image forming method according to the item <12>, wherein the ink composition further includes a second hydrophilic organic solvent having an I/O value of from 1.0 to 1.5.

<14> The image forming method according to any one of the items <1> to <13>, wherein a portion of the inkjet head, which contacts the ink composition, includes silicon.

<15> The image forming method according to the item <14>, wherein the portion further includes a film including at least one selected from the group consisting of a metal oxide, a metal nitride and a metal other than silicon.

<16> The image forming method according to the item <15>, wherein the film includes $SiO_2$ or tantalum oxide.

<17> The image forming method according to any one of the items <1> to <16>, wherein, in the inkjet head, the ink composition flows from the common flow channel through the supply channels and is supplied to the plural liquid droplet ejecting elements which are provided with discharge nozzles, and the ink composition that is not ejected from the discharge nozzles flows through the reflux channel and is made to circulate to the common circulation channel.

<18> The image forming method according to any one of the items <1> to <17>, wherein, in the inkjet head, a supply amount of the ink composition that is supplied from the common flow channel is adjusted by changing the pressure difference between the common flow channel and the common circulation channel.

<19> The image forming method according to any one of the items <1> to <18>, wherein the liquid droplet ejecting elements are each equipped with a discharge nozzle that ejects the ink composition, a nozzle flow channel which is connected with the discharge nozzle, and a pressure chamber which is connected with the discharge nozzle via the nozzle flow channel and to which the ink composition is supplied from the common flow channel via the supply channel, and the common circulation channel is connected with the nozzle flow channel via the reflux channel.

Hereinafter, the image forming method of the present invention is explained in detail.

The image forming method of the invention is configured to include a step (which may be referred to as an "ink discharging step" in some cases) of ejecting an ink composition (which may be merely referred to as an "ink" in some cases) containing at least one selected from silicic acid compounds, from an inkjet head equipped with plural liquid droplet ejecting elements and an ink circulation unit, wherein the ink circulation unit has a common flow channel that is connected with each of the plural liquid droplet ejecting elements via supply channels, and a common circulation channel that is connected with each of the plural liquid droplet ejecting elements via reflux channels, that supplies the ink composition to the plural liquid droplet ejecting elements from the common flow channel, and that circulates the ink composition to the common circulation channel. The image forming method of the present invention may be configured to further include other step, as necessary. In the present invention, an embodiment in which a treatment liquid applying step of applying a treatment liquid, which is capable of forming aggregates when contacted with the ink composition, onto the recording medium is further provided is preferable.

In the case of forming an image by ejecting an ink from an inkjet head which is provided with an ink circulation system, because the ink used circulates continuously, the nozzle plate or the ink flow channels are continuously in the state of being always in contact with a flesh ink. Therefore, dissolution (elution, erosion or corrosion) of the nozzle plate or ink flow channels that contact with the ink is liable to proceed. In the invention, by incorporating a silicic acid compound (preferably a water-solubilizable silicate and/or colloidal silica) in the ink that is ejected from the inkjet head which is provided with such a circulation system, the suppressive effect against elution of the ink-contacting portion of the nozzle plate or ink flow channels, particularly the suppressive effect against elution of the portion formed using silicon, can be enhanced, and corrosion caused by ink, and further, deterioration in durability can be effectively suppressed.

Furthermore, since the inkjet head has an ink circulation system, there is no case where the viscosity of ink in the vicinity of nozzles, which are allowed to stand and are not used, is increased, prevention of ejection failure can be provided, and upon performing intermittent ejection, the ejection failure can be remarkably suppressed.

[Ink Discharging Step]

In the ink discharging step, the ink composition containing a water-solubilizable silicate and/or colloidal silica is ejected from the inkjet head which is provided with plural liquid droplet ejecting elements and an ink circulation unit which is equipped with a specific structure and circulates the ink composition, to form an image. In this step, the ink composition can selectively be applied onto the recording medium, and a desired visual image can be formed.

Image recording utilizing the inkjet method can be performed, specifically, by supplying energy thereby ejecting a liquid composition to a desired recording medium, that is, plain paper, resin-coated paper, paper used exclusively for inkjet recording described, for example, in JP-A Nos. 8-169172, 8-27693, 2-276670, 7-276789, 9-323475, 62-238783, 10-153989, 10-217473, 10-235995, 10-337947, and 10-217597, films, common use paper for electrophotography, clothes, glass, metals, ceramics, etc. As the inkjet recording method suitable to the exemplary embodiment of the invention, a method described in JP-A No. 2003-306623, in columns (0093) to (0105) may be applicable.

The inkjet method is not particularly limited and may be of any known system, for example, a charge control system of ejecting an ink utilizing an electrostatic attraction force, a drop on demand system of utilizing a vibration pressure of a piezo element (pressure pulse system), an acoustic inkjet system of converting electric signals into acoustic beams, irradiating them to an ink, and ejecting the ink utilizing a radiation pressure, and a thermal inkjet system of heating an ink to form bubbles and utilizing the resultant pressure (BUBBLEJET (registered trade mark)). Examples of the inkjet method include a system of injecting a number of ink droplets of low concentration, a so-called "photo-ink" each in a small volume, a system of improving an image quality using plural inks of a substantially identical hue and of different concentrations, and a system of using a colorless transparent ink.

In the exemplary embodiments of the invention, there is preferred a method where a pressure generation unit (for example, piezo element) using the pressure pulse method is used, the pressure generation unit is driven to control an amount of change in volume within each pressure chamber and thereby the droplet diameter of the ink composition to be ejected from the nozzle is changed to eject the ink composition from the nozzle; and a method where the pressure generation unit is driven many times, to thereby control the number of droplets ejected from the nozzle, and plural droplets are combined before landing. In this case, it is more important to suppress dissolution of the silicon portion of the nozzle plate due to ink. A multiple tone image can be stably recorded with the ink composition of the exemplary embodiment of the invention.

The inkjet head used in the inkjet method may be either an on-demand system or a continuous system. The ejection system includes, specifically, for example, an electric-mechanical conversion system (for example, single cavity type, double cavity type, bender type, piston type, share mode type, and shared wall type, etc.), an electric-thermal conversion system (for example, thermal inkjet type, BUBBLEJET (registered trade mark) type, etc.), an electrostatic attraction system (for example, electric field control type, and slit jet type, etc.), and an electric ejecting system (for example, spark jet type, etc.) and any of the ejection systems may be used.

Ink nozzles, etc. used for recording by the inkjet method are not particularly limited but can be selected properly depending on the purpose.

As an inkjet head, there are a shuttle type where a short serial head is used to record while scanning the head in the width direction of the recording medium and a line head type (single-pass type) where a recording device is arranged in correspondence with the entire area of one side of the recording medium and the line head is used. The single-pass type forms an image on the whole face of a recording medium due to an operation where a full line head and the recording medium are relatively moved once, using the full line head which covers the whole area of the recording medium. For example, the single-pass type is described in JP-A Nos. 2005-96443, and 2005-280346. That is to say, the single-pass type can perform image recording on the whole face of the recording medium by scanning the recording medium in the direction orthogonal to the device arrangement direction of the full line head, and a transferring system such as a carriage which scans the short head is not necessary. Further, since a complicated scanning control of the movement of the carriage and the recording medium is not necessary and only the recording medium is moved, a high recording rate can be realized in comparison with the shuttle type. The image forming method according to exemplary embodiments of the invention can be applied to all these types; however, when the method is generally applied to the single-pass type, a high precise nozzle arrangement and high ejection frequency are required, and therefore suppression of dissolution due to ink is more important. There is a large effect on the improvement of ejection precision due to ink composition of the exemplary embodiment of the invention and prevention of dissolution due to contact of the ink with the nozzle plate.

The inkjet head, that ejects the ink in the ink discharging step, is equipped with plural liquid droplet ejecting elements and an ink circulation unit which has a common flow channel that is connected with each of the plural liquid droplet ejecting elements via supply channels, and a common circulation channel that is connected with each of the plural liquid droplet ejecting elements via reflux channels, that supplies the ink composition to the plural liquid droplet ejecting elements from the common flow channel, and that circulates the ink composition to the common circulation channel. It should be noted that there is no particular limitation except this configuration, and an image forming device equipped with other known members or units can be used.

[Inkjet Head]

An exemplary embodiment of the ink circulation system of the invention will be explained.

FIG. 1 is a diagram showing the outline of an ink circulation system in an inkjet head of an inkjet recording apparatus.

As shown in FIG. 1, the ink circulation system of an inkjet recording apparatus 10 is mainly composed of a recording head 50 (50A), an ink tank 100, a sub-tank 102, a solvent concentration detector 104, a solvent adding unit 106, and a degassing unit 108. Ink is supplied from the ink tank 100 via the sub-tank 102 to the recording head 50, and ink droplets are ejected from each of plural discharge nozzles 64 formed at the recording head 50, while a portion of the ink supplied to the recording head 50 circulates through the inside of the head and then is returned to the sub-tank 102.

Hereinafter, the configuration of each part will be described.

The flow channel 110 which connects the ink tank 100 and the sub-tank 102 is provided with a pump 112. The ink contained in the ink tank 100 is supplied to the sub-tank 102 by the pump 112. The pump 112 controls the amount of ink in the sub-tank 102 to be constant. The sub-tank 102 is equipped in the inside with a heater-cooler 114 for ink temperature adjustment, and the ink viscosity is lowered by regulating the temperature so that the temperature of the ink in the sub-tank 102 reaches a predetermined temperature by the heater-cooler 114 for ink temperature adjustment. For example, according to one embodiment, a temperature sensor (not shown in the diagram) which detects the ink temperature inside the recording head 50 is provided to control the heater-cooler 114 for ink temperature adjustment so that the ink temperature inside the recording head 50 reaches a predetermined temperature (for example, 55° C.) (that is, to obtain a desired ink viscosity).

The sub-tank 102 and the recording head 50 are connected through a first flow channel 116 and a second flow channel 118. The first flow channel 116 is connected through a first supply port 54 formed at one end of the common flow channel 52 formed at the recording head 50, and at the same time, the second flow channel 118 is connected through a second supply port 56 formed at the other end of the common flow channel 52. The first flow channel 116 is a supply flow channel for performing ink supply from the sub-tank 102 to the recording head 50, and is provided with a pump 120 and a filter 122. On the other hand, the second flow channel 118 is a circulating flow channel for returning a portion of the ink supplied to the recorded head 50, to the sub-tank 102, and is provided with a pump 124.

The ink contained in the sub-tank 102 is supplied from the first flow channel 116 to the recording head 50 via the filter 122, by the pump 120. The fineness (mesh size) of the filter 122 is preferably smaller than the nozzle diameter, and thereby any foreign matters incorporated in the inside of the recording head 50 from the sub-tank 102 may be prevented from causing nozzle clogging. For example, a filter having a mesh size that is about 10% smaller than the nozzle diameter may be used.

A portion of the ink supplied to the recording head 50 is returned through the second flow channel 118 to the sub-tank 102 via the common flow channel 52 by means of the pump 124. Although not shown in the diagram, according to one embodiment, the second flow channel 118 is provided with a vacuum degassing unit in the upstream (on the side of the recording head 50) of the pump 124.

Pressure chambers 58, which are connected with the common flow channel 52, are each provided with a nozzle flow channel 62, which is a channel that is connected with a discharge nozzle 64 (which may be merely referred as a nozzle in some case). A reflux channel 72 is provided at the nozzle flow channel 62, which is connected with a common circulation channel 70 via the reflux channel 72. The common circulation channel 70 is connected with a withdrawal port 74 through a connection flow channel that is not shown in the diagram (indicated with symbol 71 in FIG. 3), and the withdrawal port 74 is connected with a flow channel 130, which is linked to a pump 132.

Figure 2:
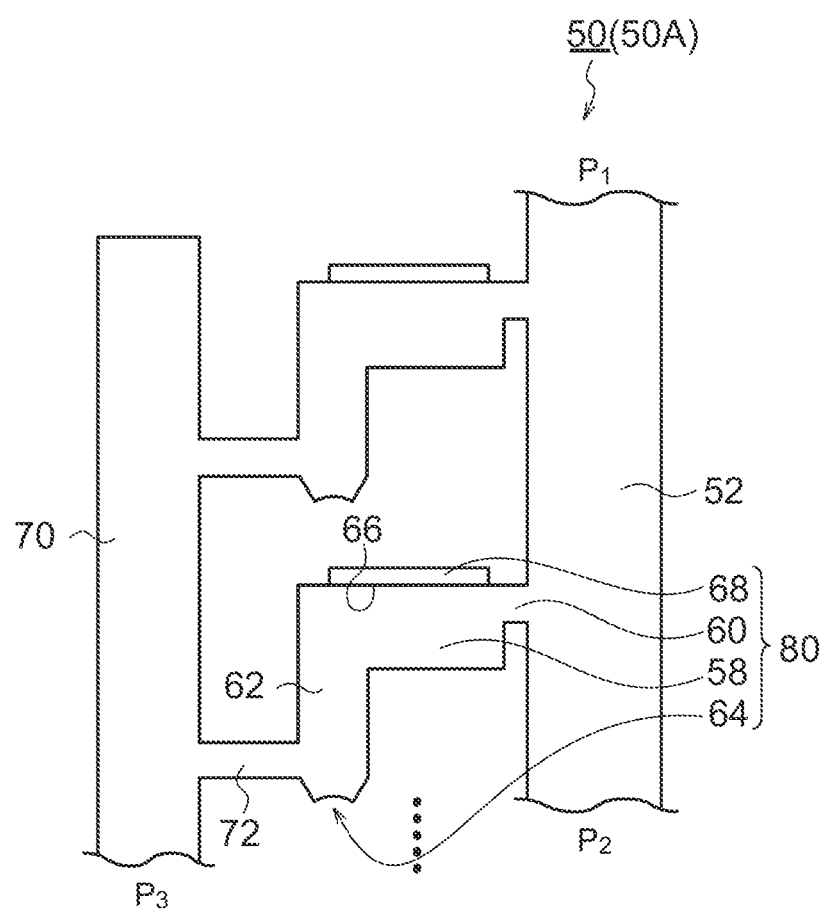
FIG. 2 is a schematic diagram showing an example of the inner structure of a recording head.

FIG. 2 is a schematic diagram showing an example of the internal structure of the recording head 50. As shown in FIG. 2, the recording head 50 is provided with plural liquid droplet ejecting elements 80, each of which is composed of a nozzle 64 serving as an ejection port (discharge port) for ink droplets, a pressure chamber 58, a supply channel 60, and a piezoelectric element 68 which deforms a vibrating plate 66 that constitutes a wall of the pressure chamber 58. The details on the configuration of the recording head 50 will be described later, but the recording head 50 is constituted of plural head units arranged in a row. In each of the head units, a number of liquid droplet ejecting elements 80 are arranged in a matrix form (two-dimensionally).

Each of the pressure chambers 58 is connected with the common flow channel 52 through the supply channel 60, and ink supply is performed through the common flow channel 52 to each of the pressure chambers 58 via a corresponding supply channel 60. The supply channel 60 also functions as a supply restrictor that suppresses backflow from the pressure chamber 58 to the common flow channel 52. Each of the pressure chambers 58 also is connected with the nozzle 64 through the nozzle flow channel 62.

The vibrating plate 66, which constitutes a wall in each pressure chamber 58, is provided with a piezoelectric element 68. Upon applying a driving voltage to the piezoelectric element 68, the deformation of the vibrating plate 66 causes a change in the volume of the pressure chamber 58. If the vibrating plate 66 is deformed in a direction causing an increase in the volume of the pressure chamber 58, the meniscus formed at the nozzle 64 is drawn in toward the side of ink inflow (toward the pressure chamber 58), and at the same time, the ink inside the common flow channel 52 is sucked into the pressure chamber 58 through the supply channel 60 to refill the pressure chamber. On the other hand, if the vibrating plate 66 is deformed in a direction causing a decrease in the volume of the pressure chamber 58, the meniscus at the nozzle 64 is pushed out toward the side of ink ejection (toward the opposite side of the pressure chamber 58), so that ink droplets are ejected from the nozzle 64. Particularly, it is preferable that the interval of the pull and push is adjusted to one-fourth of the fluidic resonance period of the pressure chamber 58 and the ink. A large displacement is obtained as the oscillation of the pull and push is built up, and thereby ink ejection may be easily carried out.

Upon performing ink ejection, the ink in the pressure chamber 58 flows not only to the nozzle flow channel 62, which is on the side of ink ejection, but also partly to the supply channel 60, which is on the side of ink supply. The amount of ink flowing from the pressure chamber 58 to the nozzle flow channel 62, and the amount of ink flowing from the pressure chamber 58 to the supply channel 60 are determined by a ratio of the respective flow channel resistances and inertance. In a general inkjet head, the dimensions of various units are determined to be at the ratio of approximately 1:1.

Figure 3:
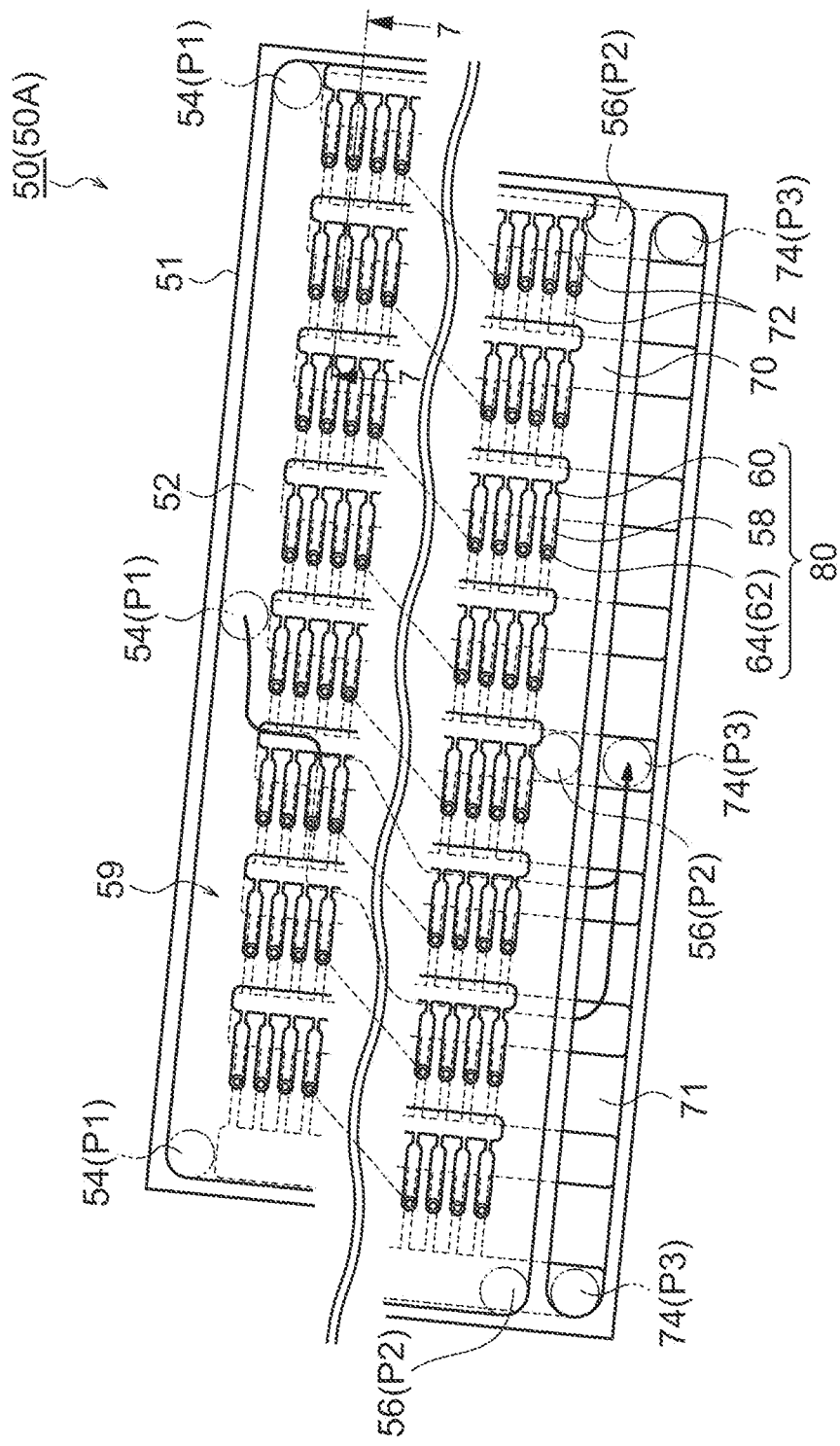
FIG. 3 is a plane view showing an example of the detailed structure of a recording head.
Figure 4:
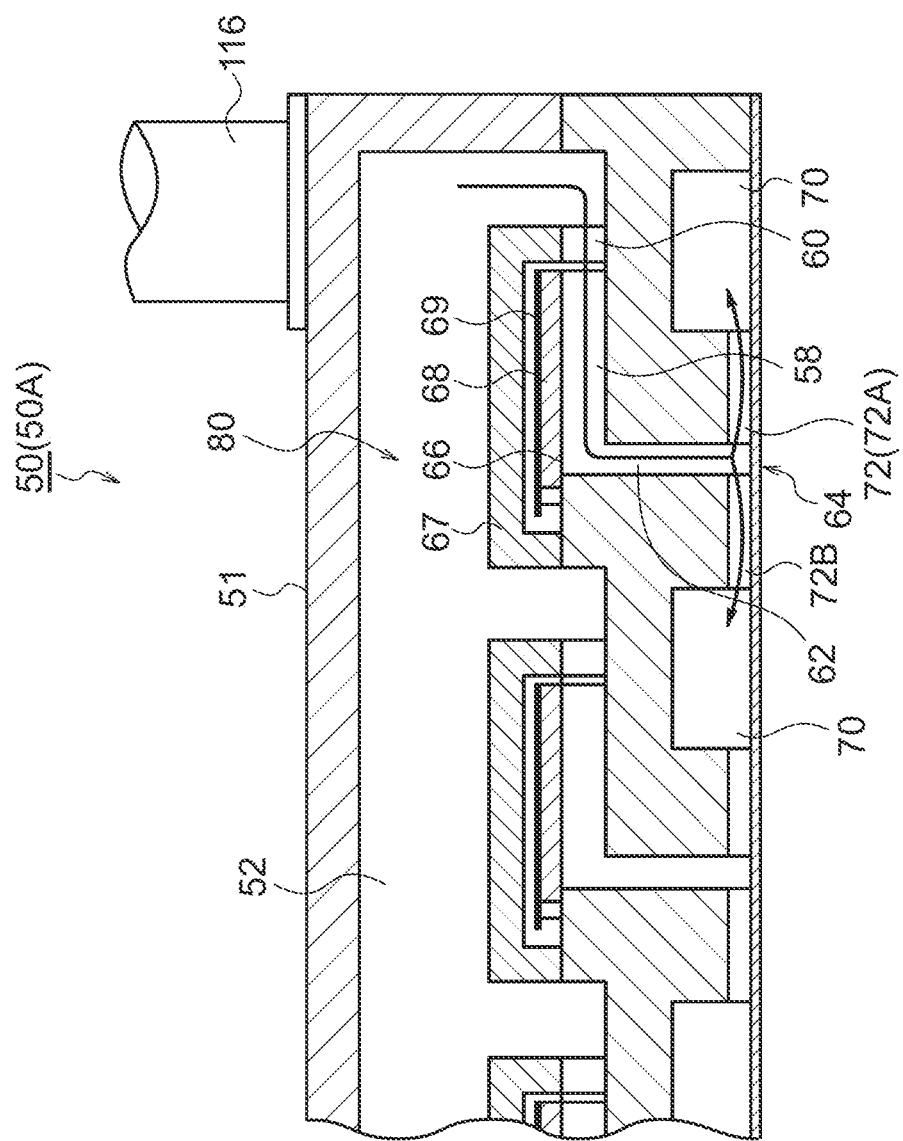
FIG. 4 is a cross sectional view along the line 7-7 in FIG. 3.

FIG. 3 is a plane view showing the detailed structure of the recording head 50. FIG. 4 is a cross-sectional view showing a part of the recording head 50 (a cross-sectional view along the line 7-7 in FIG. 3). In FIG. 3, the vibrating plate 66 and the piezoelectric element 68 are not shown for easier understanding of the configuration of the pressure chamber 58. The recording head 50 according to the exemplary embodiment is composed of plural head units 51 arranged in a row, and such a head unit is shown in FIG. 3 and FIG. 4. Definitely, a head may also be constituted of a single head unit 51.

As shown in FIG. 3, the head unit 51 has liquid droplet ejecting elements 80, each including the nozzle 64 and the pressure chamber 58, disposed in a matrix form (two-dimensionally). The common flow channel 52 is formed across the entire region where the pressure chambers 58 are formed, and three first supply ports 54 and three second supply ports 56 are provided such that the ports are opened to the common flow channel 52.

The head unit 51 is also provided with plural common circulation channels 70 for each row of pressure chambers 59. Each common circulation channel 70 is connected with each of the pressure chambers 58 in the corresponding row of pressure chambers 59. More specifically, as shown in FIG. 2, each pressure chamber 58 are connected with the common circulation channel 70 through the corresponding nozzle flow channel 62 and reflux channel 72. The plural common circulation channels 70 are joined into one channel through a communicating flow channel 71, and the communicating flow channel 71 has three withdrawal ports 74 formed therein.

As shown in FIG. 4, the vibrating plate 66 that constitutes a wall of the pressure chamber 58 is provided thereon with a piezoelectric element 68 equipped with an individual electrode 69. As for the vibrating plate 66, an electric conductive substrate having at least an electrode layer (electric conductive layer) formed at the surface is used, so that the vibrating plate 66 also serves as a common electrode for the piezoelectric element 68. For the piezoelectric element 68, a piezoelectric substance such as lead titanate zirconate (Piezo) is suitably used.

A protective cover 67 is provided such as to cover the piezoelectric element 68 on the vibrating plate 66, so that an attempt is made to provide insulating protection of the piezoelectric element 68 or other wiring members (not shown in the diagram) from the ink in the common flow channel 52.

In regard to the recording head 50 constituted as such, as shown in FIG. 3, when the pressure of ink at the first supply port 54 formed in the upstream of the common flow channel 52 is designated as P1, the pressure of ink at the second supply port 56 formed in the downstream of the common flow channel 52 is designated as P2, and the pressure of ink at the withdrawal port 74 formed at one end of the common circulation channel 70 (more specifically, the communicating flow channel 71) is designated as P3, if the respective pressures P1, P2 and P3 are set or controlled such that the relationship of the following expression: P1>P2>P3 is established. By setting and controlling as such, a flow of ink directed from the upstream side of the common flow channel 52 to the downstream side is formed, and at the same time, a flow of ink directed from the common flow channel 52 to the common circulation channel 70 via the supply channel 60, the pressure chamber 58, the nozzle flow channel 62, and the reflux channel 72 is formed. Here, in general, since the channel cross-sectional area of the common flow channel 52 is larger and the fluid resistance is smaller, the pressure difference, ΔP, between the first supply port 54 and the second supply port 56 is about several hundred to several thousand kPa.

The amount of flow per unit time of the ink flowing inside the common flow channel 52 may be determined from the pressure difference of ink (P1-P2) between the first supply port 54 and the second supply port 56 and the fluid resistance at the common flow channel 52. The amount of flow at the common flow channel 52 is preferably set to be an amount capable of controlling the temperature changes caused by the heat generation in the recording head 50, as well as an amount capable of making air bubbles to flow when air bubbles have entered into the common flow channel 52. Both of these conditions may be satisfied when a large amount of flow is used. Although it is needed to set the amount of flow in the scope of not generating turbulence within the common flow channel 52, it is thought that general amounts of heat generation and dimensions of inkjet head do not initially bring about an uncontrollable state.

For example, a practical flow rate is about 10 times to 20 times the amount of ink consumption per unit time period when the head is in the state of full ejection (ejection in the case of continued ejection for image drawing at the maximum frequency and the maximum ejection volume). If a head which ejects ink at an amount of 2 [pL] at 40 [kHz] has a nozzle density of 1200 [dpi] and a length of 2 inches per unit, the amount of ink consumption is 2×2×1200×40000 [pL/sec]=0.192 [mL/sec], and thus the amount of ink flowing through the common flow channel 52 is adjusted to about 2 [mL/sec] to 4 [mL/sec].

Furthermore, the pressures P1 and P2 exerted respectively to the supply ports 54 and 56 by the pumps 120 and 124, are weak negative pressures, so that the meniscus formed at the openings of the nozzles 64 in the recording head 50 is pulled in slightly. Thus, the pressures are −20 [mmH$_2$O] to −60 [mmH$_2$O] relative to the atmospheric pressure.

Generally, in an inkjet head, the ink at the nozzle portion is subjected to a slightly negative pressure relative to the atmospheric pressure, so that ink does not leak from non-ejecting nozzles. If the negative pressure is excessive, the surface tension of the meniscus is overcome by the pressure, and air is sucked in through the nozzle. For example, when an ink having a surface tension of 35 [mN/m] is used with a nozzle having a diameter of 18 [μm], the maximum value of the surface tension is 1.98×10$^{-6}$ [N], and the surface tension per unit area of nozzle is 8 [kN/m$^2$]. When this is converted, the value is 81 [gf/cm$^2$], and thus the negative pressure is brought to equilibrium with the meniscus at −810 [mmH$_2$O]. If the negative pressure exceeds this value, the meniscus is destroyed. However, since an actual head has a large number of nozzles, the working precision and surface roughness at the nozzle portion, or defects in the water repellence treatment at the nozzle portion, vibration and the like may cause, in many cases, a back pressure lower than this calculated value, and subsequent destruction of the meniscus. In fact, in experiments, stabilized results are not always obtained because of the instability factors as mentioned previously, but in many instances, the meniscus is destroyed at −100 [mmH$_2$O] to −400 [mmH$_2$O]. Thus, the upper limit of the back pressure is defined as −60 [mmH$_2$O] based on experimental results, with some margin taken into consideration. On the other hand, the lower limit is defined as −20 [mmH$_2$O], so that the ink does not leak even though a back pressure is exerted by environmental changes such as air pressure and temperature, or by vibration. All these values are not theoretically determined values, but are a range of values that are based on experimentation and are capable of obtaining stabilized performance.

Returning to FIG. 1, the withdrawal port 74 of the recording head 50 is connected with a flow channel 130. The flow channel 130 is provided with a pump 132, and the channel end opposite to the withdrawal port 74 is connected to a reservoir tank 134. The ink which has come after circulating through the common flow channel 52, supply channel 60, pressure chamber 58, nozzle flow channel 62, reflux channel 72 and common circulation channel 70 is withdrawn to the reservoir tank 134 after passing through the withdrawal port 74 and the flow channel 130 under the operation of the pump 132.

The flow channel 136 which connects the reservoir tank 134 and the sub-tank 102 is provided with a solvent concentration detector 104, a solvent adding unit 106, a degassing unit 108, a pump 138, and a filter 140, in this sequence from the upstream side (the side of reservoir tank 134) toward the downstream side (the side of sub-tank 102).

When the ink withdrawn into the reservoir tank 134 is returned to the sub-tank 102 via the flow channel 136, first, detection of the solvent concentration is carried out using the solvent concentration detector 104, based on the density, viscosity, flow rate change, electric conductivity or the like of the ink. Subsequently, the solvent in the solvent tank 144 is added to the ink in the flow channel 136 by the solvent adding unit 106, in accordance with the detection results obtained by the solvent concentration detector 104. Thereby, the circulated ink which has passed through the pressure chamber 58 or the nozzle flow channel 62, particularly the ink which has been thickened near the nozzles, may be restored to have an appropriate viscosity. As will be described later, the solvent concentration detected by the solvent concentration detector 104 is sent to the solvent concentration control unit (not shown), and the solvent adding unit 106 is driven under the action of the solvent concentration control unit.

Furthermore, the degassing unit 108 connected to a vacuum pump 146 performs a treatment of reducing the amount of air dissolved in the ink (degassing treatment). Here, when a vacuum degassing unit is provided on the upstream side (the side of recording head 50) of the pump 124 of the second flow channel 118, which connects the sub-tank 102 and the recording head 50, the degassing unit 108 is omitted.

The ink, which has been subjected to the degassing treatment by the degassing unit 108, is returned to the sub-tank 102 by the pump 138 via the filter 140. Then, the ink is supplied again to the recording head 50, together with the ink supplied from the ink tank 100.

According to the configuration of the ink circulation system shown in FIG. 1, since the reservoir tank 134 is disposed between the pump 132 and the solvent adding unit 106 or the degassing unit 108, it may be arranged such that the pressure P3 exerted at the withdrawal port 74 by the pump 132 is not affected by the regeneration treatment such as solvent addition or degassing.

The operation of the ink circulation system in the inkjet head of an exemplary embodiment according to the invention will be explained by referring to FIG. 5.

Figure 5:
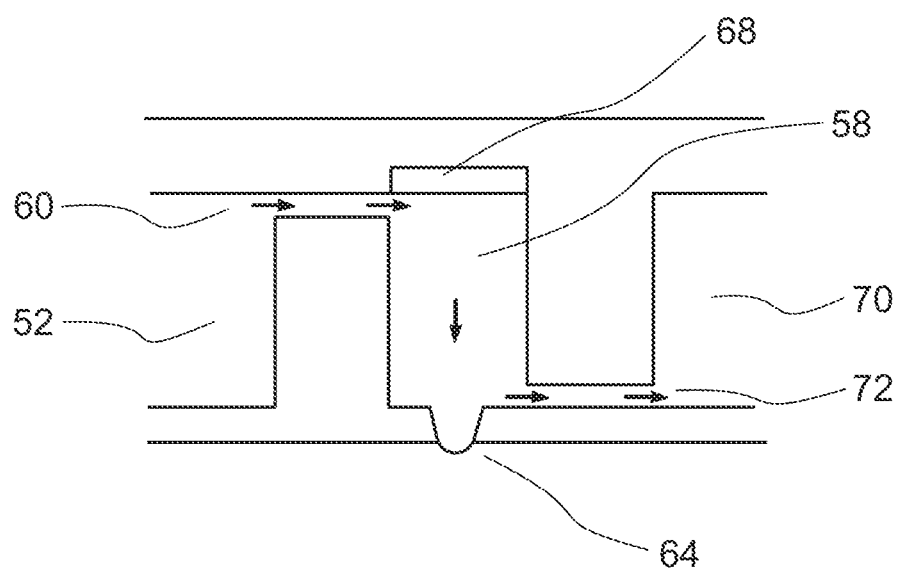
FIG. 5 is an explanatory diagram that explains the flow of ink flowing from a common flow channel to a common circulation channel via a supply channel.

FIG. 5 is an explanatory diagram for ink flow, which shows the flow of ink flowing from the common flow channel 52 to the common circulation channel 70 via the supply channel 60.

In FIG. 5, the ink supplied from the ink tank (not shown in the diagram) flows first to the common flow channel (supply side) 52. Subsequently, the ink is supplied from the common flow channel (supply side) 52 to individual pressure chambers 58 via the supply channel 60. This supply channel 60 is designed such that the inertance is increased, thus preventing the backflow of the ink to the common flow channel (supply side) 52 at the time of ejection. The ink introduced into the pressure chamber 58 is ejected through the nozzle according to the driving of a piezoelectric element (actuator) 68. Also, separately from the action of the piezoelectric element (actuator) 68, the ink is made to flow from the pressure chamber 58 to the common circulation channel (circulation side) 70 via the circulation channel 72 as a result of the pressure difference between the common flow channel (supply side) 52 and the common circulation channel (circulation side) 70. This circulation channel is designed such that the inertance is increased in order to prevent the ink from flowing to the common circulation channel (circulation side) 70 at the time of ejection. The ink that has flowed to the common circulation channel (circulation side) 70 is returned to the ink tank.

The flow of the ink is as described in the following Table 1.

The flow in the circulation is induced by the pressure difference between the liquid at the common flow channel (supply side) and the liquid at the common circulation channel (circulation side). The flow in the ejection is induced by the pressure generated by the pressure element (actuator). This rapid flow hardly occurs at the supply channel and the circulation channel where the inertance is high.

TABLE 1

| [Flow in connection with circulation] | | |
| --- | --- | --- |
| Common flow channel (supply side) → Supply channel → | Pressure chamber → × Nozzle | Circulation channel → Common circulation channel (circulation side) |
| [Flow in connection with ejection] | | |
| Common flow channel (supply side) × Supply channel ← | Pressure chamber → ↓ Nozzle | Circulation channel × Common circulation channel (circulation side) |

In the image forming method of the invention, in which an ink composition containing a silicic acid compound is ejected from an inkjet head which is provided with an ink circulation system, since the ink circulates continuously, changes in physical properties due to drying of the ink are suppressed, intermittent ejection property of the ink is excellent, and even while circulating the ink continuously, elution of the members of the inkjet head into the ink is suppressed, and an image can be formed stably over a long-term.

The inkjet head is equipped with a nozzle plate which is provided with discharge ports (discharge nozzles). Plural discharge nozzles 64 which discharge ink are provided at the nozzle plate.

Figure 6:
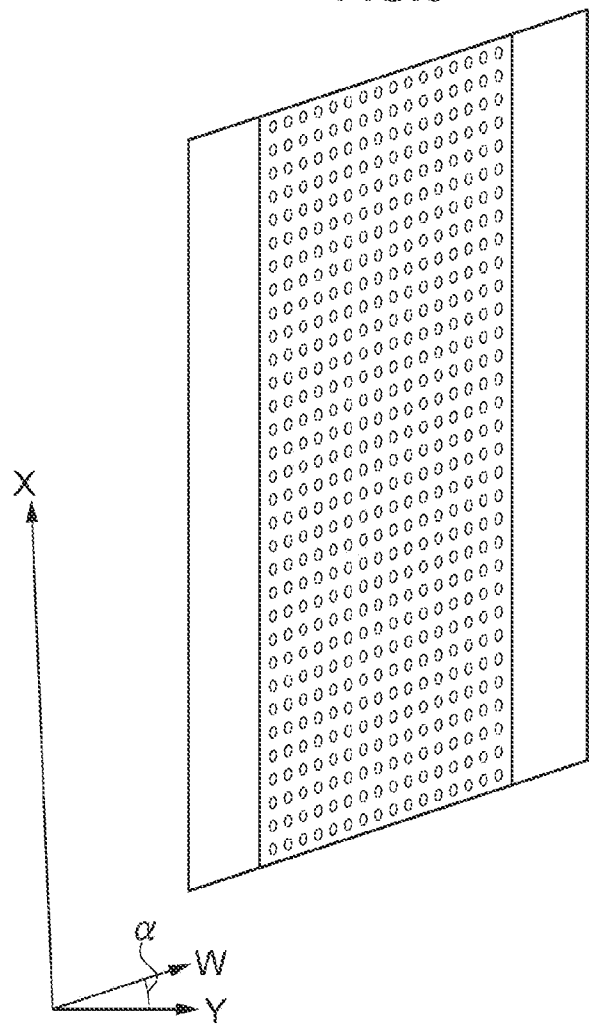
FIG. 6 is a schematic drawing showing one example of the ejection port arrangement of the nozzle plate.

As shown in FIG. 6, the nozzle plate provided with discharge nozzles is provided with 32×64 discharge ports (nozzles) in a two-dimensional array. A part or the entire part of this nozzle plate is made of silicon. The nozzle plate may have a structure in which silicon is exposed at the inner wall of nozzle openings and at the surface on the ink discharge direction side. It is preferred that the surface of the nozzle plate is coated with a film that contains at least one selected from the group consisting of oxides or nitrides of a metal (including silicon) and metals (not including silicon).

Further, the surface of the nozzle plate on the ink discharge direction side may be coated with a liquid repellent film for the purpose of suppressing wettability with the ink and preventing the vicinity of nozzles from being stained with ink. As the liquid repellent film, a film containing fluorocarbon is preferably used.

High quality image recording can be performed with a high resolution of 1200 dpi by high speed single-pass (one pass of the recording medium) due to the nozzle plate. That is to say, plural nozzles of the nozzle plate are disposed two-dimensionally in a matrix form, and an ink supply unit which is fixed to the nozzle has the flow channel configuration allowing large volumes of ink to be ejected with high frequency (ejected with so-called high duty). Silicon, which is easily used in a semiconductor process, is used in part or in the whole in order to obtain a high precise image. Specifically, when a part or the whole of the nozzle plate is formed of silicon, for example, single crystal silicon and polysilicon can be used as silicon. In the nozzle plate formed of silicon, dissolution due to ink is recognized as a general problem, and dissolution prevention using various protective films can be examined. However, it is very difficult task to completely prevent dissolution of the nozzle plate due to ink resulting from defects, or dissolution of the protective film it self, such as silicon oxide, due to ink. In particular, as the frequency of ink ejection, such as in the high speed single-pass type, is high and fresh ink readily contacts the silicon and the protective film at all times, dissolution (erosion or corrosion) of the silicon and the protective film due to ink easily proceeds. Further, in the high speed single-pass type where high precision is demanded, there is high level of a demand for a response to the deterioration of ejection precision due to erosion by ink.

In general, during image formation and during a standby period, the solvent in the ink volatiles from the nozzles, so that the solvent concentration of the ink lowers and viscosity of the ink is increased, and as a result of which, discharge direction failure or lack of discharge is caused. In view of inhibition of this, an inkjet head having a system of circulating a necessary and minimum amount of ink is preferably used. However, even in the system of circulating a necessary and minimum amount of ink, a flesh ink is liable to be in contact continuously due to ink circulation, and as a result of which, there is a problem in that corrosion of silicon and a protective film thereof due to ink is liable to proceed. In embodiments, the ink composition to be used in ejection contains an inorganic silicate compound, and thereby the deterioration of the easily eroded silicon can be effectively prevented.

The nozzle plates can be coated by forming a film which contains at least one kind selected from the group consisting of metal oxide and nitride, and metal (excluding silicon). Specifically, when a part or the whole of the nozzle plate is formed of silicon, for example, single crystal silicon and polysilicon. Further, when a part or the whole of the nozzle plate is formed of silicon, for example, there may be provided a film such as a metal oxide, for example silicon oxide, titanium oxide, chromium oxide, or the like or metal nitride such as titanium nitride, silicon nitride, or the like, or metal such as zirconium, on the single crystal silicon substrate. The silicon oxide may be, for example, $SiO_2$ film formed by oxidizing the whole or a part of the silicon surface of the nozzle plate formed of silicon. A film such as tantalum oxide (preferably, such as tantalum pentoxide ($Ta_2O_5$)) or zirconium, chromium, titanium, glass, or the like may be formed on a part or the entirety of the silicon surface. Further, a part of the silicon may be constituted to be replaced with glass (for example, borosilicate glass, photosensitive glass, quartz glass, soda-lime glass). A film consisting of tantalum pentoxide, or the like as well as tantalum oxide has excellent ink resistance; in particular good dissolution (erosion or corrosion) resistance with respect to alkaline ink is obtained.

Concerning the case in which materials other than the nozzle plate, for example, the ink flow channels where the ink flows and the like are formed with a coated film containing at least one selected from the group consisting of oxides or nitrides of a metal and metals (not including silicon), examples substantially similar to the above can be described.

Figure 7:
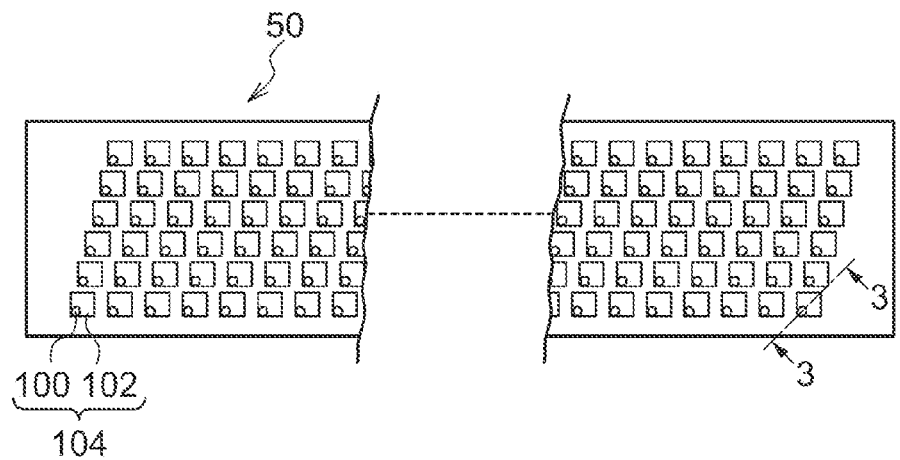
FIG. 7 is a plane perspective diagram showing one example of head structure.
Figure 8:
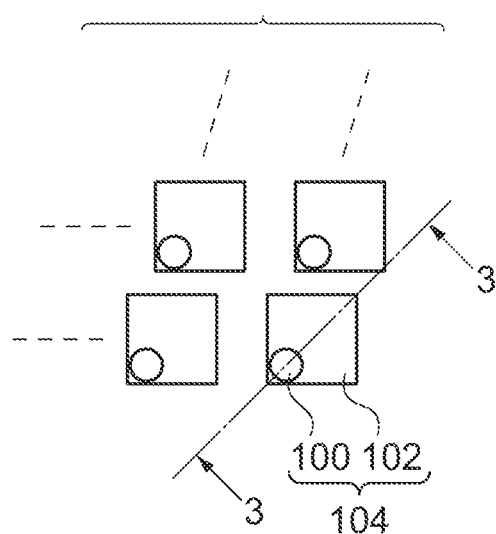
FIG. 8 is a magnified drawing magnifying and showing a part of FIG. 7.

The configuration example of the inkjet head including the nozzle plate which is provided with plural ejection ports (nozzles) which are arranged two-dimensionally is described in reference to FIG. 7 to FIG. 8. FIG. 7 is a plane perspective diagram showing one example of the head structure, and FIG. 8 is a magnified drawing magnifying and showing a part of FIG. 7.

In order to densify dot pitch recorded on the recording medium, it is necessary that the nozzle pitch is densified in head 50. The head 50 has a structure where plural ink chamber units 104 which consist of nozzle 100 ejecting the ink droplets and pressure chamber 102 corresponding to the nozzle 100 is disposed in zigzag in a matrix form, as showed in FIGS. 7 and 8. Thereby, an apparent densified nozzle pitch is attempted. That is to say, the head 50 is a full line head which provides at least one nozzle row where the plural nozzles 100 ejecting ink are arranged over the length corresponding to the whole width of the recording medium in the direction (principal scanning direction) substantially orthogonal to the transfer direction (sub-scanning direction) of the recording medium, as shown in FIGS. 7 and 8.

Figure 9:
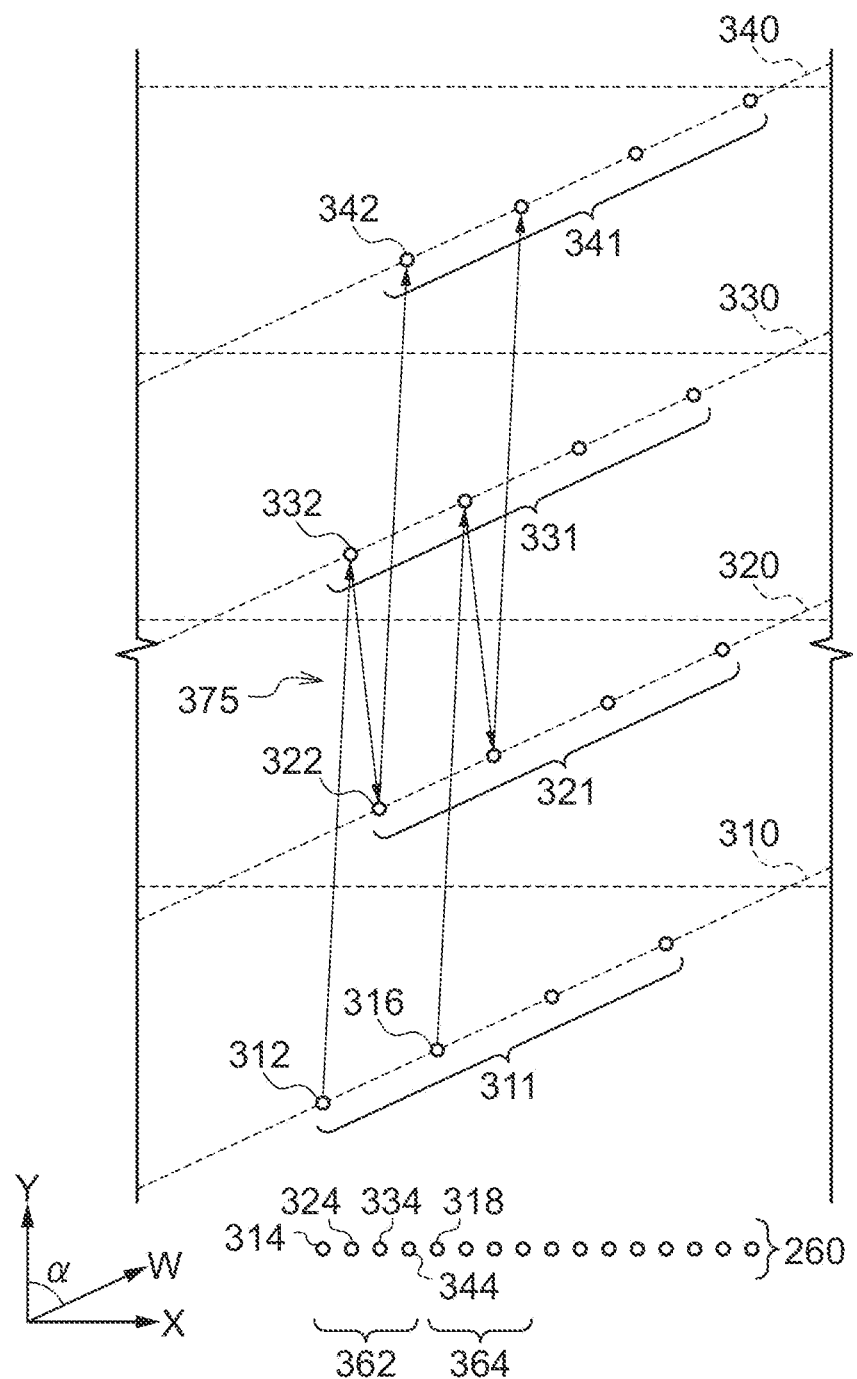
FIG. 9 is a magnified drawing magnifying and showing a part of two dimensional nozzle arrangement (32×64).

One example of a case where ink is ejected from the nozzle plate which is provided with the plural nozzles is described in reference to FIG. 9. In FIG. 9, four rows of nozzle rows from 311 to 341 are shown, but substantially, the total of 64 rows are disposed in one head module with a repeated arrangement pattern in the same manner as the four rows. 32 nozzles are arranged in each nozzle row. In FIG. 9, Y direction is paper transfer direction (sub-scanning direction), and X direction is longitudinal direction (principal scanning direction) of the line head. When one principal scanning line 260 is ejected, dot 314 is ejected from nozzle 312 of nozzle row 311. The dot 324 adjacent to dot 314 in the principal scanning direction is ejected from nozzle 332 of nozzle row 331 in the next two rows with respect to nozzle row 311. The dot 334 adjacent to dot 324 in the principal scanning direction is ejected from nozzle row 322 of nozzle row 321 adjacent to nozzle row 311. The dot 344 adjacent to dot 334 in the principal scanning direction is ejected from nozzle 342 of nozzle row 341 in the next three rows with respect to nozzle row 311. Thus, four nozzle rows are used one by one in the prescribed pattern (nozzle sequence 375 in FIG. 9), and the adjacent dot (for example, a group of adjacent four dots such as 362 or 364 in FIG. 9) in the principal scanning direction is ejected.

—Ink Composition—

The ink composition according to the present invention is configured to include at least a silicic acid compound, and generally, a colorant is also included in the ink composition. Preferably, the ink composition is configured to further include a pigment, a water-soluble organic solvent, and polymer particles. Moreover, the ink composition may be configured to further include other component, as necessary.

[Silicic Acid Compound]

The ink composition according to the present invention includes at least one selected from silicic acid compounds. When the ink composition includes a silicic acid compound, elution into the ink or corrosion of the ink-contacting portion of the inkjet head may be inhibited, particularly in the case of forming an image by using an inkjet head equipped with an ink circulation system. Further, lowering of the liquid repellency of the inkjet head (lowering of the contact angle) may also be inhibited.

The silicic acid compound may be widely selected from among silicic acid, silicates, and ammonium salts of silicic acid. Particularly, an alkali metal salt of silicic acid or an alkaline earth metal salt of silicic acid such as sodium silicate, potassium silicate, calcium silicate, magnesium silicate, or the like, an ammonium salt of silicic acid, or silicic anhydride (silica) is preferable as the silicic acid compound. As the silicate, an alkali solution of an alkali metal salt of silicic acid, which is called water glass, is preferably used. There is no particular limitation concerning the silicic anhydride (silica), but colloidal silica is preferably used as the silicic anhydride (silica). Among them, water-solublilizable silicate and colloidal silica are preferable.

Examples of the water-solubilizable silicate include an alkali metal salt of silicic acid and an ammonium salt of silicic acid. Herein, "water-solublilizable" means dissolving in water at a proportion of 1% by mass or more under the condition of water temperature of 20° C.

As far as the alkali metal salt of silicic acid is a compound which is constituted by silicon dioxide and metallic oxide and has water solubility, it is not particularly limited. The alkali metal salt of silicic acid includes alkali metal salt of metasilicic acid, alkali metal salt of orthosilicic acid, or the like. Further, an ammonium salt of silicic acid including an ammonium salt of metasilicic acid, ammonium salt of orthosilicic acid, or the like may be also used. The silicate salt having water solubility may be used alone or in a combination with two or more kinds thereof.

The water soluble alkali metal or ammonium salt of silicic acid is preferably at least one kind of compound represented by the following formula (1).

$$x(A_2O) \cdot y(SiO_2) \quad \text{Formula (1)}$$

In Formula (1), A represents sodium, potassium, or tetraalkylammonium($NR_4$), x represents 1 or 2, y represents an integer of 1 to 4, R represents an alkyl group having 1 to 4 carbon atoms, such as a methyl group, an ethyl group, a propyl group, or a butyl group.

In the case where the compound represented by Formula (1) above is an alkali metal salt of silicic acid (A=an alkali metal), when x=1 and y=1, the compound is an alkali metal salt of metasilicic acid, and when x=2 and y=1, the compound is an alkali metal salt of orthosilicic acid, each of which is an alkali metal salt of silicic acid that exhibits solubility in water.

In the case where the compound represented by Formula (1) above is an ammonium salt of silicic acid (A=tetraalkylammonium), when x=1 and y=1, the compound is a tetraalkylammonium salt of metasilicic acid, and when x=2 and y=1, the compound is a tetraalkylammonium salt of orthosilicic acid, each of which is an ammonium salt of silicic acid that exhibits solubility in water.

As the water soluble alkali metal salt of silicic acid, a commercially available compound (for example, water glass) may be used, or a compound obtained by melting silicic acid and a carbonate or hydroxide of an alkali metal may be used. Further, as the water-soluble ammonium salt of silicic acid, a commercially available compound may be used, or a compound obtained by preparation may be used.

Among them, from the viewpoints of suppressing dissolution of the portion contacting the ink composition of the inkjet head (particularly, nozzle plate or ink flow channel), and an erosion according to the dissolution, incorporating at least one kind selected from alkali metal salt of silicic acid such as sodium silicate and potassium silicate, and tetramethylammonium salt of silicic acid in the ink composition is preferable. Among them, the alkali metal salt of silicic acid renders to obtain good ink dispersibility to the ink composition in comparison with salt other than alkali metal, for example ammonium salt of silicic acid (for example, tetramethyl ammonium salt of silicic acid, or the like). Further, in the case of ammonium salt, or the like, a volatile compound can be produced in some cases, and thus an alkali metal salt of silicic acid is preferable from the viewpoint that over time odors are hardly generated.

Colloidal silica is colloid that comprises fine particles of inorganic oxides including silicon, in which an average particle diameter of the fine particles is several hundred nm or less. Colloidal silica includes silicon dioxide (including hydrates thereof) as a main component and may contain aluminate as a minor component. Examples of the aluminate, which may be contained as a minor component, include sodium aluminate and potassium aluminate.

Further, inorganic salts such as sodium hydroxide, potassium hydroxide, lithium hydroxide, and ammonium hydroxide or organic salts such as tetramethylammonium hydroxide may be contained in the colloidal silica. These inorganic salts and organic salts function, for example, as a stabilizer of colloid.

The dispersing medium for colloidal silica is not particularly limited and may be any of water, an organic solvent, or a mixture of water and an organic solvent. The organic solvent may be a water-soluble organic solvent or a water-insoluble organic solvent. However, the organic solvent is preferably a water-soluble organic solvent. Specific examples thereof include methanol, ethanol, isopropyl alcohol, and n-propanol.

There is no particular limitation on the method for producing colloidal silica, and colloidal silica can be produced by a generally used method. For example, colloidal silica can be produced through an Aerosil synthesis by thermal decomposition of silicon tetrachloride, or may be produced from water glass. Alternatively, colloidal silica can be produced according to a liquid phase synthesis method including hydrolysis of an alkoxide (see, for example, "Seni to Kogyo", vol. 60, No. 7, page 376, 2004), or the like.

There is no particular limitation on the average particle diameter of the particles contained in the colloidal silica according to the present invention. For example, the average particle diameter may be set from 1 nm to 200 nm. The average particle diameter is preferably from 1 nm to 100 nm, more preferably from 3 nm to 50 nm, even more preferably from 3 nm to 25 nm, and particularly preferably from 5 nm to 20 nm.

When the average particle diameter is 200 nm or less, damages (for example, shape deformation due to dissolution of the nozzle plate, lowering of liquid repellency or the like) caused by ink to the members which construct the inkjet head, such as a substrate, a protective film, a liquid-repellent film, and the like, may be more effectively suppressed. It is thought that, by making the average particle diameter smaller, a total surface area of particles increases, so that damages to the members which construct the inkjet head is more effectively suppressed. Moreover, it is preferable that the average particle diameter of the particles is 200 nm or less, also from the viewpoints of discharge reliability of the ink composition and suppression of the abrasive effect caused by the particles.

In the present invention, the average particle diameter of the colloidal silica is represented by a volume average particle diameter. The volume average particle diameter can be determined according to a general method for dispersed particles such as a light scattering method or a laser diffraction method.

The shape of the colloidal silica is not particularly limited so long as it does not disturb the ejection performance of the ink. For example, the shape may be a spherical shape, a long shape, a needle-like shape, or a shape like a string of beads. Above all, it is preferred that the colloidal silica is spherical, from the viewpoint of dischargeability of ink.

The colloidal silica, which can be used in the present invention, may be produced by the production method described above, or may be a commercially available product. Specific examples of the commercially available product include LUDOX AM, LUDOX AS, LUDOX LS, LUDOX TM, and LUDOX HS (all trade names, manufactured by E.I. Du Pont de Nemours & Co.); SNOWTEX S, SNOWTEX XS, SNOWTEX 20, SNOWTEX 30, SNOWTEX 40, SNOWTEX N, SNOWTEX C, and SNOWTEX O (all trade names, manufactured by Nissan Chemical Industries, Ltd.); SYTON C-30 and SYTON ZOO (all trade names, manufactured by Monsanto Co.); NALCOAG-1060 and NALCOAG-ID21 to 64 (all trade names, manufactured by Nalco Chem. Co.); METHANOL SOL, IPA SOL, MEK SOL, and TOLUENE SOL (all trade names, manufactured by Fuso Chemical Co., Ltd.), CATALOID-S, CATALOID-F120, CATALOID SI-350, CATALOID SI-500, CATALOID SI-30, CATALOID S-20L, CATALOID S-20H, CATALOID S-30L, CATALOID S-30H, CATALOID SI-40, and OSCAL-1432 (isopropyl alcohol sol) (all trade names, manufactured by JGC Catalysts and Chemicals Ltd.); ADELITE (trade name, manufactured by Asahidenka Co., Ltd.); and, as examples of colloidal silica in the shape of a string of beads, SNOWTEX ST-UP, SNOWTEX PS-S, SNOWTEX PS-M, SNOWTEX ST-OUP, SNOWTEX PS-SO, and SNOWTEX PS-MO (all trade names, manufactured by Nissan Chemical Industries, Ltd.). These products are easily available.

The pH of the above commercially available colloidal silica dispersion liquid is often adjusted to pH of acidic or alkaline. This is because the region where colloidal silica is stably dispersed exists in an acidic side or alkaline side. In the case of adding a commercially available colloidal silica dispersion liquid to the ink composition, the pH of the region where the colloidal silica is stably dispersed and the pH of the ink composition should be taken in consideration.

The total amount of the silicic acid compounds contained in the ink composition is not particularly limited. For example, the total content of the silicic acid compounds can be set to be from 0.0001% by mass to 1% by mass with respect to the total amount (total mass) of the ink composition. The total content of the silicic acid compounds is preferably from 0.0005% by mass to 0.5% by mass, more preferably from 0.001% by mass to 0.5% by mass, even more preferably from 0.01% by mass to 0.5% by mass, and particularly preferably from 0.01% by mass to 0.3% by mass, with respect to the total amount (total mass) of the ink composition. When the total content of the silicic acid compounds in the ink composition is equal to or lower than the upper limit described above, the ejection property of the ink composition is further improved, and the influence of the abrasive effect of silica particles upon the inkjet head can be further effectively suppressed. Further, when the total content of the silicic acid compounds is equal to or more than the lower limit described above, the shape deformation caused by corrosion of the head members such as the nozzle plate or ink flow channels, or the lowering of liquid repellency when the head members have been subjected to a liquid repellent treatment can be further effectively suppressed.

Further, in the ink composition of the exemplary embodiment of the invention, it is preferable that the content of colloidal silica which has volume average particle diameter of 3 nm to 25 nm is 0.001% by mass to 0.5% by mass with respect to the total amount of the ink composition, from the viewpoints of suppression of the shape deformation and the decrease in liquid repellent property of the inkjet head member such as the nozzle plate or the ink flow channel, and the ink ejection properties. It is more preferred that the content of colloidal silica which has volume average particle diameter of 3 nm to 20 nm is 0.005% by mass to 0.5% by mass (more preferably 0.01% by mass to 0.3% by mass) of the total amount of the ink composition.

[Colorant]

The ink composition of the exemplary embodiment of the invention can contain color elements such as pigments or dyes as colorants. In embodiments, it is preferred to contain at least one kind of pigment which is coated with a water-insoluble resin including a structural unit having an acidic group. Thereby, the ink composition of the exemplary embodiment of the invention is excellent in ink ejection reliability and is excellent in abrasion resistance of the formed image therewith. In this case, a specific form of pigment is not particularly limited, as long as there is a form where the whole or a part of the surface of the pigment particles is coated with the water insoluble resin.

<Pigment>

The pigment used in the exemplary embodiment of the invention is not particularly limited, and may be appropriately selected according to the intended use. The pigment includes an organic pigment and an inorganic pigment.

Examples of the organic pigment include azo pigments, polycyclic pigments, dye chelates, nitro pigments, nitroso pigments, and aniline black. Among them, azo pigments and polycyclic pigments are more preferable.

Examples of the azo pigments include azo lakes, insoluble azo pigments, condensed azo pigments, and chelate azo pigments.

Examples of the polycyclic pigment include phthalocyanine pigments, perylene pigments, perinone pigments, anthraquinone pigments, quinacridone pigments, dioxazine pigments, indigo pigments, thioindigo pigments, isoindolinone pigments, and quinophthalone pigments.

Examples of the dye chelates include basic dye chelates and acidic dye chelates.

Examples of the inorganic pigments include titanium oxide, iron oxide, calcium carbonate, barium sulfate, aluminium hydroxide, barium yellow, cadmium red, chrome yellow, and carbon black. Among them, carbon black is particularly preferable. Carbon black may be produced by a known method such as a contact method, a furnace method, or a thermal method.

These pigments may be used alone or in a combination of two or more of them selected from one or more groups above.

(Water-Insoluble Resin)

The water-insoluble resin contains at least one structural unit having an acidic group, and may further contain one or more other structural unit(s) if necessary. In preferable embodiments, in view of achieving stable presence in the ink composition, reducing adhering and accumulation of aggregates, and enabling easy removal of adhered aggregates, the water-insoluble resin may preferably contain at least one hydrophilic structural unit (A) and at least one hydrophobic structural unit (B). In more preferable embodiments, the acidic group may be contained in one of the hydrophilic structural unit (A).

The "water-insoluble polymer" herein refers to a polymer whose dissolved amount to 100 g of water at 25° C. is 5 g or smaller when the polymer is dissolved in the water. The "dissolved amount" is an amount of (a part of) the water-insoluble polymer dissolved in a solvent (water) when acidic groups of the water-insoluble polymer are completely neutralized with sodium hydroxide.

Hydrophilic Structural Unit

There is no particular limitation to the hydrophilic structural unit in the water-insoluble polymer as long as it contains at least one hydrophilic functional group. The hydrophilic structural unit may contain an ionic hydrophilic group or a nonionic hydrophilic group. In preferable embodiments, the hydrophilic structural unit may have an acidic group. The hydrophilic structural unit having an acidic group may be derived from a monomer including an acidic group, or may be a structural unit formed by introducing, by a macromolecular reaction, an acidic group to a structural unit having no acidic group in a polymer chain which has been formed by polymerization.

The acid group is not particularly limited and may include, from the viewpoint of stability of the emulsion state or dispersion state, a carboxy group, a phosphoric acid group, and a sulfonic acid group. Among these, a carboxy group is preferable from the viewpoint of dispersion stability in an ink composition.

As a monomer having an acid group (acid group containing monomer), a monomer having an acid group and an ethylenically unsaturated bond is preferable. Examples of the monomer having an acid group may include an unsaturated carboxylic acid monomer, an unsaturated sulfonic acid monomer, and an unsaturated phosphoric acid monomer.

Examples of the unsaturated carboxylic monomer may include acrylic acid, methacrylic acid, crotonic acid, itaconic acid, maleic acid, fumaric acid, citraconic acid, and 2-methacryloyloxymethyl succinic acid. Examples of the unsaturated sulfonic acid monomer may include styrenesulfonic acid, 2-acrylamido-2-methylpropanesulfonic acid, 3-sulfopropyl(meth)acrylate, and bis(3-sulfopropyl) itaconate. Examples of the unsaturated phosphoric acid monomer may include vinylphosphonic acid, vinyl phosphate, bis(methacryloxyethyl) phosphate, diphenyl-2-acryloyloxyethyl phosphate, diphenyl-2-methacryloyloxyethyl phosphate, and dibutyl-2-acryloyloxyethyl phosphate.

Among the acid group containing monomers, from the viewpoints of dispersion stability and ejection stability, an unsaturated carboxylic monomer is preferable, and acrylic acid and methacrylic acid are more preferable. Specifically, the structural unit having an acid group is preferably a structural unit derived from (meth)acrylic acid.

In the water-insoluble resin, either or both of a structural unit derived from acrylic acid and a structural unit derived from methacrylic acid are preferably incorporated.

When the hydrophilic group includes a basic group, examples of the basic group include an amino group and an amido group in which a nitrogen atom is unsubstituted.

Examples of the hydrophilic structural unit (A) having a basic group include a structural unit derived from a monomer having a basic hydrophilic group. Examples of the monomer having a basic hydrophilic group include (meth)acrylate having a basic hydrophilic group, (meth)acrylamide having a basic hydrophilic group, and vinyl monomers such as vinyl esters having a basic hydrophilic group.

A monomer which provides the hydrophilic structural unit having a basic hydrophilic group may preferably have a functional group which can form a polymer such as an ethylenically unsaturated bond and a basic hydrophilic functional group. Such monomer may be selected from known monomers, and specific examples thereof which may be preferably used include (meth)acrylamides, aminoethyl(meth)acrylates, and aminopropyl (meth)acrylates.

When the hydrophilic group includes a nonionic hydrophilic group, examples of the nonionic hydrophilic group include a hydroxyl group and alkylene oxides such as polyethylene oxide or polypropylene oxide described below.

Examples of the hydrophilic structural unit (A) having a nonionic hydrophilic group include a unit derived from a monomer having a nonionic hydrophilic group. Examples of the monomer having a nonionic hydrophilic group include (meth)acrylate having a nonionic hydrophilic group, (meth)acrylamide having a nonionic hydrophilic group, and vinyl monomers such as vinyl esters having a hydrophilic group.

The monomer that forms the hydrophilic structural unit having a nonionic hydrophilic group is preferably a monomer that has a functional group capable of forming a polymer such as an ethylenically unsaturated bond and a nonionic hydrophilic functional group, and may be selected from known monomers. Preferable specific examples of the monomer may include hydroxylethyl(meth)acrylate, hydroxybutyl (meth)acrylate, and (meth)acrylate that contains an alkyleneoxide polymer.

The hydrophilic structural unit (A) having a nonionic hydrophilic group may be formed by polymerization of corresponding monomers, but may be formed by introducing a hydrophilic functional group into a polymer chain after polymerization.

As the hydrophilic structural unit having a nonionic hydrophilic group, a hydrophilic structural unit having an alkylene oxide structure is more preferable. As the alkylene moiety of the alkylene oxide structure, from the viewpoint of hydrophilicity, an alkylene moiety having 1 to 6 carbon atoms is preferable, an alkylene moiety having 2 to 6 carbon atoms is more preferable, and an alkylene moiety having 2 to 4 carbon atoms is particularly preferable. The polymerization degree of the alkylene oxide structure is preferably 1 to 120, more preferably 1 to 60, and particularly preferably 1 to 30.

In a preferable embodiment, the hydrophilic structural unit having a nonionic hydrophilic group is a hydrophilic structural unit having hydroxy group. The number of hydroxy groups in the structural unit is not particularly limited and is preferably 1 to 4, more preferably 1 to 3, and still more preferably 1 or 2, from the viewpoints of the hydrophilicity of the water-insoluble resin and compatibility with a solvent and other monomers at the time of polymerization.

In the foregoing description, the content of the hydrophilic structural unit varies, for example, depending on the ratio of the hydrophobic structural unit (B) described later. For example, when the water-insoluble resin is composed of acrylic acid and/or methacrylic acid (hydrophilic structural unit (A)) and the hydrophobic structural unit (B) described later, the content of acrylic acid and/or methacrylic acid is determined by "100–(% by mass of the hydrophobic structural unit)".

The hydrophilic structural units (A) may be used alone or as a mixture of two or more of them.

—Hydrophobic Structural Unit—

In embodiments, the water-insoluble polymer may preferably further have at least one hydrophobic structural unit (B) other than the structural unit having an acidic group. There is no particular limitation to the hydrophobic structural unit in the water-insoluble polymer as long as it contains at least one hydrophobic functional group. In embodiments, the hydrophobic structural unit may preferably include at least one structural unit having an aromatic ring, and may more preferably include a structural unit represented by the following Formula (1).

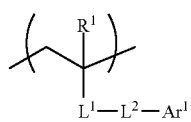

Formula (1)

In Formula (1), $R_1$ represents a hydrogen atom or a methyl group. $L_1$ represents an unsubstituted or substituted phenylene group. $L_2$ represents a single bond or a divalent linking group. $Ar^1$ represents a monovalent group derived from a condensed aromatic ring having 8 or more carbon atoms, a heterocycle having an aromatic ring condensed therein, or a compound having two or more benzene rings linked to each other.

In Formula (1), $R_1$ represents a hydrogen atom or a methyl group, and preferably a methyl group.

$L_1$ represents an unsubstituted or substituted phenylene group. An unsubstituted phenylene group is preferable as $L_1$. $L_2$ represents a single bond or a divalent linking group. The divalent linking group is preferably a linking group having 1 to 30 carbon atoms, more preferably a linking group having 1 to 25 carbon atoms, even more preferably a linking group having 1 to 20 carbon atoms, and particularly preferably a linking group having 1 to 15 carbon atoms. Particularly preferable examples of the linking group include an alkyleneoxy group having 1 to 25 carbon atoms (more preferably 1 to 10 carbon atoms), an imino group (—NH—), a sulfamoyl group, a divalent linking group including an alkylene group such as an alkylene group having 1 to 20 carbon atoms (more preferably 1 to 15 carbon atoms) or an ethylene oxide group [—(CH$_2$CH$_2$O)$_n$—, n=1 to 6], and a combination of two or more thereof.

$Ar^1$ represents a monovalent group derived from a condensed aromatic ring having 8 or more carbon atoms, a heterocycle having an aromatic ring condensed therein, or a compound having two or more benzene rings linked to each other.

The "condensed aromatic ring having 8 or more carbon atoms" may be an aromatic ring having two or more benzene rings condensed therein or an aromatic ring having 8 or more carbon atoms composed of at least one aromatic ring and a ring formed by an alicyclic hydrocarbon condensed with the aromatic ring. Specific examples include naphthalene, anthracene, fluorene, phenanthrene, and acenaphthene.

The "heterocycle having an aromatic ring condensed therein" is a compound consisting of a heteroatom-free aromatic compound (preferably a benzene ring) and a heteroatom-containing cyclic compound condensed with each other. The heteroatom-containing cyclic compound is preferably a five- or six-membered ring. The heteroatom is preferably a nitrogen atom, an oxygen atom or a sulfur atom. The heteroatom-containing cyclic compound may have a plurality of heteroatoms. In this case, the heteroatoms may be the same as or different from each other. Specific examples of the heterocycle having an aromatic ring condensed therein include phthalimide, acridone, carbazole, benzoxazole, and benzothiazole.

Specific examples of the monovalent group derived from a compound having two or more benzene rings linked to each other include a biphenyl group, a terphenyl group, a diphenylmethyl group, a triphenylmethyl group and the like.

Specific examples of monomers that forms the structural unit represented by Formula (1) include the following monomers. The present invention is not limited to these monomers.

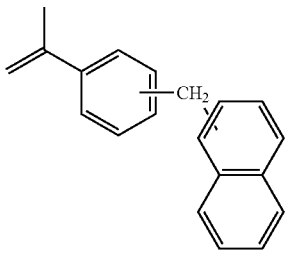

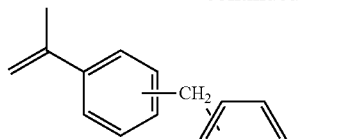

-continued

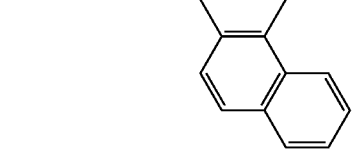

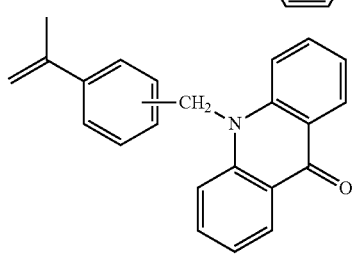

M-25/M-27

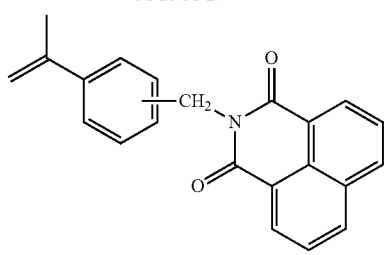

M-28/M-29
M-25/M-27

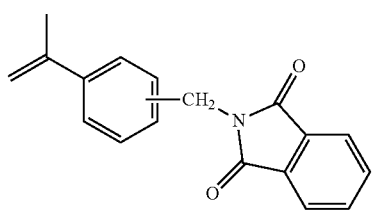

M-28/M-29

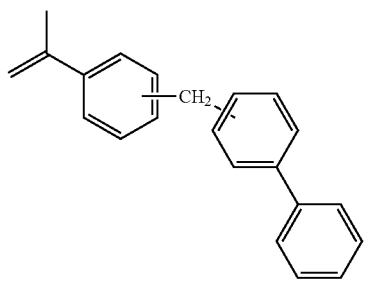

M-25/M-27 represents a mixture of monomers M-25 and M-27, each of which has the substituent at m- or p-position.

M-28/M-29 represents a mixture of monomers M-28 and M-29, each of which has the substituent at m- or p-position.

$Ar^1$ in the structural unit represented by Formula (1) is preferably a monovalent group derived from acridone or phthalimide from the viewpoint of the dispersion stability of the coated pigment, and more preferably a monovalent group derived from acridone.

As the structural unit represented by Formula (1), from the viewpoint of dispersion stability of the pigment, a structural unit that is specified by selecting an unsubstituted phenylene group as $L_1$, a divalent linking group (preferably methylene) as $L_2$, and a monovalent group derived from acridone as $Ar^1$ is preferable.

The content of the structural unit represented by Formula (1) in the copolymer is preferably in the range of from 5% by mass to 25% by mass, with respect to the total mass of the copolymer, and more preferably in the range of from 10% by mass to 18% by mass.

When the content is 5% by mass or more, generation of image defects such as white spots tends to be suppressed markedly desirably, on the other hand, when the content is 25% by mass or less, problems of production suitability caused by lowering the solubility of the copolymer in a polymerization reaction liquid (for example, methyl ethyl ketone) tend not to be brought about desirably.

The water-insoluble resin in the preferable exemplary embodiment of the invention may include a structural unit represented by the following Formula (2) other than the structural unit represented by Formula (1).

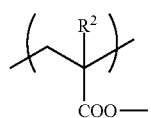

Formula (2)

In Formula (2), $R^2$ represents a hydrogen atom or a methyl group, and preferably a methyl group.

$Ar^2$ represents a monovalent group derived from an unsubstituted or substituted aromatic ring (aromatic ring group). When the aromatic ring is substituted by a substituent, examples of the substituent include a halogen atom, an alkyl group, an alkoxy group, a hydroxy group, a cyano group and, an alkoxycarbonyl group, and the aromatic ring may form a condensed ring. When the aromatic ring forms a condensed ring, the condensed ring may be, for example, a condensed aromatic ring having 8 or more carbon atoms, or an aromatic ring having a heterocycle condensed therein. Further, $Ar^2$ may be a monovalent group derived from a compound having two or more aromatic rings linked to each other.

In Formula (2), each of "a condensed aromatic ring having 8 or more carbon atoms" and "an aromatic ring having a heterocycle condensed therein" has the same definition as "a condensed aromatic ring having 8 or more carbon atoms" and "an aromatic ring having a heterocycle condensed therein" in Formula (1) respectively. Further, "a monovalent group derived from a compound having two or more aromatic rings linked to each other" in Formula (2) preferably includes "a monovalent group derived from a compound having two or more aromatic rings linked to each other" in Formula (1).

The aromatic ring group represented by $Ar^2$ is linked via an ester group and an ethylene oxide chain to the main chain of the water-insoluble resin, and the aromatic ring group is not directly linked to the main chain, and thus a suitable distance is maintained between the hydrophobic aromatic ring and the hydrophilic structural unit, so that the water-insoluble resin interacts readily with, and is adsorbed firmly onto, a pigment to improve dispersibility.

In particular, the aromatic ring group represented by $Ar^2$ is preferably an unsubstituted phenyl group or an unsubstituted naphthyl group, and particularly preferably an unsubstituted phenyl group.

n is an average repeating number of the ethyleneoxy units in the water-insoluble resin used for the resin-coated pigment contained in the aqueous ink composition. n is in the range of 1 to 6, and preferably 1 to 2.

Specific examples of monomers that forms the structural unit represented by Formula (2) include the following monomers.

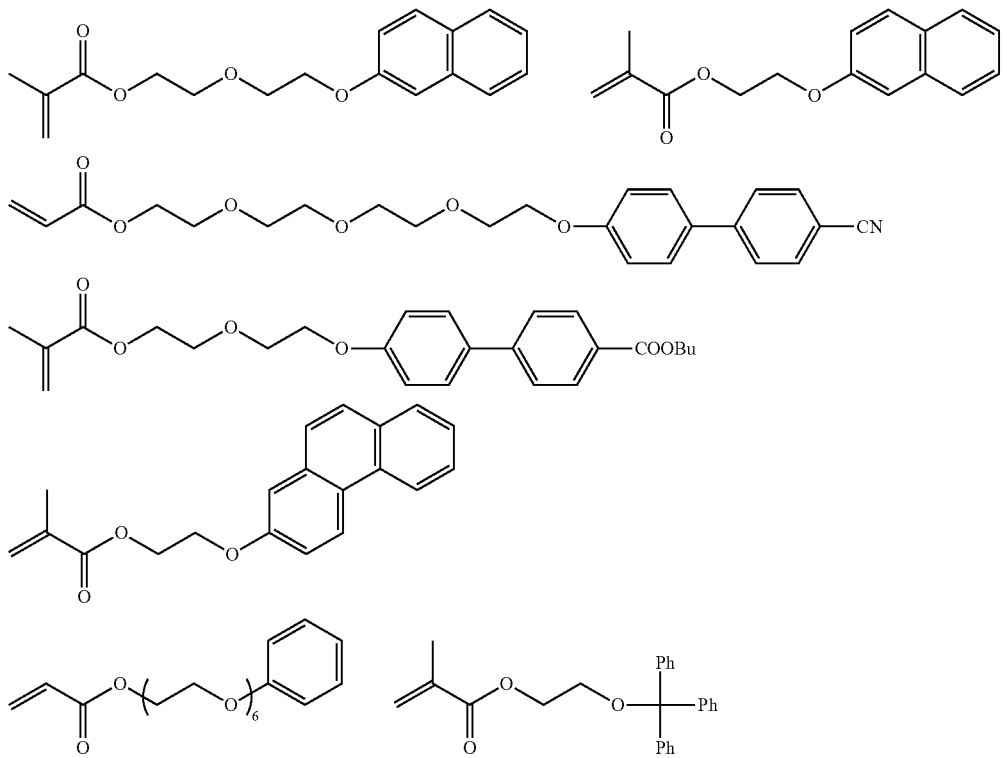

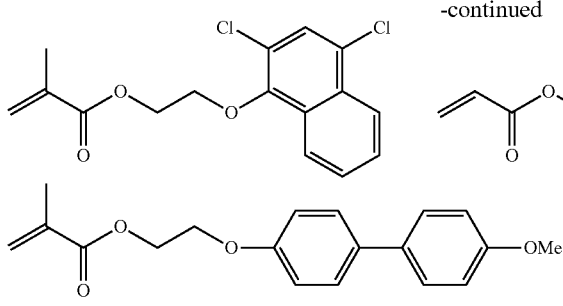
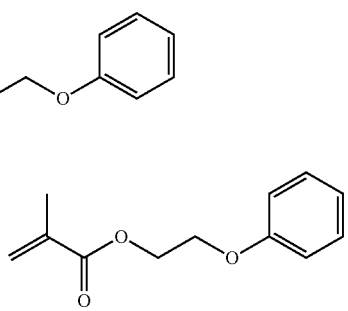

From the viewpoint of dispersion stability, it is particularly preferable that in the structural unit represented by Formula (2), $R^2$ is a methyl group, $Ar^2$ is an unsubstituted phenyl group, and n is 1 to 2.

The content of the structural unit of Formula (1) in the water-insoluble resin is preferably in the range of 30% by mass to 70% by mass, and more preferably in the range of 40% by mass to 50% by mass, based on the total mass of the water-insoluble resin. When the content is 30% by mass or more, dispersibility is good, and when the content is 70% by mass or less, the adhesion and deposition of the aggregate may be prevented, the removability of adhered aggregate (maintenance properties) is good, and generation of imaging defects such as white spots may be prevented.

The water-insoluble resin in the exemplary embodiment of the invention is preferably a resin including a hydrophilic structural unit (A) and a hydrophobic structural unit (B), from the viewpoint of allowing the water-insoluble resin to be stably present in an aqueous ink, to reduce adhesion or deposition of the aggregate, and to facilitate removal of the adhered aggregate. Herein, the hydrophobic structural unit (B) preferably includes the structural unit represented by Formula (1) or Formula (2) above.

The water-insoluble resin of the present invention may further have an additional hydrophobic structural unit (B') other than the structural unit represented by Formula (1) and the structural unit represented by Formula (2). Examples of the hydrophobic structural unit (B') may include a structural units derived from vinyl monomers such as (meth)acrylates, (meth)acrylamides, styrenes or vinylesters which do not belong to the hydrophilic structural unit (A) (for example, those having no hydrophilic functional group), a hydrophobic structural unit having an aromatic ring that is linked to an atom of the main chain thereof through a linking group, and the like. These structural units may be used one kind alone or two or more kinds in combination.

Examples of the (meth)acrylates include methyl(meth)acrylate, ethyl(meth)acrylate, butyl(meth)acrylate, isobutyl (meth)acrylate, and hexyl(meth)acrylate. Among them, methyl(meth)acrylate, ethyl(meth)acrylate, and butyl(meth)acrylate are preferable, and methyl(meth)acrylate and ethyl (meth)acrylate are particularly preferable.

Examples of the (meth)acrylamides include N-cyclohexyl (meth)acrylamide, N-(2-methoxyethyl)(meth)acrylamide, N,N-diallyl(meth)acrylamide, and N-allyl (meth)acrylamide.

Examples of the styrenes include styrene, methylstyrene, dimethylstyrene, trimethylstyrene, ethylstyrene, isopropylstyrene, n-butylstyrene, tert-butylstyrene, methoxystyrene, butoxystyrene, acetoxystyrene, chlorostyrene, dichlorostyrene, bromostyrene, chloromethylstyrene, hydroxystyrene protected by a group removable with an acidic substance (for example, t-Boc), methyl vinyl benzoate, α-methylstyrene, and vinylnaphthalene. Among them, styrene and α-methylstyrene are preferable.

Examples of the vinyl esters include vinyl acetate, vinyl chloroacetate, vinyl propionate, vinyl butyrate, vinyl methoxyacetate, and vinyl benzoate. Among them, vinyl acetate is preferable.

The above-described "hydrophobic structural unit containing an aromatic ring that is linked to an atom in the main chain via a linking group" is preferably a structural unit wherein the proportion of the aromatic ring linked to an atom in the main chain of the copolymer via a linking group is from 15% by mass to 27% by mass, more preferably from 15% by mass to 25% by mass, and even more preferably from 15% by mass to 20% by mass with respect to the copolymer.

The aromatic ring is linked to the atom in the main chain of the copolymer not directly but via a linking group. Therefore, an adequate distance is kept between the hydrophobic aromatic ring and the hydrophilic structural unit, so that the copolymer readily interacts with the pigment and is firmly adsorbed thereon, thus improving the dispersibility of the pigment.

The "hydrophobic structural unit containing an aromatic ring that is linked to an atom in the main chain via a linking group" is preferably a structural unit represented by the following Formula (3) (excluding the structural unit represented by Formula (1) and the structural unit represented by Formula (2)).

Formula (3)

In Formula (3), $R^H$ represents a hydrogen atom, a methyl group, or a halogen atom. $L^{11}$ represents *—COO—, *—OCO—, *—CONR$^{12}$—, or *—O—, and $R^{12}$ represents a hydrogen atom or an alkyl group having 1 to 10 carbon atoms. In the group represented by $L^{11}$, an asterisk (*) denotes a bond connected to the main chain.

$L^{12}$ represents a single bond or a divalent linking group having 1 to 30 carbon atoms. When $L^{12}$ is a divalent linking group, it is preferably a linking group having 1 to 25 carbon atoms, more preferably a linking group having 1 to 20 carbon atoms, and even more preferably a linking group having 1 to 15 carbon atoms.

Among them, particularly preferable examples include an alkyleneoxy group having 1 to 25 (more preferably 1 to 10 carbon atoms) carbon atoms, an imino group (—NH—), a sulfamoyl group, and divalent linking groups containing an alkylene group, such as an alkylene group having 1 to 20 carbon atoms (more preferably 1 to 15 carbon atoms) or an ethylene oxide group [—$(CH_2CH_2O)_n$—, n=1 to 6], and combinations of two or more of these groups.

In Formula (3), $Ar^{11}$ represents a monovalent group derived from an aromatic ring.

The aromatic ring group which derives the monovalent group represented by $Ar^{11}$ is not particularly limited, and examples of the aromatic ring include a benzene ring, a condensed aromatic ring having eight or more carbon atoms, an aromatic ring condensed with a heterocycle, and a compound having two or more benzene rings linked to each other. The details about the condensed aromatic ring having eight or more carbon atoms, the aromatic ring condensed with a heterocycle, and a compound having two or more benzene rings linked to each other have been described above.

Specific examples of a monomer capable of forming the "hydrophobic structural unit containing an aromatic ring that is linked to an atom in the main chain via a linking group" are shown below. However, the invention is not limited to the following specific examples.

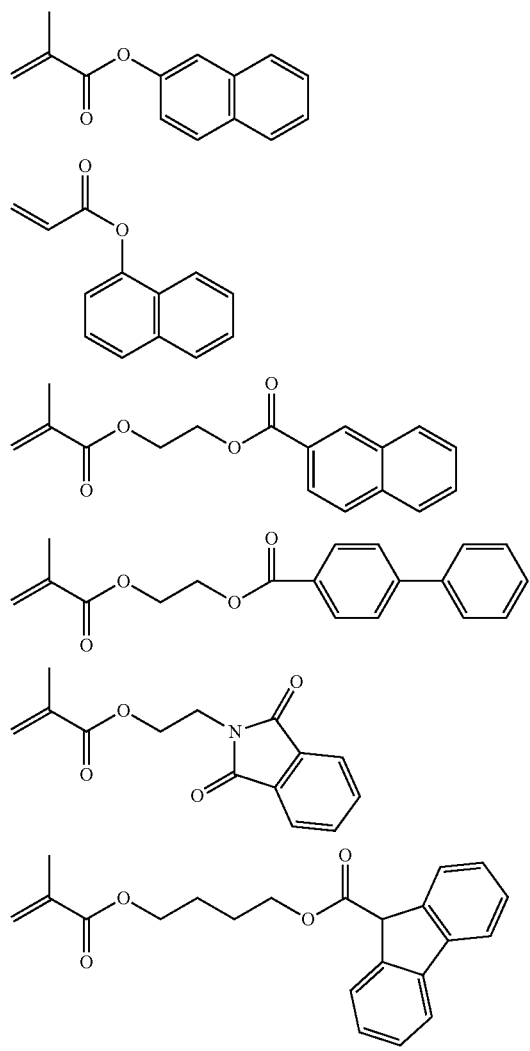

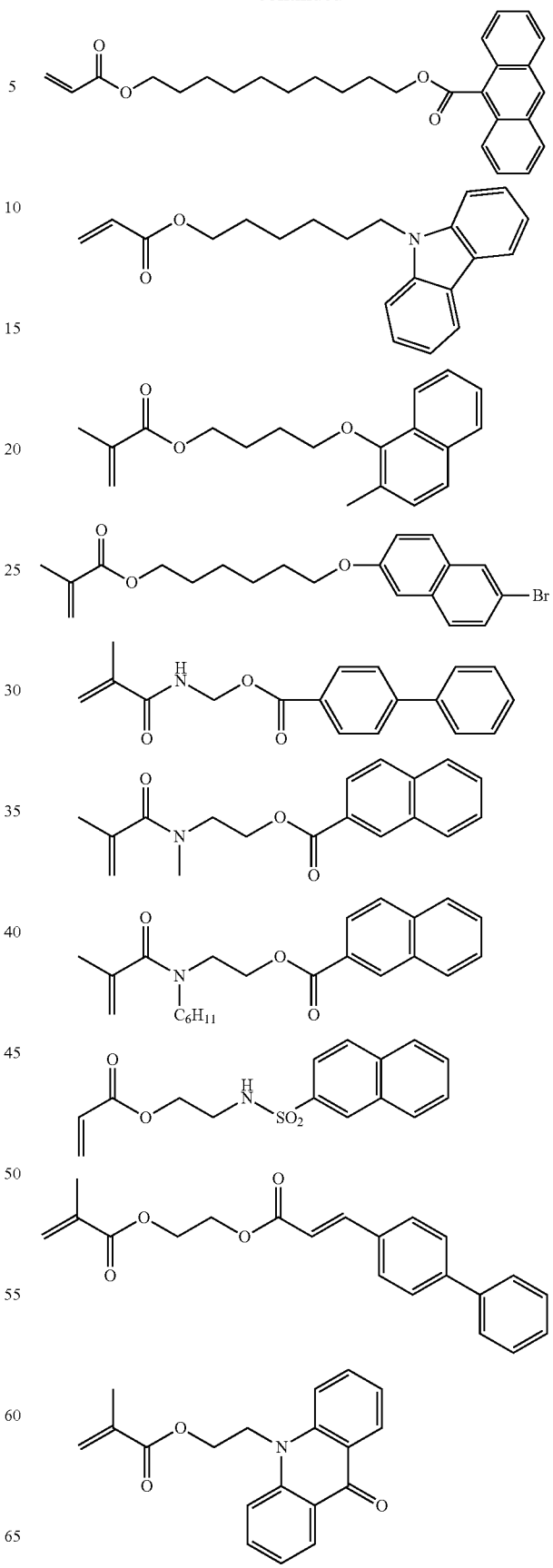

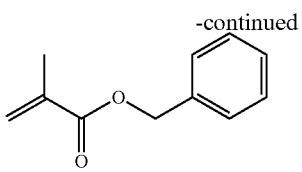

The water-insoluble resin of the present invention is, among the above, preferably characterized in that the hydrophilic structural unit (A) is (meth)acrylic acid and the hydrophobic structural unit (B) is at least one kind selected from (i) a structural unit represented by Formula (1) (preferably a structural unit derived from the foregoing M-25/M-27 or M-28/M-29), (ii) a structural unit represented by Formula (2) (preferably a structural unit derived from phenoxyethyl (meth)acrylate), and (iii) a hydrophobic structural unit (B') other than the foregoing structural units (preferably a structural unit derived from methyl (meth)acrylate, ethyl(meth) acrylate, or benzyl methacrylate).

Furthermore, the water-insoluble resin of the present invention is preferably characterized in that the hydrophilic structural unit (A) is (meth)acrylic acid and the hydrophobic structural unit (B) contains at least one kind of the above (i) and (ii).

Particularly, the water-insoluble resin of the present invention is preferably characterized in that the hydrophilic structural unit (A) is (meth)acrylic acid and the hydrophobic structural unit (B) contains at least one kind of the above (i) and (ii) and further contains (iii).

In the water-insoluble resin in the exemplary embodiment of the invention, although the ratio of the hydrophilic structural unit (A) to the hydrophobic structural unit (B) (including the structural unit represented by Formula (2), the structural unit represented by Formula (1) and the other hydrophobic structural units (B') depends on the degrees of the hydrophilicity and hydrophobicity of these components, the content of the hydrophilic structural units (A) in the water-insoluble resin is preferably 15% by mass or less. The content of the hydrophobic structural units (B) is preferably more than 80% by mass, and more preferably 85% by mass or more with respect to the total mass of the water-insoluble resin.

When the content of the hydrophilic structural unit (A) is 15% by mass or less, the amount of the component that dissolves itself in the aqueous medium is decreased, which results in the improvement of pigment properties such as dispersibility, whereby good ink ejection properties are achieved during inkjet recording.

The content ratio of the hydrophilic structural unit (A) is preferably more than 0% by mass but 15% by mass or less, more preferably from 2% by mass to 15% by mass, even more preferably from 5% by mass to 15% by mass, and particularly preferably from 8% by mass to 12% by mass with respect to the total mass of the water-insoluble resin.

In embodiments, the acid value of the water-insoluble resin is preferably from 30 mgKOH/g to 100 mgKOH/g, more preferably from 30 mgKOH/g to 85 mgKOH/g, and particularly preferably from 50 mgKOH/g to 85 mgKOH/g from the viewpoints of pigment dispersibility and storage stability.

The acid value is defined as the mass (mg) of KOH necessary for completely neutralizing 1 g of the water-insoluble resin, and measured by the method described in Japanese Industrial Standard (JIS K0070, 1992), the disclosure of which is incorporated by reference herein.

The weight average molecular weight (Mw) of the water-insoluble resin in the exemplary embodiment of the invention is preferably 30,000 or more, more preferably from 30,000 to 150,000, even more preferably from 30,000 to 100,000, and particularly preferably from 30,000 to 80,000. If the molecular weight is 30000 or more, the water-insoluble resin may provide a good steric repulsion effect as a dispersant, and is readily adsorbed on the pigment owing to the steric effect.

The number average molecular weight (Mn) of the water-insoluble resin is preferably about 1,000 to about 100,000, and particularly preferably about 3,000 to about 50,000. When the number average molecular weight is within the above-described range, the water-insoluble resin may serve as a coating on the pigment or a coating of the ink composition. The water-insoluble resin in the exemplary embodiment of the invention is preferably used in the form of an alkali metal salt or an organic amine salt.

The molecular weight distribution of the water-insoluble resin in the exemplary embodiment of the invention (weight average molecular weight/number average molecular weight) is preferably from 1 to 6, and more preferably from 1 to 4. When the molecular weight distribution is within the above-described range, the resulting ink has improved dispersion stability and ejection stability.

The number average molecular weight and the weight average molecular weight are measured by the differential refractometer detection with THF as a solvent in a GPC analyzer using columns TSKgel Super HZM-H, TSKgel Super HZ4000 and TSKgel Super HZ2000 (trade name; all manufactured by Tosoh Corporation), and is obtained in terms of polystyrene used as a reference material.

The water-insoluble resin in the exemplary embodiment of the invention may be synthesized by any polymerization method, for example, solution polymerization, precipitation polymerization, suspension polymerization, bulk polymerization, or emulsion polymerization. The polymerization reaction may be carried out under a known system, such as a batch, semi-continuous, or continuous system. Initiation of the polymerization may be carried out with a radical initiator, or photoirradiation or radiation-irradiation. These methods of polymerization and initiation of polymerization are described in, for example, "Kobunshi Gosei Hoho" by Teiji Tsuruta, Revised Edition (published by Nikkan Kogyo Shimbun, Ltd., 1971) and "Kobunshi Gosei no Jikkenho" by Takayuki Ohtu and Masaetu Kinoshita (published by Kagaku-Dojin Publishing Company Inc., 1972) pages 124 to 154.

Among these polymerization methods, a solution polymerization method using a radical initiator is preferable. Examples of the solvent used in the solution polymerization method include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol, and 1-butanol. These solvents may be used alone or in a combination of two or more of them, or may be mixed with water as a mixed solution. The polymerization temperature should be chosen in consideration of the molecular weight of the intended polymer and the type of the initiator, and is usually from 0° C. to 100° C., and is preferably from 50° C. to 100° C. The reaction pressure may be appropriately selected, and is usually from 1 kg/cm$^2$ to 100 kg/cm$^2$, and particularly preferably from about 1 kg/cm$^2$ to about 30 kg/cm$^2$. The reaction period may be about 5 hours to about 30 hours. The resulting resin may be subjected to purification treatment such as reprecipitation.

Specific examples of preferable water-insoluble resins in the exemplary embodiment of the invention are shown below. The invention is not limited to these examples. In the following Formula, a, b and c each independently represent the content of the correspondent structural unit % by mass in the polymer.

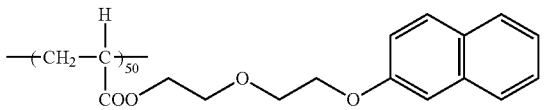

| | R$^{11}$ | n | R$^{21}$ | R$^{31}$ | R$^{32}$ | a | b | c | Mw |
|---|---|---|---|---|---|---|---|---|---|
| B-1 | CH$_3$ | 1 | CH$_3$ | CH$_3$ | —CH$_3$ | 60 | 9 | 31 | 35500 |
| B-2 | H | 1 | H | H | —CH$_2$CH$_3$ | 69 | 10 | 21 | 41200 |
| B-3 | CH$_3$ | 2 | CH$_3$ | CH$_3$ | —CH$_3$ | 70 | 11 | 19 | 68000 |
| B-4 | CH$_3$ | 4 | CH$_3$ | CH$_3$ | —CH(CH$_3$)CH$_3$ | 70 | 7 | 23 | 72000 |
| B-5 | H | 5 | H | H | —CH$_3$ | 70 | 10 | 20 | 86000 |
| B-6 | H | 5 | H | H | —CH$_2$CH(CH$_3$)CH$_3$ | 70 | 2 | 28 | 42000 |
| B-7 | CH$_3$ | 1 | CH$_3$ | CH$_3$ | —CH$_2$CH$_3$ | 50 | 11 | 39 | 44500 |
| B-8 | CH$_3$ | 1 | CH$_3$ | CH$_3$ | —CH$_2$CH$_3$ | 50 | 10 | 40 | 51200 |
| B-9 | H | 1 | H | H | —CH$_2$CH$_3$ | 45 | 11 | 44 | 48900 |
| B-10 | H | 1 | CH$_3$ | CH$_3$ | —CH$_2$CH$_3$ | 45 | 12 | 43 | 43600 |

B-11    72400

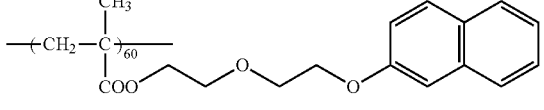

B-12    33800

B-13    39200

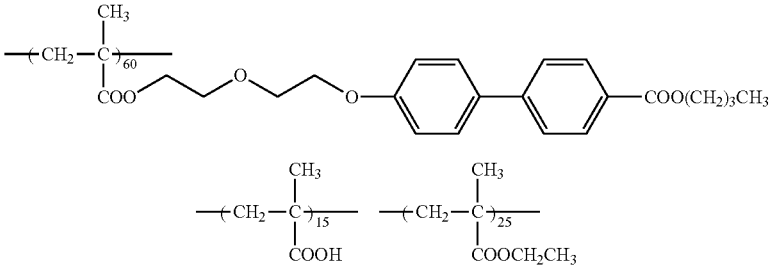

The weight ratio (p:r) between the pigment (p) and the water-insoluble resin (r) in the exemplary embodiment of the invention is preferably from 100:25 to 100:140, and more preferably from 100:25 to 100:50. When the proportion of the water-insoluble resin is 25 or more, dispersion stability and abrasion resistance tend to improve, and when 140 or less, dispersion stability tends to improve.

The resin-coated pigment (capsulated pigment) in the exemplary embodiment of the invention may be produced using a water-insoluble resin and a pigment by a known physical or chemical method such as that described in JP-A Nos. 9-151342, 10-140065, 11-209672, 11-172180, 10-25440, and 11-43636. Specific examples of the method include the phase inversion method and acid precipitation method described in JP-A Nos. 9-151342 and 10-140065. Of these methods, the phase inversion method is preferable from the viewpoint of dispersion stability.

Basically, the phase inversion method is a self dispersion (phase inversion emulsification) method comprising dispersing in water a mixed melt of a pigment and a resin having self dispersibility or solubility. The mixed melt may contain a curing agent or a polymer compound. The mixed melt refers to a state where undissolved components are mixed and/or a state where dissolved components are mixed. Details about the "phase inversion method" are described in JP-A No. 10-140065.

In the ink composition in the exemplary embodiment of the invention, the resin-coated pigment is preferably prepared using the water-insoluble resin through a preparation method of preparing a dispersion of the resin-coated pigment including, for example, the following steps (1) and (2). The ink composition of the exemplary embodiment of the invention may be prepared by preparing a dispersion of the resin-coated pigment in accordance with the above-described preparation method, followed by preparing an ink composition from the obtained dispersion of the resin-coated pigment, water, and a water soluble organic solvent.

Step (1): a mixture containing a water-insoluble resin including the structural unit having an acidic group, an organic solvent, a neutralizing agent, a pigment, and water is dispersed with a stirrer or the like to obtain a dispersion.

Step (2): at least a part of the organic solvent is removed from the dispersion.

The stirring method is not particularly limited, and may use a common mixing stirrer or, if necessary, a disperser such as an ultrasonic disperser, a high-pressure homogenizer, or a bead mill.

Examples of the organic solvent preferable herein include alcohol solvents, ketone solvents, and ether solvents. Examples of the alcohol solvents include isopropyl alcohol, n-butanol, t-butanol, and ethanol. Examples of the ketone solvents include acetone, methyl ethyl ketone, diethyl ketone, and methyl isobutyl ketone. Examples of the ether solvents include dibutyl ether and dioxane. Among these solvents, ketone solvents such as methyl ethyl ketone and alcohol solvents such as isopropyl alcohol are preferable, and methyl ethyl ketone is more preferable.

The neutralizing agent may be preferably used in the process (1) for neutralizing a part or all of the acidic groups so that the water-insoluble resin can form a stable emulsion or dispersion in water. Examples of the neutralizing agent include alcohol amines (such as diethanolamine, triethanolamine, and 2-amino-2-ethyl-1,3-propanediol), alkali metal hydroxides (such as lithium hydroxide, sodium hydroxide, and potassium hydroxide), ammonium hydroxide (such as ammonium hydroxide and quaternary ammonium hydroxide), phosphonium hydroxides, and alkali metal carbonates. Among them, sodium hydroxide and potassium hydroxide may be preferably used.

The water-insoluble resin may have a neutralization degree of from 70% to 95%. When the neutralization degree is 70% or higher, generation of white spots in an image formed from the ink may be suppressed. When the neutralization degree is 95% or lower, abrasion resistance of an image formed from the ink may be improved.

The neutralization degree may be preferably from 70% to 90%, and more preferably from 75% to 90%. By adjusting the neutralization degree within the above range, generation of white spots in an image formed from the ink may be effectively suppressed, and abrasion resistance of an image formed from the ink may be effectively improved.

The "neutralization degree" herein referred is a ratio (%) of an equivalent of a neutralizer with respect to one equivalent of the acid group. Namely, the neutralization degree of the water-insoluble resin is defined as a ratio of the total equivalence of the neutralizer to the total equivalence of the acid group contained in the water-insoluble resin, and is obtained in accordance with the following equality.

Neutralization degree of water-insoluble resin=(total equivalence of neutralizer)/total equivalence of acid group in water-insoluble resin)×100(%)

In the process (2), the organic solvent is evaporated from the dispersion prepared in the process (1) by a common procedure such as vacuum distillation to convert the phase into a water system, thereby obtaining a dispersion of resin-coated pigment particles, the particle surface of the pigment being coated with the water-insoluble resin. The obtained dispersion is substantially free from the organic solvent. The amount of the organic solvent may be preferably 0.2% by mass or less, and more preferably 0.1% by mass or less.

More specifically, the method for forming the dispersion of the water-insoluble resin may include: (1) mixing an acid group-containing water-insoluble resin or its solution in an organic solvent with a basic compound (neutralizing agent), thereby carrying out neutralization; (2) mixing the obtained mixed solution with a pigment to make a suspension, and then subjecting the suspension to dispersing by using a disperser or the like to obtain a pigment dispersion; and (3) removing the organic solvent by, for example, distillation, thereby coating the pigment with a water-insoluble resin having a structural unit having an acid group, and dispersing the coated pigment particles in an aqueous medium to provide an aqueous dispersion.

The method is further specifically described in JP-A Nos. 11-209672 and 11-172180.

The dispersing may be carried out by using, for example, a ball mill, a roll mill, a bead mill, a high-pressure homogenizer, a high-speed stirring disperser, or an ultrasonic homogenizer.

The average particle diameter of the pigment covered with the water-insoluble resin may be preferably in the range of 10 nm to 200 nm, more preferably in the range of 10 nm to 150 nm, and even more preferably in the range of 10 nm to 100 nm. When the average particle diameter is 200 nm or less, the color reproducibility and dotting property of the ink underinkjet recording system may become favorable. When the average particle diameter is 10 nm or more, light fastness may become favorable.

There is no particular limitation to the particle size distribution of the pigment covered with the water-insoluble resin. The polymer particles may have either a broad particle size distribution or a monodisperse particle size distribution. Two or more colored particles, each of which having a monodisperse particle size distribution, may be used in combination as a mixture.

The average particle diameter and the particle size distribution of the pigment covered with the water-insoluble resin may be measured by, for example, the dynamic light scattering method.

The pigment covered with the water-insoluble resin may be used singly or in a combination of two or more thereof.

From the viewpoint of the density of an image formed from the ink composition, the content of the pigment covered with the water-insoluble resin in the ink composition may be preferably from 0.1% by mass to 25% by mass, more preferably from 1% by mass to 20% by mass, even more preferably from 1.5% by mass to 15% by mass, and further preferably from 1.5% by mass to 10% by mass, with respect to the total amount of the ink composition.

The ratio of the content of colloidal silica to the content of the water-insoluble resin (colloidal silica/water-insoluble resin) in the ink composition may be preferably from 0.0001 to 0.5, more preferably from 0.0001 to 0.3, and even more preferably from 0.001 to 0.05, in terms of mass from the viewpoints of suppression of shape deformation of the inkjet head member equipped with an ink circulation system due to dissolution of the inkjet head member such as a nozzle plate or an ink flow channel and suppression of deterioration of the liquid-repellency of the inkjet head member.

In embodiments which may be preferable in view of ink ejection reliability, abrasion resistance of an image formed from the ink composition, suppression of shape deformation of the nozzle plate due to dissolution thereof and suppression of deterioration of the liquid-repellency of the inkjet head member, the water-insoluble resin may have an acid value of from 30 mgKOH/g to 100 mgKOH/g, the colloidal silica may have a volume-average particle diameter of from 3 nm to 50 nm, and the ratio of the content of colloidal silica to the content of the water-insoluble resin (colloidal silica/water-insoluble resin) may be from 0.0001 to 0.3; and in more preferable embodiments, in the ink composition, the water-insoluble resin may have an acid value of from 50 mgKOH/g to 85 mgKOH/g, the colloidal silica may have a volume-average particle diameter of from 3 nm to 25 nm, and the ratio of the content of colloidal silica to the content of the water-insoluble resin (colloidal silica/water-insoluble resin) may be from 0.001 to 0.05.

[Water Soluble Organic Solvent]

The ink composition of the exemplary embodiment of the invention preferably includes a water-based medium. The water-based medium contains at least water as a solvent, but preferably contains water and at least one water soluble organic solvent. The water soluble organic solvent is capable of enhancing effects such as anti-drying, wetting, or penetration promoting.

An anti-drying agent or a wetting agent is used for the purpose of preventing the clogging caused as the ink for inkjet recording dries up at the ink spray orifice of a nozzle. The anti-drying agent or wetting agent is preferably a water soluble organic solvent having a lower vapor pressure than water.

Furthermore, for the purpose of making the ink composition penetrate easily into paper, a water soluble organic solvent is suitably used as a penetration promoting agent.

The ink composition in the exemplary embodiment of the invention preferably includes at least one type of a first water soluble organic solvent having an I/O value of from 0.70 to less than 1.0. When the I/O value of the first water soluble organic solvent is less than 1.00, compatibility with the self-dispersing polymer particles is enhanced, the fixability of the image formed is more effectively enhanced, and the abrasion resistance of the image is further enhanced. When the I/O value of the first water soluble organic solvent is 0.70 or more, the stability of the ink composition is enhanced.

The I/O value of the water soluble organic solvent has the same definition as that in the self-dispersing polymer which is described below, and is calculated in a manner substantially similar to that in the calculation of the I/O value for the self-dispersing polymer.

It is preferable that the ink composition of the exemplary embodiment of the invention further includes at least one of a second water soluble organic solvent having an I/O value of 1.00 to 1.50, in addition to the first water soluble organic solvent. When the I/O value of the second water soluble organic solvent is 1.00 or more, the stability of the ink composition is more effectively enhanced. When the I/O value of the second water soluble organic solvent is 1.50 or less, deterioration of the fixation properties of the formed image can be suppressed.

Specific examples of the first water soluble organic solvent having an I/O value of 0.70 or more and less than 1.00 include glycol ethers. Among the glycol ethers, propylene glycol ether or ethylene glycol ether is preferable, and propylene glycol ether is more preferable. Specific examples include triprolene glycol monomethyl ether (I/O value: 0.80), triprolene glycol monoethyl ether (I/O value: 0.73), triprolene glycol monobutyl ether (I/O value: 0.61), diprolene glycol monoethyl ether (I/O value: 0.78), diprolene glycol monobutyl ether (I/O value: 0.70), and prolene glycol monobutyl ether (I/O value: 0.88).

Among these, triprolene glycol monomethyl ether (I/O value: 0.80) is preferable from the viewpoints of image fixability and ink stability.

Specific examples of the second water soluble organic solvent having an I/O value of 1.0 to 1.5, include propylene glycol monomethyl ether (I/O value: 1.50), propylene glycol monoethyl ether (I/O value: 1.20), diethylene glycol monobutyl ether (I/O value: 1.40), triethylene glycol monobutyl ether (I/O value: 1.20), 2,2-diethyl-1,3-propanediol (I/O value: 1.43), 2-methyl-2-propyl-1,3-propanediol (I/O value: 1.43), 2,4-dimethyl-2,4-pentanediol (I/O value: 1.43), 2,5-dimethyl-2,5-hexanediol (I/O value: 1.25), tripropylene glycol (I/O value: 1.33), SANNIX GP250 (trade name, I/O value: 1.30, manufactured by Sanyo Chemical Industries, Ltd.), and the like. Among them, SANNIX GP250 is preferable from the viewpoints of image fix properties and ink stability.

The content of the first water soluble organic solvent in the ink composition for inkjet recording in the exemplary embodiment of the invention is preferably 0.1% by mass to 20% by mass, more preferably 1% by mass to 16% by mass, and further preferably 2% by mass to 12% by mass, from the viewpoints of image fixation properties and ink stability.

Furthermore, it is preferable that the ink composition includes, as the first water soluble organic solvent, a water soluble organic solvent whose I/O value is selected from the range of 0.70 or more and less than 1.00, in an amount of 1% by mass to 16% by mass, and it is more preferable that the ink composition includes a water soluble organic solvent whose I/O value is selected from the range of 0.70 or more and less than 0.90, in an amount of 2% by mass to 12% by mass.

The content of the second water soluble organic solvent in the ink composition for inkjet recording in the exemplary embodiment of the invention is preferably 0.1% by mass to 20% by mass, more preferably 1% by mass to 16% by mass, and further preferably 2% by mass to 12% by mass, from the viewpoints of image fixation properties and ink stability.

Furthermore, it is preferable that the ink composition includes, as the second water soluble organic solvent, a water soluble organic solvent whose I/O value is selected from the range of 1.00 to 1.50, in an amount of 1% by mass to 16% by mass, and it is more preferable that the ink composition includes a water soluble organic solvent whose I/O value is selected from the range of 1.20 to 1.40, in an amount of 2% by mass to 12% by mass.

Furthermore, the content ratio of the second water soluble organic solvent to the first water soluble organic solvent in the ink composition for inkjet recording in the exemplary embodiment of the invention (second water soluble organic solvent/first water soluble organic solvent) is preferably 1/10 to 10/1, more preferably 1/4 to 4/1, and further preferably 1/2 to 2/1, from the viewpoints of image fixation properties and ink stability.

The ink composition in the exemplary embodiment of the invention may further include another water soluble organic solvent, in addition to the first water soluble organic solvent and the second water soluble organic solvent. As for the other water soluble organic solvent, polyhydric alcohols are useful for the purpose of functioning as an anti-drying agent or a wetting agent, and examples include glycerin (I/O value: 5.00), ethylene glycol (I/O value: 2.00), diethylene glycol (I/O value: 5.00), triethylene glycol (I/O value: 3.43), propylene glycol (I/O value: 2.50), dipropylene glycol (I/O value: 2.00), 1,3-butanediol (I/O value: 2.50), 2,3-butanediol (I/O value: 2.50), 1,4-butanediol (I/O value: 2.50), 3-methyl-1,3-butanediol (I/O value: 2.00), 1,5-pentanediol (I/O value: 2.00), tetraethylene glycol (I/O value: 2.91), 1,6-hexanediol (I/O value: 1.67), 2-methyl-2,4-pentanediol (I/O value: 1.67), polyethylene glycol (I/O value depends on the number of repetition of the ethylene chain), 1,2,4-butanetriol (I/O value:

3.75), 1,2,6-hexanetriol (I/O value: 2.50), and the like. These may be used individually, or may be used in combination of two or more types.

For the purpose of functioning as a permeation agent, a polyol compound is preferable, and preferable examples of aliphatic diol include 2-ethyl-2-methyl-1,3-propanediol (I/O value: 1.67), 3,3-dimethyl-1,2-butanediol (I/O value: 1.67), 5-hexene-1,2-diol, 2-ethyl-1,3-hexanediol (I/O value: 2.00), and 2,2,4-trimethyl-1,3-pentanediol (I/O value: 1.88). The content of the other water soluble organic solvent may be, for example, 16% by mass or less, and is preferably 12% by mass or less, and more preferably 8% by mass or less.

The hydrophilic organic solvent in the ink composition in the exemplary embodiment of the invention may be used individually, or may be used as mixtures of two or more types. The content of the water soluble organic solvent is preferably 1% by mass to 60% by mass, more preferably 5% by mass to 40% by mass, and particularly preferably 10% by mass to 30% by mass, from the viewpoints of stability and ejection properties.

The amount of addition of water used in the exemplary embodiment of the invention is not particularly limited, but the amount is preferably 10% by mass to 99% by mass, more preferably 30% by mass to 80% by mass, and further preferably 50% by mass to 70% by mass, in the ink composition, from the viewpoints of securing stability and ejection reliability.

(Polymer Particles)

It is preferable that the ink composition in the exemplary embodiment of the present invention contains at least one type of polymer particles from the viewpoints of image fixability, image abrasion resistance, and aggregation property of the ink composition. It is more preferable that the polymer particles are self-dispersing polymer particles. Since elution of the head members (particularly, the silicon portion of the members) such as the nozzle plates or ink flow channels, and corrosion accompanying this are liable to proceed when the polymer particles are incorporated, the effect obtained by using the water soluble silicate and/or colloidal silica in combination, namely, the suppressive effect against the shape deformation caused by corrosion of the head members or the suppressive effect against the lowering of liquid repellency when the head members has been subjected to a liquid repellent treatment, is great.

The self-dispersing polymer according to the exemplary embodiment of the invention means a water-insoluble polymer which can be in a dispersed state in an aqueous medium due to the functional group (particularly, an acidic group or a salt thereof) of the polymer itself when brought to a dispersed state by an phase inversion emulsification method in the absence of a surfactant.

Here, the term dispersed state includes both an emulsified state (emulsion) in which a water-insoluble polymer is dispersed in an aqueous medium in the liquid state, and a dispersed state (suspension) in which a water-insoluble polymer is dispersed in an aqueous medium in the solid state.

In regard to the self-dispersing polymer according to the exemplary embodiment of the invention, it is preferable that the water-insoluble polymer is a self-dispersing polymer capable of being in a dispersed state in the solid state, from the viewpoint of ink fixation properties obtainable when incorporated in an ink composition.

The method for preparing the emulsified or dispersed state of the self-dispersing polymer, that is, an aqueous dispersion of the self-dispersing polymer, may be a phase inversion emulsification method. The phase inversion emulsification method may be, for example, a method of dissolving or dispersing the self-dispersing polymer into a solvent (for example, a water soluble organic solvent or the like), subsequently introducing the solution or dispersion directly into water without adding a surfactant, mixing under stirring the system while a salt-producing group (for example, an acidic group) carried by the self-dispersing polymer is neutralized, removing the solvent, and then obtaining an aqueous dispersion that has been brought to an emulsified or dispersed state.

A stable emulsified or dispersed state for the self-dispersing polymer means that even when a solution prepared by dissolving 30 g of a water-insoluble polymer in 70 g of an organic solvent (for example, methyl ethyl ketone), a neutralizing agent capable of neutralizing 100% of the salt-producing group of the water-insoluble polymer (if the salt-producing group is anionic, sodium hydroxide, and if the salt-producing group is cationic, acetic acid), and 200 g of water are mixed and stirred (apparatus: a stirring apparatus equipped with a stirring blade, speed of rotation 200 rpm, for 30 minutes, 25° C.), and then the organic solvent is removed from the liquid mixture, the emulsified or dispersed state remains stable for at least one week at 25° C., so that the generation of precipitates cannot be verified by visual inspection.

The stability of the emulsified or dispersed state for the self-dispersing polymer can be confirmed by a precipitation acceleration test based on centrifugation. The stability obtained by a precipitation acceleration test based on centrifugation can be evaluated by, for example, adjusting the aqueous dispersion of the polymer particles obtained by the method described above to a solids concentration of 25% by mass, subsequently centrifuging the dispersion for one hour at 12,000 rpm, and measuring the solids concentration of the supernatant obtained after centrifugation.

When the ratio of the solids concentration after centrifugation to the solids concentration before centrifugation is large (a value close to 1), it means that precipitation of the polymer particles resulting from centrifugation does not occur, that is, the aqueous dispersion of the polymer particles is more stable. According to the present invention, the ratio of the solids concentration before and after centrifugation is preferably 0.8 or greater, more preferably 0.9 or greater, and particularly preferably 0.95 or greater.

Further, the water-insoluble polymer means a polymer showing an amount of dissolution of 10 g or less when the polymer is dried at 105° C. for 2 hr and then dissolved in 100 g of water at 25° C. The amount of dissolution is, preferably, 5 g or less and, more preferably, 1 g or less. The amount of dissolution is the amount of dissolution when the polymer is neutralized with sodium hydroxide or acetic acid to 100% in accordance with the kind of the salt-forming group of the water-insoluble polymer.

The self-dispersing polymer according to the exemplary embodiment of the invention is such that the content of the water-soluble component exhibiting water-solubility when brought to a dispersed state is preferably 10% by mass or less, more preferably 8% by mass or less, and even more preferably 6% by mass or less. When the water-soluble component is 10% by mass or less, swelling of the polymer particles or fusion of the polymer particles is effectively suppressed, and a more stable dispersed state can be maintained. Viscosity increase of the ink composition can also be suppressed, and the ejection stability becomes better when, for example, the ink composition is used for an inkjet recording method.

Here, the water-soluble component means a compound contained in the self-dispersing polymer, where the compound dissolves in water when the self-dispersing polymer is brought to a dispersed state. The water-soluble component is a water-soluble compound that is side-produced or incorporated during the production of the self-dispersing polymer.

The self-dispersing polymer according to the exemplary embodiment of the invention includes at least one hydrophilic constituent unit derived from a hydrophilic monomer, and at least one hydrophobic constituent unit derived from a hydrophobic monomer. The main chain skeleton of the self-dispersing polymer is not particularly limited, but from the viewpoint of the dispersion stability of the polymer particles, the main chain skeleton is preferably a vinyl polymer, and preferably a (meth)acrylic polymer. Here, the (meth)acrylic polymer means a polymer including at least one of a constituent unit derived from a methacrylic acid derivative and a constituent unit derived from an acrylic acid derivative.

—Hydrophilic Constituent Unit—

The hydrophilic constituent unit in the self-dispersing polymer is not particularly limited so long as it is derived from a hydrophilic group-containing monomer and it may be either a unit derived from one hydrophilic group-containing monomer (hydrophilic monomer) or a unit derived from two or more hydrophilic group-containing monomers. The hydrophilic group is not particularly limited and it may be either a dissociative group or a nonionic hydrophilic group.

The hydrophilic group is preferably a dissociative group from the viewpoints of promoting the self-dispersibility and stability of the formed emulsified or dispersed state and, more preferably, an anionic dissociative group. Examples of the dissociative group include a carboxy group, a phosphoric acid group, and a sulfonic acid group and, among them, a carboxy group is preferable from the viewpoint of the image fixation property when used in the ink composition.

Particularly, when the polymer particles have carboxy groups, it is preferable that a part or all of the carboxy groups is neutralized, and when neutralized, it is preferable that the neutralization degree is 0.3 mole equivalents or more. In this case, the acid value is preferably in a range of from 25 mgKOH/g to 100 mgKOH/g.

The hydrophilic group-containing monomer is preferably a dissociative group-containing monomer and, preferably, a dissociative group-containing monomer having a dissociative group and an ethylenically unsaturated bond from the viewpoint of self-dispersibility.

Examples of the dissociative group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-(methacryloyloxy) methyl succinicate, etc. Specific examples of the unsaturated sulfonic acid monomer include styrenesulfonic acid, 2-acrylamido-2-methylpropanesulfonic acid, 3-sulfopropyl(meth)acrylate, and bis(3-sulfopropyl)itaconate. Specific examples of the unsaturated phosphoric acid monomer include vinylphosphonic acid, vinylphosphate, bis(methacryloyloxyethyl)phosphate, diphenyl-2-acryloyloxyethyl phosphate, diphenyl-2-methacryloyloxyethyl phosphate, and dibutyl-2-acryloyloxyethyl phosphate.

Among the dissociative group-containing monomers, an unsaturated carboxylic acid monomer is preferred and, at least one kind of acrylic acid and methacrylic acid is more preferred from the viewpoints of the dispersion stability and ejection stability.

Examples of the monomer having a nonionic hydrophilic group include ethylenically unsaturated monomers containing a (poly)ethyleneoxy group or a polypropyleneoxy group, such as 2-methoxyethyl acrylate, 2-(2-methoxyethoxy)ethyl acrylate, 2-(2-methoxyethoxy)ethyl methacrylate, ethoxytriethylene glycol methacrylate, methoxypolyethylene glycol (molecular weight 200 to 1000) monomethacrylate, and polyethylene glycol (molecular weight 200 to 1000) monomethacrylate; and ethylenically unsaturated monomers having a hydroxyl group, such as hydroxymethyl(meth)acrylate, 2-hydroxyethyl meth)acrylate, 2-hydroxypropyl(meth)acrylate, 4-hydroxybutyl (meth)acrylate, and hydroxypentyl (meth)acrylate, hydroxyhexyl(meth)acrylate.

The monomer having a nonionic hydrophilic group is preferably an ethylenically unsaturated monomer having an alkyl ether at the end, rather than an ethylenically unsaturated monomer having a hydroxyl group at the end, from the viewpoints of the stability of the particles and the content of the water-soluble component.

The hydrophilic constituent unit in the self-dispersing polymer is preferably any of an embodiment containing only a hydrophilic constituent unit having an anionic dissociative group, and an embodiment containing both a hydrophilic constituent unit having an anionic dissociative group and a hydrophilic constituent unit having a nonionic hydrophilic group.

Furthermore, an embodiment containing two or more types of hydrophilic constituent units having an anionic dissociative group, or an embodiment having two or more of a hydrophilic constituent unit having an anionic dissociative group and a hydrophilic constituent unit having a nonionic hydrophilic group in combination, is also preferable.

The content of the hydrophilic constituent unit in the self-dispersing polymer is preferably 25% by mass or less, more preferably from 1 to 25% by mass, further preferably from 2 to 23% by mass, and particularly preferably from 4 to 20% by mass, from the viewpoints of viscosity and stability over time.

When the polymer has two or more types of hydrophilic constituent units, it is preferable that the total content of the hydrophilic constituent unit is within the range described above.

The content of the hydrophilic constituent unit having an anionic dissociative group in the self-dispersing polymer is preferably in the range such that the acid value falls in the suitable range described below.

The content of the constituent unit having a nonionic hydrophilic group is preferably from 0% by mass to 25% by mass, more preferably from 0% by mass to 20% by mass, and particularly preferably from 0% by mass to 15% by mass, from the viewpoints of ejection stability and stability over time.

When the self-dispersing polymer has an anionic dissociative group, the acid value (mgKOH/g) is preferably 20 to 200, more preferably 22 to 120, and particularly preferably 25 to 100, from the viewpoint of self-dispersibility, content of the water-soluble component, and image fixation properties when the polymer constitutes an ink composition. The acid value is particularly preferably 30 to 80. When the acid value is 20 or greater, the particles can be dispersed more stably, and when the acid value is 200 or less, the content of the water-soluble component can be reduced.

—Hydrophobic Constituent Unit—

The hydrophobic constituent unit in the self-dispersing polymer is not particularly limited so long as it is derived from a hydrophobic group-containing monomer (hydrophobic monomer), and may be a constituent unit derived from a monomer containing one type of hydrophobic group, or may be a constituent unit derived from a monomer containing two or more types of hydrophobic groups. The hydrophobic group is not particularly limited, and may be any of a chain-like aliphatic group, a cyclic aliphatic group, and an aromatic group.

The hydrophobic monomer is preferably such that at least one is a cyclic aliphatic group-containing monomer, and more preferably a cyclic aliphatic group-containing (meth)acrylate (hereinafter, may be referred to as "alicyclic (meth)acrylate"), from the viewpoints of blocking resistance, abrasion resistance and dispersion stability.

The alicyclic (meth)acrylate is a compound including a structural site derived from (meth)acrylic acid and a structural site derived from alcohol, and having a structure containing at least one unsubstituted or substituted alicyclic hydrocarbon group (cyclic aliphatic group) in the structural site derived from alcohol. The alicyclic hydrocarbon group may be the structural site derived from alcohol itself, or may be linked to the structural site derived from alcohol via a linking group.

The "alicyclic (meth)acrylate" means a methacrylate or acrylate having an alicyclic hydrocarbon group.

The alicyclic hydrocarbon group is not particularly limited so long as it contains a cyclic non-aromatic hydrocarbon group, and may be a monocyclic hydrocarbon group, a bicyclic hydrocarbon group, or a polycyclic hydrocarbon group having three or more rings.

Examples of the alicyclic hydrocarbon group include a cycloalkyl group such as a cyclopentyl group or a cyclohexyl group, a cycloalkenyl group, a bicyclohexyl group, a norbornyl group, an isobornyl group, a dicyclopentanyl group, a dicyclopentenyl group, an adamantyl group, a decahydronaphthalenyl group, a perhydrofluorenyl group, a tricyclo[$5.2.1.0^{2,6}$]decanyl group, a bicyclo[4.3.0]nonane, and the like.

The alicyclic hydrocarbon group may be further substituted with a substituent. Examples of the substituent include an alkyl group, an alkenyl group, an aryl group, an aralkyl group, an alkoxy group, a hydroxyl group, a primary amino group, a secondary amino group, a tertiary amino group, an alkyl- or arylcarbonyl group, a cyano group, and the like.

The alicyclic hydrocarbon group may further form a condensed ring.

The alicyclic hydrocarbon group according to the exemplary embodiment of the invention preferably has 5 to 20 carbon atoms in the alicyclic hydrocarbon group moiety, from the viewpoint of viscosity or solubility.

The linking group that links the alicyclic hydrocarbon group and the structural site derived from alcohol may be suitably an alkylene group, an alkenylene group, an alkynylene group, an arylalkylene group, an alkylenoxy group, a mono- or oligoethylenoxy group, a mono- or oligopropylenoxy group, or the like, having 1 to 20 carbon atoms.

Specific examples of the alicyclic (meth)acrylate according to the exemplary embodiment of the invention will be shown below, but the invention is not limited to these.

Examples of monocyclic (meth)acrylate include cycloalkyl(meth)acrylates having a cycloalkyl group having 3 to 10 carbon atoms, such as cyclopropyl(meth)acrylate, cyclobutyl (meth)acrylate, cyclopentyl(meth)acrylate, cyclohexyl(meth)acrylate, cycloheptyl (meth)acrylate, cyclooctyl (meth)acrylate, cyclononyl(meth)acrylate, and cyclodecyl (meth)acrylate.

Examples of bicyclic (meth)acrylate include isobornyl (meth)acrylate, norbornyl (meth)acrylate, and the like.

Examples of tricyclic (meth)acrylate include adamantyl (meth)acrylate, dicyclopentanyl(meth)acrylate, dicyclopentenyloxyethyl(meth)acrylate, and the like.

These can be used individually, or as mixtures of two or more types.

Among these, at least one of the bicyclic (meth)acrylate and the polycyclic (meth)acrylate having three or more rings is preferable, and at least one selected from isobornyl(meth)acrylate, adamantyl(meth)acrylate and dicyclopentanyl (meth)acrylate is more preferable, from the viewpoints of the dispersion stability of the self-dispersing polymer particles, and fixability and blocking resistance of an image formed.

According to the exemplary embodiment of the invention, the content of the constituent unit derived from alicyclic (meth)acrylate contained in the self-dispersing polymer particles is preferably 20% by mass to 90% by mass, more preferably 40% by mass to 90% by mass, and particularly preferably 50% by mass to 80% by mass, from the viewpoints of the stability of the self-dispersed state, stabilization of particle shape in an aqueous medium due to the hydrophobic interaction between the alicyclic hydrocarbon groups, and a decrease in the amount of the water-soluble component due to an appropriate hydrophobization of particles.

When the content of the constituent unit derived from alicyclic (meth)acrylate is 20% by mass or more, fixation properties and blocking can be improved. On the other hand, when the content of the constituent unit derived from alicyclic (meth)acrylate is 90% by mass or less, the stability of the polymer particles is improved.

The self dispersing polymer according to the exemplary embodiment of the invention can be constituted to further include another constituent unit as the hydrophobic constituent unit if necessary, in addition to the constituent unit derived from alicyclic (meth)acrylate. The monomer forming the other constituent unit is not particularly limited so long as it is a monomer capable of copolymerizing with the alicyclic (meth)acrylate and the hydrophilic group-containing monomer, and any known monomer can be used.

Specific examples of the monomer forming the other constituent unit (hereinafter, may be referred to as "other copolymerizable monomer") include alkyl(meth)acrylates such as methyl(meth)acrylate, ethyl(meth)acrylate, isopropyl(meth)acrylate, n-propyl (meth)acrylate, n-butyl(meth)acrylate, isobutyl(meth)acrylate, t-butyl(meth)acrylate, hexyl (meth)acrylate, and ethylhexyl(meth)acrylate; aromatic ring-containing (meth)acrylates such as benzyl(meth)acrylate and phenoxyethyl(meth)acrylate; stryrenes such as styrene, α-methylstyrene, and chlorostyrene; dialkylaminoalkyl (meth)acrylates such as dimethylaminoethyl(meth)acrylate; N-hydroxyalkyl(meth)acrylamides such as N-hydroxymethyl (meth)acrylamide, N-hydroxyethyl(meth)acrylamide, and N-hydroxybutyl (meth)acrylamide; N-alkoxyalkyl (meth)acrylamides such as N-methoxymethyl (meth)acrylamide, N-ethoxymethyl(meth)acrylamide, N-(n-, iso-)butoxymethyl (meth)acrylamide, N-methoxyethyl(meth) acrylamide, N-ethoxyethyl(meth)acrylamide, and N-(n-, iso-)butoxyethyl(meth)acrylamide; and the like.

Among them, the other constituent unit is preferably at least one (meth)acrylate containing a chain-like alkyl group having 1 to 8 carbon atoms, from the viewpoint of the flexibility of the polymer skeleton or the ease of control of the glass transition temperature (Tg) and from the viewpoint of the dispersion stability of the self-dispersing polymer, and is more preferably a (meth)acrylate having a chain-like alkyl group having 1 to 4 carbon atoms, and particularly preferably methyl(meth)acrylate or ethyl(meth)acrylate. Here, the chain-like alkyl group refers to an alkyl group having a linear or branched chain.

According to the exemplary embodiment of the invention, a (meth)acrylate containing an aromatic group can also be preferably used.

When an aromatic-containing (meth)acrylate is contained as the other copolymerizable monomer, the content of the constituent unit derived from the aromatic-containing (meth)acrylate is preferably 40% by mass or less, more preferably 30% by mass or less, and particularly preferably 20% by mass or less, from the viewpoint of the dispersion stability of the self-dispersing polymer particles.

Furthermore, when a styrene-type monomer is used as the other copolymerizable monomer, the content of the constituent unit derived from the styrene-type monomer is preferably 20% by mass or less, more preferably 10% by mass or less, and further preferably 5% by mass or less, from the viewpoint of stability when the self-dispersing polymer is made into particles, and it is particularly preferable that the polymer does not include a constituent unit derived from a styrene-type monomer.

Here, the styrene-type monomer refers to styrene, substituted styrene α-methylstyrene, chlorostyrene, or the like), or a styrene macromer having a polystyrene structural unit.

The other copolymerizable monomer in the self-dispersing polymer may be used individually, or in combination of two or more types.

When the self-dispersing polymer includes the other constituent unit, the content is preferably from 10% by mass to 80% by mass, more preferably from 15% by mass to 75% by mass, and particularly preferably from 20% by mass to 70% by mass. When two or more types of the monomer forming the other constituent unit are used in combination, the total content is preferably in the range mentioned above.

The self-dispersing polymer according to the exemplary embodiment of the invention is preferably a polymer obtainable by polymerizing at least three types of an alicyclic (meth)acrylate, another copolymerizable monomer and a hydrophilic group-containing monomer, and more preferably a polymer obtainable by polymerizing at least three types of an alicyclic (meth)acrylate, an alkyl group-containing (meth)acrylate having a linear or branched chain having 1 to 8 carbon atoms, and a hydrophilic group-containing monomer, from the viewpoint of dispersion stability.

According to the exemplary embodiment of the invention, it is preferable that the content of the (meth)acrylate having a linear or branched alkyl group having 9 or more carbon atoms, and the constituent unit having a substituent with high hydrophobicity, which is derived from an aromatic group-containing macromonomer or the like, is substantially none, and it is more preferable that the polymer does not include any of the constituent units at all, from the viewpoint of dispersion stability.

The self-dispersing polymer according to the exemplary embodiment of the invention may be a random copolymer having the respective constituent units introduced irregularly, or may be a block copolymer having the respective constituent units introduced regularly. If the first polymer is a block copolymer, the respective constituent units may be synthesized in a certain order of introduction, or the same constituent component may be used two or more times. However, it is preferable that the first polymer is a random copolymer, from the viewpoints of all-purpose usability and manufacturability.

The range of molecular weight of the self-dispersing polymer according to the exemplary embodiment of the invention is preferably from 3000 to 200,000, more preferably from 10,000 to 200,000, and further preferably from 30,000 to 150,000, in terms of weight average molecular weight. When the weight average molecular weight is 3,000 or more, the amount of the water-soluble component can be effectively suppressed. When the weight average molecular weight is 200,000 or less, the self-dispersion stability can be enhanced.

Here, the weight average molecular weight can be measured by gel permeation chromatography (GPC).

From the viewpoint of controlling the hydrophilicity and hydrophobicity of the polymer, the self-dispersing polymer according to the exemplary embodiment of the invention is preferably a vinyl polymer which includes a structure derived from an alicyclic (meth)acrylate at a copolymerization ratio of 20% by mass to 90% by mass, and at least one of a structure derived from a dissociative group-containing monomer and a structure derived from a (meth)acrylate containing a chain-like alkyl group having 1 to 8 carbon atoms, and has an acid value of from 20 mgKOH/g to 120 mgKOH/g, a total content of the hydrophilic structural units of 25% by mass or less, and a weight average molecular weight of from 3,000 to 200,000.

The first polymer is more preferably a vinyl polymer which includes a structure derived from a bicyclic (meth)acrylate or a polycyclic (meth)acrylate having three or more rings at a copolymerization ratio of 20% by mass or more and less than 90% by mass, and a structure derived from a (meth)acrylate containing a chain-like alkyl group having 1 to 4 carbon atoms at a copolymerization ratio of 10% by mass or more and less than 80% by mass, and a structure derived from a carboxy group-containing monomer at an acid value in the range of 25 mgKOH/g to 100 mgKOH/g, and has a total content of the hydrophilic structural unit of 25% by mass or less, and a weight average molecular weight of from 10,000 to 200,000.

Furthermore, the first polymer is particularly preferably a vinyl polymer which includes a structure derived from a bicyclic (meth)acrylate or a polycyclic (meth)acrylate having three or more rings at a copolymerization ratio of 40% by mass or more and less than 80% by mass, and at least a structure derived from methyl(meth)acrylate or ethyl (meth)acrylate at a copolymerization ratio of 20% by mass or more and less than 60% by mass, and a structure derived from acrylic acid or methacrylic acid at an acid value in the range of 30 mgKOH/g to 80 mgKOH/g, and has a total content of the hydrophilic structural unit of 25% by mass or less, and a weight average molecular weight of from 30,000 to 150,000.

In embodiments of the invention, the glass transition temperature of the self-dispersible polymer is not particularly limited, but is preferably 120° C. or higher, more preferably 120° C. to 250° C., even more preferably 150° C. to 250° C., and is particularly preferably 160° C. to 200° C. from the viewpoints of the block resistance and the abrasion resistance of the image.

When the glass transition temperature of the self-dispersing polymer is 150° C. or higher, the blocking resistance (particularly, under the high temperature and high humidity conditions) may be improved. When the glass transition temperature is 250° C. or lower, the abrasion resistance of the image is enhanced.

The glass transition temperature of the self-dispersing polymer can be appropriately controlled according to methods conventionally used. For example, the glass transition temperature of the self-dispersing polymer can be controlled to a desired range by appropriately selecting the type of the polymerizable group of the monomer constituting the self-dispersing polymer, the type or the composition ratio of the substituent on the monomer, the molecular weight of the polymer molecule, or the like.

For the glass transition temperature (Tg) of the self-dispersing polymer according to the exemplary embodiment of the invention, a measured Tg that is obtainable by actual measurement is applied. Specifically, the measured Tg means a value measured under conventional measurement conditions using a differential scanning calorimeter (DSC) EXSTAR6220 (trade name) manufactured by SII Nanotechnology, Inc.

However, if measurement is difficult due to degradation of the polymer or the like, a calculated Tg that is computed by the following calculation formula, is applied.

The calculated Tg is calculated by the following formula (1):

$$1/Tg = \Sigma(X_i/Tg_i) \tag{1}$$

Here, it is assumed that in the polymer serving as the object of calculation, n species of monomer components, with i being from 1 to n, are copolymerized. $X_i$ is the weight fraction of the $i^{th}$ monomer ($\Sigma X_i=1$), and $Tg_i$ is the glass transition temperature (absolute temperature) of a homopolymer of the $i^{th}$ monomer, provided that $\Sigma$ takes the sum of i=1 to i=n. Furthermore, for the value of the glass transition temperature of a homopolymer of each monomer ($Tg_i$), the values given in Polymer Handbook ($3^{rd}$ edition) (J. Brandrup, E. H. Immergut, (Wiley-Interscience, 1989)) are employed.

The I/O value of the self-dispersing polymer is not particularly limited, but from the viewpoints of blocking resistance and the stability of the ink composition, the value is preferably from 0.20 to 0.55, more preferably from 0.30 to 0.54, and even more preferably from 0.40 to 0.50.

If the I/O value of the self-dispersing polymer is less than 0.20, the stability of the ink composition may be decreased. If the I/O value is greater than 0.55, blocking resistance (particularly, under high temperature and high humidity conditions) may be decreased.

The I/O value, which is also called as an inorganicity value/organicity value, is a value that deals with the polarity of various organic compounds in an organic conceptual manner, and is one of functional group contribution methods setting parameters to each functional group.

The I/O value is explained in detail in "Organic Conceptual Diagram" (by Koda Yoshio, published by Sankyo Publishing Co., Ltd. (1984) and the like. The concept of the I/O value is to indicate the result of dividing the properties of a compound into organic groups representing covalent bonding properties and inorganic groups representing ion bonding properties, and rating every organic compound as a point on a Cartesian coordinate system designated as an organic axis and an inorganic axis.

The inorganicity value is a value obtained by evaluating the magnitude of the influence of various substituents or bonds carried by an organic compound on the boiling point, and converting the magnitude into a numerical data based on the hydroxyl group. Specifically, when the distance between the boiling point curve of a linear alcohol and the boiling point curve of a linear paraffin is taken in the vicinity of a compound of five carbon atoms, the result is about 100° C. Thus, the influence of one hydroxyl group is defined as 100 as a numerical value, and the value obtained by converting the influence of various substituents or various bonds on the boiling point into a numerical value based on this value of 100, serves as the inorganicity value of the substituent carried by an organic compound. For example, the inorganicity value of a —COOH group is 150, and the inorganicity value of a double bond is 2. Therefore, the inorganicity value of an organic compound of a certain type means the sum of the inorganicity values of various substituents, bonds and the like carried by the compound.

The organicity value is defined by taking a methylene group in the molecule as a unit, and defining the influence of a carbon atom representing the methylene group on the boiling point as the reference. That is, when one carbon atom is added to a linear saturated hydrocarbon compound having around 5 to 10 carbon atoms, the average value of an increase in the boiling point is 20° C. Thus, the organicity value of one carbon atom is defined as 20 based on this value, and the value of converting the influence of various substituents or bonds on the boiling point based on this value of 20, serves as the organicity value. For example, the organicity value of a nitro group (—NO$_2$) is 70.

An I/O value approximating to zero represents that the organic compound is non-polar (hydrophobic, high organicity), and a larger value represents that the organic compound is polar (hydrophilic, high inorganicity).

According to the present invention, the I/O value of the self-dispersing polymer means a value determined by the following method. The I/O value (=I value/O value) of each monomer constituting the self-dispersing polymer is calculated based on the organicity (O value) and the inorganicity (I value) described in Koda Yoshio, "Organic Conceptual Diagram—Fundamentals and Applications" (1984), p. 13. For each of the monomers constituting the polymer, a product of the (I/O value) and (mol % in the polymer) was calculated, these products were summed, and the value obtained by rounding off at the third decimal place was defined as the I/O value of the self-dispersing polymer.

As the method of calculating the inorganicity value of each monomer, generally a double bond is regarded as having an inorganicity of 2 upon addition; however, since the double bond disappears after polymerization, a value that does not add the portion of double bond as the inorganicity value of the monomers was used to calculate the I/O value of the self-dispersing polymer used in the present invention.

According to the exemplary embodiment of the invention, a polymer having a desired I/O value can be constructed by appropriately adjusting the structure and content of the monomers constituting the self-dispersing polymer.

Hereinafter, specific examples of the self-dispersing polymer will be listed as exemplary compounds, but the present invention is not limited to these. The numbers in the parentheses represent the mass ratio of the copolymerized components.

Methyl methacrylate/isobornyl methacrylate/methacrylic acid copolymer (20/72/8), glass transition temperature: 180° C., I/O value: 0.44

Methyl methacrylate/isobornyl methacrylate/methacrylic acid copolymer (40/52/8), glass transition temperature: 160° C., I/O value: 0.50

Methyl methacrylate/isobornyl methacrylate/dicyclopentanyl methacrylate/methacrylic acid copolymer (20/62/10/8), glass transition temperature: 170° C., I/O value: 0.44

Methyl methacrylate/dicyclopentanyl methacrylate/methacrylic acid copolymer (20/72/8), glass transition temperature: 160° C., I/O value: 0.47

For the calculation of the I/O value, the following values were used as the I/O values of the monomers constituting the polymer.

Methyl methacrylate: 0.60, isobornyl methacrylate: 0.29, dicyclopentanyl methacrylate: 0.32, methacrylic acid 0.47

The method for producing a self-dispersing polymer according to the exemplary embodiment of the invention is not particularly limited, and the polymer can be produced by copolymerizing a monomer mixture according to a known polymerization method. Among such polymerization methods, it is more preferable to perform polymerization in an organic medium from the viewpoint of droplet ejection properties when formed into an ink composition, and a solution polymerization method is particularly preferable.

In regard to the method for producing the self-dispersing polymer of the exemplary embodiment of the invention, the water-insoluble polymer as described above can be produced by subjecting a mixture including a monomer mixture and if necessary, an organic solvent and a radical polymerization initiator, to a copolymerization reaction under an inert gas atmosphere.

The method for producing an aqueous dispersion of self-dispersing polymer particles according to the exemplary embodiment of the invention is not particularly limited, and an aqueous dispersion of self-dispersing polymer particles can be obtained by a known method. The process of obtaining a self-dispersing polymer as an aqueous dispersion is preferably a phase inversion emulsification method including the following process (1) and process (2).

Process (1): a process of obtaining a dispersion by stirring a mixture containing a water-insoluble polymer, an organic solvent, a neutralizing agent and an aqueous medium.

Process (2): a process of removing at least a portion of the organic solvent from the dispersion.

The process (1) is preferably a treatment of first dissolving the water-insoluble polymer in an organic solvent, slowly adding a neutralizing agent and an aqueous medium thereto, and mixing and stirring the mixture to obtain a dispersion. As such, when a neutralizing agent and an aqueous medium are added into a solution of the water-insoluble polymer dissolved in an organic solvent, a self-dispersing polymer particle having a particle size with higher storage stability can be obtained without requiring a strong shear force.

The method of stirring the mixture is not particularly limited, and any generally used mixing and stirring apparatus, or if necessary, a dispersing machine such as an ultrasonic dispersing machine or a high pressure homogenizer can be used.

Preferable examples of the organic solvent include alcohol-based solvents, ketone-based solvents, and ether-based solvents.

Examples of the alcohol-based solvents include isopropyl alcohol, n-butanol, t-butanol, ethanol and the like. Examples of the ketone-based solvents include acetone, methyl ethyl ketone, diethyl ketone, methyl isobutyl ketone, and the like. Examples of the ether-based solvents include dibutyl ether, dioxane, and the like. Among these organic solvents, ketone-based solvents such as methyl ethyl ketone and alcohol-based solvents such as isopropyl alcohol are preferred.

It is also preferable to use isopropyl alcohol and methyl ethyl ketone in combination. When the solvents are used in combination, aggregation/precipitation or fusion between particles does not occur, and a self-dispersing polymer particle having a microparticle size with high dispersion stability can be obtained. This is thought to be because the polarity change upon phase inversion from an oil system to an aqueous system becomes mild.

The neutralizing agent is used to partially or entirely neutralize the dissociative groups so that the self-dispersing polymer can form a stable emulsified or dispersed state in water. In the case where the self-dispersing polymer of the exemplary embodiment of the invention has an anionic dissociative group as the dissociative group, examples of the neutralizing agent to be used include basic compounds such as organic amine compounds, ammonia, and alkali metal hydroxides. Examples of the organic amine compounds include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-diethylamino-2-methyl-1-propanol, 2-amino-2-methyl-1-propanol, N-methyldiethanolamine, N-ethyldiethanolamine, monoisopropanolamine, diisopropanolamine, and triisopropanolamine, etc. Examples of the alkali metal hydroxide include lithium hydroxide, sodium hydroxide and potassium hydroxide. Among them, sodium hydroxide, potassium hydroxide, triethylamine, and triethanolamine are preferred from the viewpoint of the stabilization of dispersion of the self-dispersing polymer particles of the exemplary embodiment of the invention into water.

These basic compounds are preferably used in an amount of from 5 mol % to 120 mol %, more preferably from 20 mol % to 100 mol %, and further preferably from 30 mol % to 80 mol %, based on 100 mol % of the dissociative group. When the content is 15 mol % or more, an effect of stabilizing the dispersion of particles in water is exhibited, and when the content is 80 mol % or less, an effect of reducing water-soluble components is obtained.

In the process (2), an aqueous dispersion of self-dispersing polymer particles can be obtained by distilling off the organic solvent from the dispersion obtained in the process (1) by a conventional method such as distillation under reduced pressure, to thereby bring about phase inversion into an aqueous system. The organic solvent in the obtained aqueous dispersion is substantially removed, and the amount of the organic solvent is preferably 0.2% by mass or less, and more preferably 0.1% by mass or less.

The average particle size of the self-dispersing polymer particles according to the exemplary embodiment of the invention is preferably in the range of 1 nm to 100 nm, more preferably 3 nm to 80 nm, and further preferably 5 nm to 60 nm. The average particle size is particularly preferably from 5 nm to 40 nm. With an average particle size of 1 nm or more, manufacturability is enhanced. Further, with an average particle size of 100 nm or less, storage stability is enhanced. Here, the average particle size means a volume average particle size.

The particle size distribution of the self-dispersing polymer particles is not particularly limited, and the polymer particles may have a broad particle size distribution or a mono-dispersed particle size distribution. Water-insoluble particles may also be used as mixtures of two or more types.

The average particle size and particle size distribution of the self-dispersing polymer particles can be measured using, for example, a light scattering method.

In the ink composition of the exemplary embodiment of the invention, the self-dispersing polymer particles preferably exist in a form that does not substantially contain a colorant.

The self-dispersing polymer particles of the exemplary embodiment of the invention have excellent self-dispersibility, and the stability of a dispersion of the polymer alone is very high. However, for example, since the function as a so-called dispersant for stably dispersing a pigment is not very significant, if the self-dispersing polymer according to the exemplary embodiment of the invention is present in the ink composition in a form containing a pigment, consequently the stability of the ink composition as a whole may be greatly decreased.

The ink composition in the exemplary embodiment of the invention may contain one type of self-dispersing polymer particles alone, or may contain two or more types of such particles.

The content of the self-dispersing polymer particles in the ink composition in the exemplary embodiment of the invention is preferably from 1% by mass to 30% by mass, more preferably from 2% by mass to 20% by mass, and particularly preferably from 2% by mass to 10% by mass, based on the ink composition for inkjet recording, from the viewpoint of the glossiness of the image.

The content ratio of the coloring particles and the self-dispersing polymer particles (coloring particles/self-dispersing polymer particles) in the ink composition of the exemplary embodiment of the invention is preferably from 1/0.5 to 1/10, and more preferably from 1/1 to 1/4, from the viewpoint of abrasion resistance of the image.

(Other Additives)

The ink composition in the exemplary embodiment of the invention can further include other additives if necessary, in addition to the components mentioned above.

Examples of the other additives according to the exemplary embodiment of the invention include known additives such as color fading inhibitor, emulsion stabilizer, permeation accelerator, ultraviolet absorber, preservative, mildew-proofing agent, pH adjusting agent, surface tension regulator, defoamer, viscosity adjusting agent, dispersant, dispersed stabilizer, anti-rust agent and chelating agent. These various additives may be added directly after the preparation of the ink composition, or may be added during the preparation of the ink composition. Specifically, the other additives and the like described in paragraphs [0153] to [0162] of JP-A No. 2007-100071 are included.

The surface tension adjusting agent may be a nonionic surfactant, a cationic surfactant, an anionic surfactant, a betaine surfactant or the like.

The amount of addition of the surface tension adjusting agent is preferably an amount of addition that adjusts the surface tension of the ink composition to 20 mN/m to 60 mN/m, more preferably an amount of addition that adjusts the surface tension to 20 mN/m to 45 mN/m, and further preferably an amount of addition that adjusts the surface tension to 25 mN/m to 40 mN/m, in order to spot the ink composition satisfactorily by the inkjet method. The surface tension of the ink composition can be measured, for example, using a plate method at 25° C.

Specific examples of the surfactant as a hydrocarbon type preferably include anionic surfactants such as fatty acid salts, alkyl sulfuric acid ester salts, alkyl benzenesulfonates, alkyl naphthalenesulfonates, dialkyl sulfosuccinates, alkyl phosphoric acid ester salts, naphthalenesulfonic acid-formalin condensates and polyoxyethylene alkyl sulfuric acid salts; and nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkyl amine, glycerin fatty acid ester and oxyethylene oxypropylene block copolymer. SURFYNOLS (trade name, products of Air Products & Chemicals) and OLFINE E1010 (trade name, surfactant, manufactured by Nisshin Chemical Industry Co., Ltd.) which are an acetylene type polyoxyethylene oxide surfactant) are preferably used. Furthermore, amine oxide type amphoteric surfactants such as N,N-dimethyl-N-alkyl amine oxide are preferred.

Additionally, materials described on pages (37) to (38) of JP-A No. 59-157636 and Research Disclosure No. 308119 (1989) as surfactants can be used.

When fluorocarbon (alkyl fluoride type) surfactants, silicone surfactants or the like, such as those described in JP-A Nos. 2003-322926, 2004-325707 and 2004-309806 are used, abrasion resistance can be improved.

The surface tension regulator can be used as an antifoamer, and fluorine compounds, silicone compounds, chelating agents represented by EDTA, and the like can be used.

When the application of ink is carried out by the inkjet method, the viscosity of the ink composition of the exemplary embodiment of the invention is preferably in the range of 1 mPa·s to 30 mPa·s, more preferably in the range of 1 mPa·s to 20 mPa·s, further preferably in the range of 2 mPa·s to 15 mPa·s, and particularly preferably in the range of 2 mPa·s to 10 mPa·s, from the viewpoints of the droplet ejection stability and rate of aggregation.

The viscosity of the ink composition can be measured by, for example, Brookfield Viscometer at 20° C.

In the exemplary embodiment of the invention, the pH of the ink composition is preferably 7.5 to 10, and more preferably 7.0 to 9.0, from the viewpoints of the ink stability and the rate of aggregation. The pH of the ink composition may be measured using a conventional pH measurement apparatus (for example, pH meter D-50; trade name, manufactured by HORIBA CORPORATION) at a temperature of 25° C. The pH of the ink composition is appropriately controlled by applying an acidic compound or basic compound. A conventional acidic compound or basic compound may be used as the acidic compound or basic compound without any restriction.

In an image forming method according to the exemplary embodiment of the invention, an exemplary embodiment of forming an image by using an ink set of the invention which includes at least one of the ink compositions, and at least one treatment liquid configured to form aggregates when contacted with the ink composition, is preferable.

The ink set can be used in the form of an ink cartridge holding these inks collectively or independently, and is preferable in view of the ease of handling. The ink cartridge constituted to include the ink set is known in the related technical field, and can be prepared as an ink cartridge by appropriately using a known method.

[Treatment Liquid Applying Step]

It is preferable that the image forming method in the exemplary embodiment of the invention includes a treatment liquid applying step of applying a treatment liquid, which is capable of forming aggregates when contacted with the ink composition applied in the above ink applying step, onto the recording medium. By using the treatment liquid together with the ink composition, inkjet recording may be speeded up and, even when a high-speed recording is performed, an image having high density and high resolution may be obtained.

The treatment liquid in the exemplary embodiment of the invention is an aqueous composition which forms an aggregate when contacted with the ink composition for inkjet recording, and specifically, contains at least an aggregating component which may aggregate the dispersed particles such as the coloring particles (pigments) in the ink composition to form an aggregate and, if necessary, may contain other components.

The treatment liquid contains at least one aggregating component which forms an aggregate when contacted with the ink composition. By mixing the treatment liquid into the ink composition ejected by an inkjet method, aggregation of a pigment or the like which has been stably dispersed in the ink composition is promoted.

Examples of the treatment liquid include a liquid composition which may generate an aggregate by changing the pH of the ink composition. Thereupon, the pH (25° C.) of the treatment liquid is preferably from 1 to 6, more preferably from 1.2 to 5, and further preferably from 1.5 to 4 from the viewpoints of the aggregation rate of the ink composition. In this case, the pH (25° C.) of the ink composition used in the ejection step is preferably 7.5 to 9.5 (more preferably 8.0 to 9.0).

In embodiments, it is preferable that the pH (25° C.) of the ink composition is 7.5 or higher, and the pH (25° C.) of the treatment liquid is 3 to 5, from the viewpoint of the image density, the resolution, and speeding-up of inkjet recording.

The aggregating component may be used alone, or two or more of them may be used by mixing them.

The treatment liquid may be prepared by using at least one acidic compound as the aggregating component. As the acidic compound, compounds having a phosphoric acid group, a phosphonic acid group, a phosphinic acid group, a sulfuric acid group, a sulfonic acid group, a sulfinic acid group, or a carboxy group, or salts thereof (e.g. polyvalent metal salts) may be used. Among them, from the viewpoint of the aggregation rate of the ink composition, compounds having a phosphoric acid group or a carboxy group are more preferable, and compounds having a carboxy group are further preferable.

The compound having a carboxy group is preferably selected from polyacrylic acid, acetic acid, glycoric acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrole carboxylic acid, furan carboxylic acid, pyridine carboxylic acid, coumalic acid, thiophene carboxylic acid, nicotinic acid, or derivatives of such compound or salts thereof (for example, polyvalent metal salts, etc.) One of these compounds may be used alone or two or more of these compounds may be used together.

The treatment liquid in the exemplary embodiment of the invention may further include an aqueous solvent (for example, water) in addition to the acidic compound described above.

The content of the acidic compound in the treatment liquid is, preferably, from 5% by mass to 95% by mass and, more preferably, from 10% by mass to 80% by mass based on the entire mass of the treatment liquid from the viewpoint of aggregation effect.

Preferred examples of the treatment liquid that may improve the high speed aggregation property include a treatment liquid including a polyvalent metal salt or a polyallyl amine. Examples of the polyvalent metal salt and a polyallyl amine include salts of alkaline earth metals belonging to group 2 of the periodic table (for example, magnesium and calcium), salts of a transition metal belonging to group 3 of the periodic table (for example, lanthanum), salts of a cation of a metal belonging to group 13 of the periodic table (for example, aluminum), salts of a lanthanide (for example, neodium), polyallylamine and polyallylamine derivatives. As the metal salts, carboxylic acid salts (such as, salts of formic acid, salts of acetic acid, and salts of benzoic acid), nitric acid salts, chlorides, and thiocyanic acid salts are preferred, and calcium salts or magnesium salt of a carboxylic acid (such as salts of formic acid, salts of acetic acid, and salts of benzoic acid), calcium salt of nitric acid or magnesium salt of nitric acid, calcium chloride, magnesium chloride, and calcium salt of thiocyanic acid or magnesium salt of thiocyanic acid are more preferred.

The content of the metal salt in the treatment liquid is preferably from 1% by mass to 10% by mass, more preferably, from 1.5% by mass to 7% by mass and, further preferably, from 2% by mass to 6% by mass.

The viscosity of the treatment liquid is, preferably, in a range from 1 mPa·s to 30 mPa·s, more preferably, in a range from 1 mPa·s to 20 mPa·s, further preferably, in a range from 2 mPa·s to 15 mPa·s, and, particularly preferably, in a range from 2 mPa·s to 10 mPa·s from the viewpoint of the aggregation rate of the ink composition. The viscosity is measured by using VISCOMETER TV-22 (trade name, manufactured by TOKI SANGYO CO., LTD.) under the condition at 20° C.

The surface tension of the treatment liquid is, preferably, from 20 mN/m to 60 mN/m, more preferably, from 20 mN/m to 45 mN/m and, further preferably, from 25 mN/m to 40 mN/m from the viewpoint of the aggregation rate of the ink composition. The surface tension is measured by using Automatic Surface Tensiometer CBVP-Z (trade name, manufactured by Kyowa Interface Science Co. Ltd.) under the condition of being at 25° C.

EXAMPLES

Hereinafter, the present invention will be specifically described with respect to Examples, but the present invention is not limited to these Examples unless exceeds the subject matter of the invention. Unless stated otherwise, the "parts" is based on mass.

The weight average molecular weight was measured by using a gel permeation chromatography (GPC). HLC-8220 GPC (trade name, manufactured by Tosoh Corp.) was used for the GPC, and TSKgeL SuperHZM-H, TSKgeL SuperHZ4000, and TSKgeL SuperHZ2000 (trade names, all manufactured by Tosoh Corp.) were used as the columns and were connected in a series of three. The eluent liquid was THF (tetrahydrofuran). For the conditions, the sample concentration was 0.35% by mass, the flow rate was 0.35 ml/min, the amount of sample injection was 10 µl, the measurement temperature was 40° C., and an RI detector was used. A calibration curve was produced from 8 samples of the 2 standard sample TSK standard, polystyrene": "F-40", "F-20", "F-4", "F-1", "A-5000", "A-2500", "A-1000" and "n-propylbenzene" (trade names) manufactured by Tosoh Corp.

Example 1

Preparation of Ink Composition

—Synthesis of Resin Dispersant P-1—

88 g of methyl ethyl ketone was added to a 1000-mL three-necked flask equipped with an agitator and a cooling tube, and was heated to 72° C. under a nitrogen atmosphere. To this, a solution of 0.85 g of dimethyl-2,2'-azobisisobutyrate, 50 g of phenoxyethyl methacrylate, 11 g of methacrylic acid and 39 g of methyl methacrylate dissolved in 50 g of methyl ethyl ketone was added dropwise over 3 hours. After the addition was completed, the mixture was reacted for one more hour, and then a solution of 0.42 g of dimethyl-2, 2'-azobisisobutyrate dissolved in 2 g of methyl ethyl ketone was added. The temperature was raised to 78° C., and the mixture was heated for 4 hours. Methyl ethyl ketone (MEK) was added to the obtained reaction solution to obtain 36.8% MEK solution of a phenoxyethyl methacrylate/methyl methacrylate/methacrylic acid copolymer (copolymerization ratio by mass percent=50/39/11) (resin dispersant P-1).

The composition of the obtained resin dispersant P-1 was confirmed by $^1$H-NMR, and the weight average molecular weight (Mw) determined by GPC was 49,400. The acid value of the copolymer was determined by the method described in JIS Standards (JIS K0070: 1992), and the value was 71.7 mgKOH/g. The measured Tg of the copolymer (resin dispersant P-1) was 94° C.

—Synthesis of Resin Dispersant P-2—

240 g of methyl ethyl ketone, 30 g of a mixture of N-(4-vinylbenzyl)-10H-acridin-9-one and N-(3-vinylbenzyl)-10H-acridin-9-one (mixture mass ratio 1 to 1), 20 g of methacrylic acid and 150 g of ethyl methacrylate were added to a 1000-mL three-necked flask equipped with an agitator and a cooling tube, and heated to 75° C. under a nitrogen atmosphere. To this, a solution of 2.44 g of dimethyl-2,2'-azobisisobutyrate dissolved in 16 g of methyl ethyl ketone, was added. The mixture was reacted with stirring while maintaining the temperature of 75° C. for two hours, followed by an addition of a solution of 1.0 g of dimethyl-2,2'-azobisisobutyrate dissolved in 2.0 g of methyl ethyl ketone and further reaction for two hours. To the mixture, a solution of 1.0 g of dimethyl-2,2'-azobisisobutyrate dissolved in 2.0 g of methyl ethyl ketone was added. The temperature of the mixture was raised to 80° C., and the mixture was heated for 4 hours. Methyl ethyl ketone (MEK) was added to the obtained reaction solution to obtain MEK solution of a mixture of N-(4-vinylbenzyl)-10H-acridin-9-one and N-(3-vinylbenzyl)-10H-acridin-9-one (mixture mass ratio 1 to 1)/ethyl methacrylate/methacrylic acid copolymer (copolymerization ratio by mass percent=15/75/10) (resin dispersant P-2).

The measured Tg of the copolymer (resin dispersant P-2) was 124° C. A content of a non-volatile component in the obtain MEK solution of the copolymer (resin dispersant P-2) was measured by weighing after drying a part of the obtain MEK solution by heating under reduced pressure. The value was 36.8% by weight. The composition of the obtained resin dispersant P-2 was confirmed by $^1$H-NMR, and the weight average molecular weight (Mw) determined by GPC was 44,200. The acid value of the copolymer was determined by the method described in JIS Standards (JIS K0070: 1992), and the value was 65.2 mgKOH/g.

—Preparation of Self-Dispersing Polymer Particles B-01—

560.0 g of methyl ethyl ketone was introduced into a two litter three-necked flask equipped with an agitator, a thermometer, a reflux cooling tube and a nitrogen gas inlet tube, and the temperature was increased to 87° C. under a nitrogen atmosphere. While maintaining a condition of reflux in the reaction vessel (until finishing the reaction), a mixed solution formed from 220.4 g of methyl methacrylate (MMA), 301.6 g of isobornyl methacrylate (IBOMA), 58.0 g of methacrylic acid (MAA), 108 g of methyl ethyl ketone and 2.32 g of "V-601" (trade name, manufactured by Wako Pure Chemical Industries, Ltd.) was added dropwise at a constant rate so that dropping would be completed in 2 hours. After stirring the reaction mixture for one hour after the addition was completed, a solution formed from 1.16 g of "V-601" and 6.4 g of methyl ethyl ketone was added, and the mixture was stirred for 2 hours (referred as a reaction step (1)). The reaction step (1) was repeated four times and then a solution formed from 1.16 g of "V-601" and 6.4 g of methyl ethyl ketone was further added, and the mixture was stirred for 3 hours. The temperature was lowered to 65° C. after performing the polymerization reaction, and 163 g of isopropanol was added. The reaction mixture was rendered to cool in the atmosphere.

The weight average molecular weight (Mw) of the obtained copolymer was 63,000, and the acid value was 65.1 (mg KOH/g).

Next, 317.3 g of the polymerized solution (solid content 41.0%) was weighed, and 46.4 g of isopropanol, 1.65 g of a 20% aqueous solution of maleic anhydride (which is correspond to 0.3% by weight as maleic acid to the amount of the copolymer) and 40.77 g of a 2 mol/L aqueous NaOH solution were added. The temperature in the reaction vessel was increased to 70° C. Subsequently, 380 g of distilled water was added dropwise at a rate of 10 mL/min to achieve dispersion in water (dispersion step). Subsequently, 287.0 g of the solvent including isopropanol, methyl ethyl ketone and water was distilled off under the reduced pressure, while holding for 1.5 hours at a temperature of 70° C. in the reactive vessel (solvent removing step). Then, 0.278 g of PROXEL GXL(S) (trade name, manufactured by Arch Chemicals Japan Inc.) (which corresponds 440 ppm as benzoisothiazoline to a solid of the copolymer) was added. Then the resulting liquid was filtered with a filter having a pore diameter of 1 µm to obtain a dispersion of a self-dispersing polymer particle (B-01) at a solids concentration of 26.5%. The obtained self-dispersing polymer particle was diluted with ion exchanged water to obtain aqueous dispersion of 25.0% concentration for measurement of physical properties. The obtained values for the physical properties were followings. a pH; 7.8, electric(al) conductivity; 461 mS/m, viscosity; 14.8 mPa·s, and volume average particle diameter; 2.8 nm.

<Measurement of Glass Transition Temperature Tg>

The glass transition temperature of the obtained polymer (particles B-01) was measured by the following method, and was 160° C.

The polymer solution after polymerization in an amount of 0.5 g in terms of solid fraction was dried under reduced pressure at 50° C. for 4 hours to obtain a polymer solid fraction. The obtained polymer solid fraction was used to measure Tg by a differential scanning calorimeter (DSC) EXSTAR6220 (trade name) manufactured by SII Nanotechnology, Inc. The measurement conditions were such that 5 mg of a sample was sealed in an aluminum pan, and the value of the peak top of DDSC from the measurement data obtained at the time of second temperature increase in the following temperature profile under a nitrogen atmosphere, was designated as Tg.

from 30° C. to −50° C. (cooled at 50° C./min)
from −50° C. to 120° C. (heated at 20° C./min)
from 120° C. to −50° C. (cooled at 50° C./min)
from −50° C. to 120° C. (heated at 20° C./min)

<Measurement of Volume Average Particle Diameter (Mv)>

An aqueous dispersion of the resultant self-dispersible polymer particle was arbitrarily diluted to the concentration (loading index of the range of 0.1 to 10) suitable for measurement, the volume average particle diameter of all aqueous dispersions was measured under same measurement conditions by a dynamic light scattering method, using an ULTRA FINE PARTICLE DIAMETER DISTRIBUTION MEASURER NANOTRACK UPA-EX150 (trade name, manufactured by Nikkiso Co., Ltd.). That is to say, it was measured under the following conditions: particle permeability of transmission, particle refractive index of 1.51, particle shape of nonsphere, density of 1.2 g/cm$^3$, water as the solvent, cell temperature of 18° C. to 25° C.

~Production of Dispersion of Resin-Coated Pigment Particle~

(Production of Cyan Pigment Dispersion C)

100 g of Pigment Blue 15:3 (phthalocyanine blue A 220 wet cake (pigment solid content 33.5%), made from Dainichiseika Color & Chemicals Mfg. Co., Ltd.) as pigment solid content, 45 g of the phenoxy ethyl methacrylate/methyl methacrylate/methacrylic acid copolymer (resin dispersant P-1) as the solid content, 140 g of methyl ethyl ketone, 50.6 g of 1 mol/L aqueous sodium hydroxide solution (degree of neutralization with respect to the methacrylic acid: 88 mol %) as a pH adjuster, 331 g of ion exchanged water is dispersed with disperser in advance as a pigment, a further eight-pass process was performed by a disperser (trade name; MICROFLUIDIZER M-140K, manufactured by Microfluidic™ Corporation, 150 MPa).

Subsequently, methyl ethyl ketone in the resultant dispersion was removed under reduced pressure at 56° C., a further 1 part of water was removed, a centrifugal treatment was performed at 8,000 rpm for 30 minutes by a 50 mL centrifugal tube, using HIGH SPEED CENTRIFUGAL COOLER 7550

(trade name, manufactured by Hisamitsu Pharmaceutical Co., Inc.), the supernatant solution, other than the precipitates, was collected.

Subsequently, the resultant dispersion (supernatant liquid) was heated to 70° C. for 4 hours, and then 80 ppm of 2-methyl-4-isothiazolin-3-on, 40 ppm of 5-chloro-2methylisothiazolin-3-on, 10 ppm of 2-bromo-2-nitropropan-1,3-diol, 30 ppm of 4,4-dimethyloxazolidine, 80 ppm of 1,2-benzisothiazolin-3-on, and 30 ppm of 2-n-octyl-4-isothiazolin-3-on as an antiseptic agent were added thereto, followed by filtration, and the filtrate was collected. The pigment concentration was calculated from the absorption spectrum, a pigment concentration of 15% resin-coated pigment particle dispersion (cyan pigment dispersion C) was obtained. The dispersion was pH 8.5 and viscosity of 2.9 mPa·s.

<Measurement of Particle Diameter of Resin-Coated Pigment Particle>

With respect to the resultant resin-coated pigment particle dispersion, the volume average particle diameter was measured by a dynamic light scattering method, using PARTICLE DIAMETER DISTRIBUTION MEASURER NANOTRACK UPA-EX150 (trade name, manufactured by Nikkiso Co., Ltd.). Measurement was performed by adding 10 mL of the ion exchange water to 10 μL of the resin-coated pigment particle dispersion to produce a measurement sample liquid, followed by adjusting the temperature to 25° C. As a measurement result, volume average particle diameter of the resin-coated pigment particle was 88 nm.

(Production of Magenta Pigment Dispersion M)

100 g of Pigment Red 122 (CROMOPHTAL JET MAGENTA DMQ; trade name, manufactured by Chiba specialty corporation; Magenta pigment), 30 g of the resin dispersant P-2 as the solid content, 133 g of methyl ethyl ketone, 27.2 g of 1 mol/L aqueous NaOH solution (degree of neutralization with respect to the methacrylic acid: 78 mol %), and 424 g of ion exchanged water were mixed, further dispersed by disperser mixing in advance, and a 10-pass process was performed by a disperser (MICROFLUIDIZER M-140K; trade name, 150 MPa).

Subsequently, the same operation as performed for the cyan pigment dispersion C was performed to obtain a pigment concentration of 15% resin-coated pigment particle dispersion (Magenta pigment dispersion M). Further, the volume average particle diameter, pH, and viscosity of the resultant dispersion using the same method as described above were measured to have a diameter of 76 nm, pH 8.6, and viscosity of 2.8 mPa·s.

~Preparation of Ink~

(Preparation of Cyan Ink)

Each component was mixed so as to have the ink composition described below, using cyan pigment dispersion C as obtained above and a self-dispersible polymer particle B-01. The resultant was charged by a disposable syringe made of a plastic. The resultant was filtrated with PVDF 5 μm filter (trade name; MILLEX-SV, diameter of 25 nm, manufactured by Millipore corporation) to produce cyan ink (ink composition for inkjet) C-01.

<Composition of Cyan Ink>

Cyan pigment (Pigment Blue 15:3) 2.5%
The resin dispersant P-1 (solid content) 1.125%
The self-dispersible polymer particle B-01 (solid content) 8.5%
Colloidal silica (solid content) 0.05% (trade name; SNOWTEX XS, volume average particle diameter: 4 to 6 nm, manufactured by Nissan Chemical Industries, Ltd.)
SUNNIX GP 250 8% (trade name, manufactured by Sanyo Chemical Industries, Ltd., hydrophilic organic solvent, I/O value 1.30)
Tripropylene glycol monomethyl ether (TPGmME) 8% (trade name; MFTG, manufactured by Nippon Nyukazai Co., Ltd., hydrophilic organic solvent, I/O value 0.80)
Urea (manufactured by Nissan Chemical Industries, Ltd., solid wetting agent) 5%
NEWPOLE PE-108 (trade name, manufactured by Sanyo Chemical Industries, Ltd., thickening agent) 0.15%
OLFINE E1010 (trade name, manufactured by Nissin Chemical Industry Co., Ltd., surfactant) 1%
Ion exchanged water remainder (up to the total amount of 100%)

(Preparation of Magenta Ink)

Magenta ink (ink composition for inkjet) M-01 was prepared in a manner substantially same as that in preparation of the cyan ink C-01 except that each component was mixed so as to have the ink composition described below, using the magenta pigment dispersion M as obtained above and a resin dispersant P-2.

<Composition of Magenta Ink>

Magenta pigment (Pigment Red 122) 5.0%
The resin dispersant P-2 (solid content) 1.5%
The self-dispersible polymer particle B-01 (solid content) 7.25%
SUNNIX GP 250 10% (trade name, manufactured by Sanyo Chemical Industries, Ltd., hydrophilic organic solvent, I/O value 1.30)
Tripropylene glycol monomethyl ether (TPGmME) 6% (trade name; MFTG, manufactured by Nippon Nyukazai Co., Ltd., hydrophilic organic solvent, I/O value 0.80)
Urea (manufactured by Nissan Chemical Industries, Ltd., solid wetting agent) 5%
NEWPOLE PE-108 (trade name, manufactured by Sanyo Chemical Industries, Ltd., thickening agent) 0.05%
OLFINE E1010 (trade name, manufactured by Nissin Chemical Industry Co., Ltd., surfactant) 1%
Ion exchanged water remainder (up to the total amount of 100%)

Preparation of Treatment Liquid

Each component was mixed so as to have the composition described below to prepare the treatment liquid T-1. The viscosity and surface tension of the obtained treatment liquid was measured by the same method as described above to have a viscosity of 2.3 mPa·s, surface tension of 42.5 mN/m, and pH 1.0.

<Composition> malonic acid (manufactured by Tateyama Kasei Co., Ltd.) 11.3%
DL-malic acid (manufactured by Fuso Chemical Co., Ltd.) 14.5%
Diethylene glycol monobutyl ether 4% (trade name; BDG, manufactured by Nippon Nyukazai Co., Ltd.)
Tripropylene glycol monomethyl ether 4% (trade name; MFTG, manufactured by Nippon Nyukazai Co., Ltd.)
Ion exchanged water 66.2%

<Image Formation and Evaluation>

—Image Formation—

An inkjet recording apparatus, which was equipped with inkjet head 1 set to the following setting conditions and was configured as shown in FIG. 1, was prepared. However, the apparatus did not include solvent concentration detector 104, solvent adding unit 106, and filter 140.

<Setting Conditions>

Ink temperature in sub-tank 102: 25° C.

Filter 122: mesh size of 5 μm

Head unit 51: nozzle diameter of 18 μm, 120 dpi, length of one unit of 2 cm

Piezoelectric element 68: lead titanate zirconate (Piezo)

Amount of ink flowing through common flow channel 52: from 2 mL/sec to 4 mL/sec

The magenta ink as obtained above was charged to the connected storage tank to the inkjet recording apparatus. An inkjet head is equipped with a silicon nozzle plate which is formed of single crystal silicon, and a silicon oxide film ($SiO_2$ film) is formed on the surface thereof at a side toward the ink ejection direction of the nozzle by an oxidation treatment. Further, plural nozzles are arranged two-dimensionally in a matrix form in the silicon nozzle plate as shown in FIGS. 2 to 4, and ink droplets can be ejected with high precision as shown in FIG. 5. As a recording medium, TOKUBISHI ART BOTH FACES N (trade name, manufactured by Mitsubishi Paper Mills, Ltd.) was prepared.

The recording medium was fixed on a transferable stage in the predetermined straight line direction at 500 mm/second, stage temperature was held at 30° C., the treatment liquid as obtained above was coated at a thickness of about 1.2 μm with a bar coater, followed by drying at 50° C. for 2 seconds immediately after coating. The prepared inkjet head was fixed and disposed such that the line direction (w, 310, 320, 330, 340 etc. in FIG. 9) where nozzle was aligned to an inclination of 75.7° (90°-α in FIGS. 6 and 9) with respect to the direction orthogonal (principal scanning direction) to the movement direction (sub-scanning direction) of the stage. While the recording medium was moved at the constant speed in the sub-scanning direction, ink was ejected linearly under conditions of an ink droplet volume of 2.4 pL, ejection frequency of 25.7 kHz, resolution of 1200 dpi ×1200 dpi, and an image was recorded which contained a 50% solid image with an area of 2 square cm, a 4 to 8 pt images of the character of a 轟 (TODOROKI)", and a 4 pt image of the character of 轟 (TODOROKI)" as a white letter on a solid image.

Immediately after recording, the image was passed between a pair of fixing rollers, which were dried at 60° C. for 3 seconds and at the 60° C., and fixing process was performed at a NIP pressure of 0.25 MPa and a NIP width of 4 mm to obtain an evaluation sample.

~Image Evaluation~

—1. Resolution of Image—

Among image of the resultant evaluation sample, the resolution was evaluated according to evaluation criteria described below by visual observation with respect to a 4 to 8 pt image of the character of a 轟 (TODOROKI)" and a 4 pt image of the character of 轟 (TODOROKI)" as a white letter on a solid image. The evaluation results are shown in Table 2 below.

<Evaluation Criteria>

AA: Resolution is good for a 4 pt character, and the resolution is at a level having no problems in practical application.

A: The decrease in resolution was recognized at a part of the 4 pt characters, but the resolution is at a level having no problems in practical application.

B: The decrease in resolution is recognized even in characters larger than 4 pt and the resolution was at a level having low practicality.

C: The character is lost and the decrease in resolution was prominent, and the resolution was at a level having extremely low practicality.

—2. Image Density—

The density of the image section of the obtained evaluation sample was measured using Reflection Densitometer (trade name; XRITE 938, manufactured by X-rite corporation) and was evaluated by the evaluation criteria described below. The evaluation results are shown in Table 2 below.

<Evaluation Criteria>

AA: Sufficient density is obtained, and the density is of an extremely good level.

A: Density is obtained, and the density is of a good level.

B: Practical application presents no problem at this level.

C: Density is reduced, and the density is at a level having low practicality.

D: Density is highly reduced and the density is at a level having very low practicality.

—3. Ink Ejection Stability—

Ejection ratio was measured by conditions below and image unevenness was observed visually and was evaluated using the evaluation criteria below.

(1) ejection ratio [%] after continuous ejection test for 60 minutes (2) ejection ratio [%] after stopping for 30 minutes after ejection for 1 minute <Evaluation Criteria>

AA: (1) and (2) are 99% or more, and image unevenness is not recognized at all.

A: (1) and (2) are 95% or more, and there are no practical issues with image unevenness.

B: (1) and (2) are 90% or more, and image unevenness is recognized, but there are no practical issues.

C: (1) and (2) are 80% or more, and image unevenness can be clearly recognized, but is of a low level causing practical problems.

D: (1) and (2) are less than 80%, image unevenness is conspicuous, and practicality is of a very low level.

<Ejection Ratio>

Ejection ratio was calculated by Formula below $$\text{Ejection ratio}[\%] = (\text{number of nozzles capable of ejecting under the conditions})/(\text{total number of nozzles}) \times 100.$$

—4. Head Reliability—

The inkjet head was continuously ejected at 25.7 kHz for 6000 hundred million times, and then image is recorded, and line image of 75×2400 dpi was drawn at an ejection frequency of 25.7 kHz using 96 nozzles. With respect to the line image, the center value of the line was measured using a DOT ANALYZER DA-6000, trade name, manufactured by Oji Scientific Instruments Co., Ltd., and a standard deviation σ of misalignment of each line was calculated. The evaluation results are shown in Table 2 below.

<Evaluation Criteria>

AA: σ<2 μm

A: 2 μm≤σ<3 μm

B: 3 μm≤σ<5 μm

C: 5 μm≤σ<7 μm

D: 7 μm≤σ

—5. Nozzle Deformation—

The ink-jet head was continuously ejected at 25.7 kHz six hundred billion times, and then an image was recorded, nozzle shapes of 2048 nozzle holes and the state of the liquid repellent film or the silicon oxide film around 2048 nozzle holes were observed by an optical microscope, and changes in the nozzle shape and in state around the nozzle were evaluated according to evaluation criteria below. The evaluation results are shown in Table 2 below.

<Evaluation Criteria>

AA: All the nozzle shape and all the state around the nozzle holes are good
A: The number of the nozzle changed in the nozzle shape or the state around the nozzle holes is less than 5
B: The number of the nozzle changed in the nozzle shape or the state around the nozzle holes is 5 or more and less than 10.
C: The number of the nozzle changed in the nozzle shape or the state around the nozzle holes is 10 or more and less than 20.
D: The number of the nozzle changed in the nozzle shape or the state around the nozzle holes is 20 or more.

Example 2

An evaluation sample recorded an image onto the recording medium was obtained and evaluated in substantially the same manner as that in Example 1, except that the added amount of the aqueous NaOH solution used in the preparation of the dispersion of the self-dispersing polymer particles B-01 was changed to 0.2 mol equivalents as a neutralization degree. The evaluation results are shown in Table 2 below.

Example 3

An evaluation sample recorded an image onto the recording medium was obtained and evaluated in a manner substantially same as that in Example 1 except a self-dispersible polymer particle dispersion B-01 used in ink preparation in Example 1 was replaced with a polymer particle dispersion C obtained by an emulsion polymerization process as described below. The evaluation results are shown in Table 2 below.

Preparation of Polymer Particle Dispersion C

To a 1 L three-necked flask equipped with stirrer and reflux condenser were placed 8.1 g of PIONIN A-43s (trade name, manufactured by Takemoto Oil & Fat Co., Ltd., emulsifier) and 236.0 g of distilled water, followed by heat and stirring at 70° C. under nitrogen gas flow. 6.2 g of styrene, 3.5 g of n-butyl acrylate, 0.3 g of acrylic acid, 1.0 g of ammonium persulfate, and 40 g of distilled water were added thereto, and after stirring for 30 minutes, dropwise addition was performed at a steady speed such that this dropwise addition of a monomer solution consisting of 117.8 g of styrene, 66.5 g of n-butyl acrylate and 5.7 g of acrylic acid completes in 2 hours. After completion of the dropwise addition, a water solution consisting of 0.5 g of ammonium persulfate and 20 g of distilled water was added thereto, followed by stirring at 70° C. for 4 hours, and then the temperature was raised to 85° C. and was stirred for 2 hours. A reaction solution was cooled down, and neutralization degree was neutralized to be 0.5 using 2 mol/L aqueous NaOH solution. Through successive filtration, a polymer particle BH-1 dispersion was obtained represented by the structure below. The physical properties of the obtained polymer particle have weight-average molecular weight of 232,000, acid value of 23 mgKOH/g, and volume average particle diameter of 70 nm.

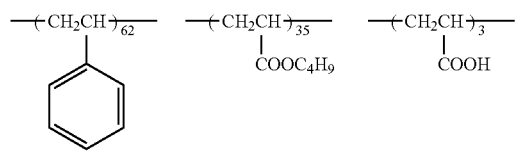

(BH-1)

Example 4

An evaluation sample recorded an image onto the recording medium was obtained and evaluated in a manner substantially same as that in Example 1 except that 0.05% of the Colloidal silica (SNOWTEX XS) was replaced with 0.05% of sodium silicate (liquid glass solution, solid content 55%, manufactured by Wako Pure Chemical Industries, Ltd.) As a result, deterioration of the nozzle plate was suppressed, head reliability was high due to less deformation of the nozzle, and an image with higher precision can be formed stably as similar to those in Example 1 and the like.

Example 5

An evaluation sample recorded an image onto the recording medium was obtained and evaluated in a manner substantially same as that in Example 1 except that the content of the Colloidal silica (SNOWTEX XS) was changed from 0.05% to 0.01%, 0.1% and 0.3% individually. As a result, deterioration of the nozzle plate was suppressed, head reliability was high due to less deformation of the nozzle, and an image with higher precision can be formed stably as similar to those in Example 1 and the like.

Examples 6 to 10

An image was recorded and evaluated in substantially the same manner as that in Examples 1 to 5 respectively except that magenta ink used Examples 1 to 5 was changed to cyan ink individually. As a result, in all Examples 6 to 10, deterioration of the nozzle plate was suppressed, head reliability was high due to less deformation of the nozzle, and an image with higher precision can be formed stably as similar to those in Examples 1 to 5.

Comparative Example 1

An evaluation sample recorded an image onto the recording medium was obtained and evaluated in substantially the same manner as that in Example 1 except that colloidal silica used in the magenta ink production in Example 1 was not contained. The evaluation results are shown in Table 2 below.

Comparative Example 2

An evaluation sample recorded an image onto the recording medium was obtained and evaluated in substantially the same manner as that in Example 2 except that colloidal silica used in the magenta ink preparation in Example 2 was not contained. The evaluation results are shown in Table 2 below.

Comparative Example 3

An evaluation sample recorded an image onto the recording medium was obtained and evaluated in substantially the same manner as that in Example 1 except that ink circulation in Example 1 was not conducted in the inkjet head by unsetting the ink circulation system equipped into the inkjet head of the inkjet recording apparatus shown in FIG. 1. The evaluation results are shown in Table 2 below.

Comparative Example 4

An evaluation sample recorded an image onto the recording medium was obtained and evaluated in substantially the same manner as that in Comparative Example 3 except that colloidal silica used in the magenta ink production in Comparative Example 3 was not contained. The evaluation results are shown in Table 2 below.

TABLE 2

|  | Head 1 | Comparative Head 2 |
|---|---|---|
| Substrate of nozzle plate | Silicon | Silicon |
| Protective film of nozzle plate | Silicon oxide | Silicon oxide |
| Piezoelectric body | disposed | disposed |
| Two-dimensional matrix form | arranged (FIGS. 6 to 9) | arranged (FIGS. 6 to 9) |
| Ink circulation system | equipped (FIGS. 1 to 5) | none |
| Resolution | 1200 dpi (single-pass) | 1200 dpi (single-pass) |

TABLE 3

|  | InkJet Head | Ink circulation | Colloidal Silica [mass %] | Resin Particles | | | Evaluation | | | | |
|---|---|---|---|---|---|---|---|---|---|---|---|
|  |  |  |  | Kind | Acid Value | Neutralization degree *1 | Image Resolution | Image Density | Ejection Stability | Head Reliability | Nozzle Deformation |
| Example 1 | Head 1 | used | 0.05 | Self-dispersing Polymer | 65.1 | 0.5 | AA | AA | AA | AA | AA |
| Example 2 | Head 1 | used | 0.05 | Self-dispersing Polymer | 65.1 | 0.2 | A | A | B | AA | AA |
| Example 3 | Head 1 | used | 0.05 | Emulsion Polymerization | 23 | 0.5 | B | B | AA | AA | AA |
| Comparative Example 1 | Head 1 | used | none | Self-dispersing Polymer | 65.1 | 0.5 | AA | AA | AA | D | C |
| Comparative Example 2 | Head 1 | used | none | Self-dispersing Polymer | 65.1 | 0.2 | A | A | B | C | B |
| Comparative Example 3 | Comparative Head 2 | none | 0.05 | Self-dispersing Polymer | 65.1 | 0.5 | C | C | B | A | A |
| Comparative Example 4 | Comparative Head 2 | none | none | Self-dispersing Polymer | 65.1 | 0.5 | C | C | B | A | A |

As shown in Table 2 above, in Examples, deterioration of the nozzle plate was suppressed, head reliability was high, ejection stability was excellent, and an image with higher precision can be formed stably.

On the other hand, in Comparative Examples 1 and 2 which did not contain colloidal silica, deterioration of the nozzle plate could not be suppressed, and head reliability was low. Further, in Comparative Examples 3 and 4 in which the ink did not circulate in the inkjet head, resolution (density) of the nozzle arrangement itself could not be enhanced, and the resolution and density of the recorded image were also insufficient.

According to the present invention, when image formation is performed using an inkjet head that has an ink circulation system, an image forming method with which deterioration of the head members (particularly, the nozzle plate or ink flow channels) is suppressed, and an image having high precision can be formed stably over a long-term may be provided.

The foregoing description of the exemplary embodiments of the present invention has been provided for the purposes of illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. An image forming method comprising:
ejecting an ink composition comprising at least one silicic acid compound, from an inkjet head equipped with a nozzle plate, a plurality of liquid droplet ejecting elements and an ink circulation unit, wherein the ink circulation unit comprises a common flow channel that is connected with each of the plurality of liquid droplet ejecting elements via supply channels, and a common circulation channel that is connected with each of the plurality of liquid droplet ejecting elements via reflux channels, that supplies the ink composition to the plurality of liquid droplet ejecting elements from the common flow channel, and that circulates the ink composition to the common circulation channel, each of the liquid droplet ejecting elements being equipped with a nozzle opening, a nozzle flow channel connected to the nozzle opening, and a reflux channel that is different from the nozzle flow channel, and a portion of the nozzle plate being formed of silicon or being provided with a film selected from the group consisting of a metal oxide, a metal nitride and a metal other than silicon.

2. The image forming method according to claim 1, wherein the silicic acid compound is a water-soluble silicic acid salt or colloidal silica.

3. The image forming method according to claim 1, wherein the ink composition further comprises a pigment, a water-soluble organic solvent, and polymer particles.

4. The image forming method according to claim 3, wherein the polymer particles comprise carboxy groups and have an acid value of 25 mgKOH/g to 100 mgKOH/g, at least a part of the carboxy groups being neutralized, and a neutralization degree of the carboxy groups being 0.3 mole equivalents or more.

5. The image forming method according to claim 3, wherein the polymer particles are self-dispersing polymer particles.

6. The image forming method according to claim 5, wherein the self-dispersing polymer particles comprise a hydrophilic structural unit derived from a hydrophilic monomer and a hydrophobic structural unit derived from a hydrophobic monomer.

7. The image forming method according to claim 6, wherein the hydrophobic monomer comprises a cyclic aliphatic group-containing monomer.

8. The image forming method according to claim 3, wherein the pigment comprises at least one pigment coated with a water-insoluble resin including a structural unit having an acidic group.

9. The image forming method according to claim 8, wherein the water-insoluble resin comprises a hydrophilic structural unit (A) and a hydrophobic structural unit (B), the hydrophilic structural unit (A) comprising an acidic group.

10. The image forming method according to claim 9, wherein the hydrophobic structural unit (B) comprises a structural unit represented by the following Formula (2):

Formula (2):

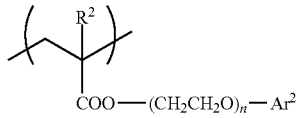

wherein, in Formula (2), $R^2$ represents a hydrogen atom or a methyl group; $Ar^2$ represents a monovalent group derived from an unsubstituted or substituted aromatic ring; and n represents an average repeating number in a range of from 1 to 6.

11. The image forming method according to claim 1, wherein a total amount of the silicic acid compound is in a range of from 0.0005% by mass to 0.5% by mass relative to a total mass of the ink composition.

12. The image forming method according to claim 1, wherein the ink composition further comprises a first hydrophilic organic solvent having an I/O value of from 0.70 to less than 1.0.

13. The image forming method according to claim 12, wherein the ink composition further comprises a second hydrophilic organic solvent having an I/O value of from 1.0 to 1.5.

14. The image forming method according to claim 1, wherein the film comprises $SiO_2$ or tantalum oxide.

15. The image forming method according to claim 1, wherein, in the inkjet head, the ink composition flows from the common flow channel through the supply channels and is supplied to the plurality of liquid droplet ejecting elements, which are provided with discharge nozzles, and the ink composition that is not ejected from the discharge nozzles flows through the reflux channel and is made to circulate to the common circulation channel.

16. The image forming method according to claim 1, wherein, in the inkjet head, a supply amount of the ink composition that is supplied from the common flow channel is adjusted by changing the pressure difference between the common flow channel and the common circulation channel.

17. The image forming method according to claim 1, wherein the liquid droplet ejecting elements are each equipped with a discharge nozzle that ejects the ink composition, a nozzle flow channel which is connected with the discharge nozzle, and a pressure chamber which is connected with the discharge nozzle via the nozzle flow channel and to which the ink composition is supplied from the common flow channel via the supply channel, and the common circulation channel is connected with the nozzle flow channel via the reflux channel.

18. The image forming method according to claim 1, wherein the metal oxide is at least one selected from the group consisting of silicon oxide, titanium oxide and chromium oxide, the metal nitride is at least one selected from the group consisting of titanium nitride and silicon nitride, and the metal other than silicon is zirconium.

* * * * *